United States Patent
Yeung et al.

(10) Patent No.: US 11,466,680 B2
(45) Date of Patent: Oct. 11, 2022

(54) SYSTEMS AND METHODS OF UTILIZATION OF A HYDRAULIC FRACTURING UNIT PROFILE TO OPERATE HYDRAULIC FRACTURING UNITS

(71) Applicant: BJ Energy Solutions, LLC, Houston, TX (US)

(72) Inventors: Tony Yeung, Tomball, TX (US); Ricardo Rodriguez-Ramon, Tomball, TX (US); Andres Alvarez, Tomball, TX (US); Joseph Foster, Tomball, TX (US)

(73) Assignee: BJ Energy Solutions, LLC, Houston, TX (US)

( * ) Notice: Subject to any disclaimer, the term of this patent is extended or adjusted under 35 U.S.C. 154(b) by 0 days.

(21) Appl. No.: 17/301,475

(22) Filed: Apr. 5, 2021

(65) Prior Publication Data

US 2021/0396119 A1    Dec. 23, 2021

Related U.S. Application Data

(60) Provisional application No. 62/705,628, filed on Jul. 8, 2020, provisional application No. 62/705,357, filed on Jun. 23, 2020.

(51) Int. Cl.
*F04B 51/00* (2006.01)
*E21B 43/26* (2006.01)
(Continued)

(52) U.S. Cl.
CPC .......... *F04B 51/00* (2013.01); *E21B 43/2607* (2020.05); *F04B 15/02* (2013.01);
(Continued)

(58) Field of Classification Search
CPC ........ F04B 15/02; F04B 49/065; F04B 51/00; F04B 2205/05; F04B 2205/09;
(Continued)

(56) References Cited

U.S. PATENT DOCUMENTS 2,498,229 A    2/1950    Adler
2,535,703 A    12/1950   Smith et al.
(Continued)

FOREIGN PATENT DOCUMENTS

AU    9609498    7/1999
AU    737970     9/2001
(Continued)

OTHER PUBLICATIONS

Europump and Hydrualic Institute, Variable Speed Pumping: A Guide to Successful Applications, Elsevier Ltd, 2004.
(Continued)

*Primary Examiner* — Charles G Freay
(74) *Attorney, Agent, or Firm* — Womble Bond Dickinson (US) LLP

(57) ABSTRACT

A methods and system to operate hydraulic fracturing units may include utilizing hydraulic fracturing unit profiles. The system may include hydraulic fracturing units may include various components. The components may include an engine and associated local controller and sensors, a transmission connected to the engine, transmission sensors, and a pump connected to the transmission and powered by the engine via the transmission and associated local controller and sensors. A supervisory controller may control the hydraulic fracturing units. The supervisory controller may be in communication with components of each hydraulic fracturing unit. The supervisory controller may include instructions to, for each hydraulic fracturing units, obtain hydraulic fracturing unit parameters, determine a hydraulic
(Continued)

fracturing unit health assessment, and build a hydraulic unit profile including the health assessment and parameters. The supervisory controller may, based on the health assessment, determine the hydraulic fracturing unit's capability to be operated at a maximum power output.

14 Claims, 8 Drawing Sheets

(51) Int. Cl.
*F04B 49/06* (2006.01)
*G01L 5/00* (2006.01)
*G01L 3/00* (2006.01)
*F04B 15/02* (2006.01)

(52) U.S. Cl.
CPC .............. *F04B 49/065* (2013.01); *G01L 3/00* (2013.01); *G01L 5/0061* (2013.01); *G01L 5/0071* (2013.01)

(58) Field of Classification Search
CPC ...... F04B 2203/0605; F04B 2203/1101; F04B 2203/1201; F04B 2203/0208; F04B 2203/0408; F04B 2203/0604; E21B 43/2607; G01L 3/00; G01L 5/0071; G01L 5/0061
See application file for complete search history.

(56) References Cited

U.S. PATENT DOCUMENTS

| | | |
|---|---|---|
| 2,820,341 A | 1/1958 | Amann |
| 2,868,004 A | 1/1959 | Runde |
| 2,940,377 A | 6/1960 | Darnell et al. |
| 2,947,141 A | 8/1960 | Russ |
| 3,068,796 A | 12/1962 | Pfluger et al. |
| 3,191,517 A | 6/1965 | Solzman |
| 3,257,031 A | 6/1966 | Dietz |
| 3,274,768 A | 9/1966 | Klein |
| 3,378,074 A | 4/1968 | Kiel |
| 3,382,671 A | 5/1968 | Ehni, III |
| 3,463,612 A | 8/1969 | Whitsel |
| 3,550,696 A | 12/1970 | Kenneday |
| 3,586,459 A | 6/1971 | Zerlauth |
| 3,632,222 A | 1/1972 | Cronstedt |
| 3,656,582 A | 4/1972 | Alcock |
| 3,739,872 A | 6/1973 | McNair |
| 3,759,063 A | 9/1973 | Bendall |
| 3,765,173 A | 10/1973 | Harris |
| 3,771,916 A | 11/1973 | Flanigan et al. |
| 3,773,438 A | 11/1973 | Hall et al. |
| 3,786,835 A | 1/1974 | Finger |
| 3,791,682 A | 2/1974 | Mitchell |
| 3,796,045 A | 3/1974 | Foster |
| 3,814,549 A | 6/1974 | Cronstedt |
| 3,820,922 A | 6/1974 | Buse et al. |
| 3,963,372 A | 6/1976 | McLain et al. |
| 4,010,613 A | 3/1977 | McInerney |
| 4,019,477 A | 4/1977 | Overton |
| 4,031,407 A | 6/1977 | Reed |
| 4,059,045 A | 11/1977 | McClain |
| 4,086,976 A | 5/1978 | Holm et al. |
| 4,117,342 A | 9/1978 | Melley, Jr. |
| 4,173,121 A | 11/1979 | Yu |
| 4,204,808 A | 5/1980 | Reese et al. |
| 4,209,079 A | 6/1980 | Marchal et al. |
| 4,209,979 A | 7/1980 | Woodhouse et al. |
| 4,222,229 A | 9/1980 | Uram |
| 4,269,569 A | 5/1981 | Hoover |
| 4,311,395 A | 1/1982 | Douthitt et al. |
| 4,330,237 A | 5/1982 | Battah |
| 4,341,508 A | 7/1982 | Rambin, Jr. |
| 4,357,027 A | 11/1982 | Zeitlow |
| 4,383,478 A | 5/1983 | Jones |
| 4,402,504 A | 9/1983 | Christian |
| 4,457,325 A | 7/1984 | Green |
| 4,470,771 A | 9/1984 | Hall et al. |
| 4,483,684 A | 11/1984 | Black |
| 4,505,650 A | 3/1985 | Hannett et al. |
| 4,574,880 A | 3/1986 | Handke |
| 4,584,654 A | 4/1986 | Crane |
| 4,672,813 A | 6/1987 | David |
| 4,754,607 A | 7/1988 | Mackay |
| 4,782,244 A | 11/1988 | Wakimoto |
| 4,796,777 A | 1/1989 | Keller |
| 4,869,209 A | 9/1989 | Young |
| 4,913,625 A | 4/1990 | Gerlowski |
| 4,983,259 A | 1/1991 | Duncan |
| 4,990,058 A | 2/1991 | Eslinger |
| 5,135,361 A | 8/1992 | Dion |
| 5,245,970 A | 9/1993 | Iwaszkiewicz et al. |
| 5,291,842 A | 3/1994 | Sallstrom et al. |
| 5,362,219 A | 11/1994 | Paul et al. |
| 5,537,813 A | 7/1996 | Davis et al. |
| 5,553,514 A | 9/1996 | Walkowc |
| 5,560,195 A | 10/1996 | Anderson et al. |
| 5,586,444 A | 12/1996 | Fung |
| 5,622,245 A | 4/1997 | Reik |
| 5,626,103 A | 5/1997 | Haws et al. |
| 5,651,400 A | 7/1997 | Corts et al. |
| 5,678,460 A | 10/1997 | Walkowc |
| 5,717,172 A | 2/1998 | Griffin, Jr. et al. |
| 5,720,598 A | 2/1998 | de Chizzelle |
| 5,839,888 A | 11/1998 | Harrison |
| 5,846,062 A | 12/1998 | Yanagisawa et al. |
| 5,983,962 A | 11/1999 | Gerardot |
| 6,041,856 A | 3/2000 | Thrasher et al. |
| 6,050,080 A | 4/2000 | Horner |
| 6,067,962 A | 5/2000 | Bartley et al. |
| 6,071,188 A | 6/2000 | O'Neill et al. |
| 6,074,170 A | 6/2000 | Bert et al. |
| 6,123,751 A | 9/2000 | Nelson et al. |
| 6,129,335 A | 10/2000 | Yokogi |
| 6,145,318 A | 11/2000 | Kaplan et al. |
| 6,230,481 B1 | 5/2001 | Jahr |
| 6,279,309 B1 | 8/2001 | Lawlor, II et al. |
| 6,321,860 B1 | 11/2001 | Reddoch |
| 6,334,746 B1 | 1/2002 | Nguyen et al. |
| 6,530,224 B1 | 3/2003 | Conchier |
| 6,543,395 B2 | 4/2003 | Green |
| 6,655,922 B1 | 12/2003 | Flek |
| 6,765,304 B2 | 7/2004 | Baten et al. |
| 6,786,051 B2 | 9/2004 | Kristich et al. |
| 6,851,514 B2 | 2/2005 | Han et al. |
| 6,859,740 B2 | 2/2005 | Stephenson et al. |
| 6,901,735 B2 | 6/2005 | Lohn |
| 6,962,057 B2 | 11/2005 | Kurokawa et al. |
| 7,007,966 B2 | 3/2006 | Campion |
| 7,065,953 B1 | 6/2006 | Kopko |
| 7,143,016 B1 | 11/2006 | Discenzo et al. |
| 7,222,015 B2 | 5/2007 | Davis et al. |
| 7,388,303 B2 | 6/2008 | Seiver |
| 7,404,294 B2 | 7/2008 | Sundin |
| 7,442,239 B2 | 10/2008 | Armstrong et al. |
| 7,545,130 B2 | 6/2009 | Latham |
| 7,552,903 B2 | 6/2009 | Dunn et al. |
| 7,563,076 B2 | 7/2009 | Brunet et al. |
| 7,563,413 B2 | 7/2009 | Naets et al. |
| 7,594,424 B2 | 9/2009 | Fazekas |
| 7,614,239 B2 | 11/2009 | Herzog et al. |
| 7,627,416 B2 | 12/2009 | Batenburg et al. |
| 7,677,316 B2 | 3/2010 | Butler et al. |
| 7,721,521 B2 | 5/2010 | Kunkle et al. |
| 7,730,711 B2 | 6/2010 | Kunkle et al. |
| 7,779,961 B2 | 8/2010 | Matte |
| 7,789,452 B2 | 9/2010 | Dempsey et al. |
| 7,845,413 B2 | 12/2010 | Shampine et al. |
| 7,886,702 B2 | 2/2011 | Jerrell et al. |
| 7,900,724 B2 | 3/2011 | Promersberger et al. |
| 7,921,914 B2 | 4/2011 | Bruins et al. |
| 7,938,151 B2 | 5/2011 | Höckner |
| 7,980,357 B2 | 7/2011 | Edwards |

(56) References Cited

U.S. PATENT DOCUMENTS

| | | |
|---|---|---|
| 8,056,635 B2 | 11/2011 | Shampine et al. |
| 8,083,504 B2 | 12/2011 | Williams et al. |
| 8,186,334 B2 | 5/2012 | Ooyama |
| 8,196,555 B2 | 6/2012 | Ikeda et al. |
| 8,202,354 B2 | 6/2012 | Iijima |
| 8,316,936 B2 | 11/2012 | Roddy et al. |
| 8,336,631 B2 | 12/2012 | Shampine et al. |
| 8,414,673 B2 | 4/2013 | Raje et al. |
| 8,469,826 B2 | 6/2013 | Brosowske |
| 8,506,267 B2 | 8/2013 | Gambier et al. |
| 8,575,873 B2 | 11/2013 | Peterson et al. |
| 8,616,005 B1 | 12/2013 | Cousino, Sr. et al. |
| 8,621,873 B2 | 1/2014 | Robertson et al. |
| 8,656,990 B2 | 2/2014 | Kajaria et al. |
| 8,672,606 B2 | 3/2014 | Glynn et al. |
| 8,707,853 B1 | 4/2014 | Dille et al. |
| 8,714,253 B2 | 5/2014 | Sherwood et al. |
| 8,757,918 B2 | 6/2014 | Ramnarain et al. |
| 8,770,329 B2 | 7/2014 | Spitler |
| 8,784,081 B1 | 7/2014 | Blume |
| 8,789,601 B2 | 7/2014 | Broussard et al. |
| 8,794,307 B2 | 8/2014 | Coquilleau et al. |
| 8,801,394 B2 | 8/2014 | Anderson |
| 8,851,186 B2 | 10/2014 | Shampine et al. |
| 8,851,441 B2 | 10/2014 | Acuna et al. |
| 8,905,056 B2 | 12/2014 | Kendrick |
| 8,951,019 B2 | 2/2015 | Hains et al. |
| 8,973,560 B2 | 3/2015 | Krug |
| 8,997,904 B2 | 4/2015 | Cryer et al. |
| 9,016,383 B2 | 4/2015 | Shampine et al. |
| 9,032,620 B2 | 5/2015 | Frassinelli et al. |
| 9,057,247 B2 | 6/2015 | Kumar et al. |
| 9,103,193 B2 | 8/2015 | Coli et al. |
| 9,121,257 B2 | 9/2015 | Coli et al. |
| 9,140,110 B2 | 9/2015 | Coli et al. |
| 9,187,982 B2 | 11/2015 | Dehring et al. |
| 9,206,667 B2 * | 12/2015 | Khvoshchev ............ F04B 51/00 |
| 9,212,643 B2 | 12/2015 | Deliyski |
| 9,222,346 B1 | 12/2015 | Walls |
| 9,324,049 B2 * | 4/2016 | Thomeer ............ E21B 41/0092 |
| 9,341,055 B2 | 5/2016 | Weightman |
| 9,346,662 B2 | 5/2016 | Van Vliet et al. |
| 9,366,114 B2 | 6/2016 | Coli et al. |
| 9,376,786 B2 | 6/2016 | Numasawa |
| 9,394,829 B2 | 7/2016 | Cabeen et al. |
| 9,395,049 B2 | 7/2016 | Vicknair et al. |
| 9,401,670 B2 | 7/2016 | Minato et al. |
| 9,410,410 B2 | 8/2016 | Broussard et al. |
| 9,410,546 B2 | 8/2016 | Jaeger et al. |
| 9,429,078 B1 | 8/2016 | Crowe et al. |
| 9,488,169 B2 | 11/2016 | Cochran et al. |
| 9,493,997 B2 | 11/2016 | Liu et al. |
| 9,512,783 B2 | 12/2016 | Veilleux et al. |
| 9,534,473 B2 | 1/2017 | Morris et al. |
| 9,546,652 B2 | 1/2017 | Yin |
| 9,550,501 B2 | 1/2017 | Ledbetter |
| 9,556,721 B2 | 1/2017 | Jang et al. |
| 9,562,420 B2 | 2/2017 | Morris et al. |
| 9,570,945 B2 | 2/2017 | Fischer |
| 9,579,980 B2 | 2/2017 | Cryer et al. |
| 9,587,649 B2 | 3/2017 | Oehring |
| 9,611,728 B2 | 4/2017 | Oehring |
| 9,617,808 B2 | 4/2017 | Liu et al. |
| 9,638,101 B1 | 5/2017 | Crowe et al. |
| 9,638,194 B2 | 5/2017 | Wiegman et al. |
| 9,650,871 B2 | 5/2017 | Oehring et al. |
| 9,656,762 B2 | 5/2017 | Kamath et al. |
| 9,689,316 B1 | 6/2017 | Cram |
| 9,739,130 B2 | 8/2017 | Young |
| 9,764,266 B1 | 9/2017 | Carter |
| 9,777,748 B2 | 10/2017 | Lu et al. |
| 9,803,467 B2 | 10/2017 | Tang et al. |
| 9,803,793 B2 | 10/2017 | Davi et al. |
| 9,809,308 B2 | 11/2017 | Aguilar et al. |
| 9,829,002 B2 | 11/2017 | Crom |
| 9,840,897 B2 | 12/2017 | Larson |
| 9,840,901 B2 | 12/2017 | Oering et al. |
| 9,845,730 B2 | 12/2017 | Betti et al. |
| 9,850,422 B2 | 12/2017 | Lestz et al. |
| 9,856,131 B1 | 1/2018 | Moffitt |
| 9,863,279 B2 | 1/2018 | Laing et al. |
| 9,869,305 B1 | 1/2018 | Crowe et al. |
| 9,879,609 B1 | 1/2018 | Crowe et al. |
| 9,893,500 B2 | 2/2018 | Oehring et al. |
| 9,893,660 B2 | 2/2018 | Peterson et al. |
| 9,897,003 B2 | 2/2018 | Motakef et al. |
| 9,920,615 B2 | 3/2018 | Zhang et al. |
| 9,945,365 B2 | 4/2018 | Hernandez et al. |
| 9,964,052 B2 | 5/2018 | Millican et al. |
| 9,970,278 B2 | 5/2018 | Broussard et al. |
| 9,981,840 B2 | 5/2018 | Shock |
| 9,995,102 B2 | 6/2018 | Dillie et al. |
| 9,995,218 B2 | 6/2018 | Oehring et al. |
| 10,008,880 B2 | 6/2018 | Vicknair et al. |
| 10,008,912 B2 | 6/2018 | Davey et al. |
| 10,018,096 B2 | 7/2018 | Wallimann et al. |
| 10,020,711 B2 | 7/2018 | Oehring et al. |
| 10,024,123 B2 | 7/2018 | Steffenhagen et al. |
| 10,029,289 B2 | 7/2018 | Wendorski et al. |
| 10,030,579 B2 | 7/2018 | Austin et al. |
| 10,036,238 B2 | 7/2018 | Oehring |
| 10,040,541 B2 | 8/2018 | Wilson et al. |
| 10,060,293 B2 | 8/2018 | Del Bono |
| 10,060,349 B2 | 8/2018 | Alvarez et al. |
| 10,077,933 B2 | 9/2018 | Nelson et al. |
| 10,082,137 B2 | 9/2018 | Graham et al. |
| 10,094,366 B2 | 10/2018 | Marica |
| 10,100,827 B2 | 10/2018 | Devan et al. |
| 10,107,084 B2 | 10/2018 | Coli et al. |
| 10,107,085 B2 | 10/2018 | Coli et al. |
| 10,114,061 B2 | 10/2018 | Frampton et al. |
| 10,119,381 B2 | 11/2018 | Oehring et al. |
| 10,134,257 B2 | 11/2018 | Zhang et al. |
| 10,138,098 B2 | 11/2018 | Sorensen et al. |
| 10,151,244 B2 | 12/2018 | Giancotti et al. |
| 10,174,599 B2 | 1/2019 | Shampine et al. |
| 10,184,397 B2 | 1/2019 | Austin et al. |
| 10,196,258 B2 | 2/2019 | Kalala et al. |
| 10,221,856 B2 | 3/2019 | Hernandez et al. |
| 10,227,854 B2 | 3/2019 | Glass |
| 10,227,855 B2 | 3/2019 | Coli et al. |
| 10,246,984 B2 | 4/2019 | Payne et al. |
| 10,247,182 B2 | 4/2019 | Zhang et al. |
| 10,254,732 B2 | 4/2019 | Oehring et al. |
| 10,267,439 B2 | 4/2019 | Pryce et al. |
| 10,280,724 B2 | 5/2019 | Hinderliter |
| 10,287,943 B1 | 5/2019 | Schiltz |
| 10,288,519 B2 | 5/2019 | De La Cruz |
| 10,303,190 B2 | 5/2019 | Shock |
| 10,305,350 B2 | 5/2019 | Johnson et al. |
| 10,316,832 B2 | 6/2019 | Byrne |
| 10,317,875 B2 | 6/2019 | Pandurangan et al. |
| 10,337,402 B2 | 7/2019 | Austin et al. |
| 10,358,035 B2 | 7/2019 | Cryer |
| 10,371,012 B2 | 8/2019 | Davis et al. |
| 10,374,485 B2 | 8/2019 | Morris et al. |
| 10,378,326 B2 | 8/2019 | Morris et al. |
| 10,393,108 B2 | 8/2019 | Chong et al. |
| 10,407,990 B2 | 9/2019 | Oehring et al. |
| 10,408,031 B2 | 9/2019 | Oehring et al. |
| 10,415,348 B2 | 9/2019 | Zhang et al. |
| 10,415,557 B1 | 9/2019 | Crowe et al. |
| 10,415,562 B2 | 9/2019 | Kajita et al. |
| RE47,695 E | 11/2019 | Case et al. |
| 10,465,689 B2 | 11/2019 | Crom |
| 10,478,753 B1 | 11/2019 | Elms et al. |
| 10,526,882 B2 | 1/2020 | Oehring et al. |
| 10,563,649 B2 | 2/2020 | Zhang et al. |
| 10,577,910 B2 | 3/2020 | Stephenson |
| 10,584,645 B2 | 3/2020 | Nakagawa et al. |
| 10,590,867 B2 | 3/2020 | Thomassin et al. |
| 10,598,258 B2 | 3/2020 | Oehring et al. |
| 10,610,842 B2 | 4/2020 | Chong |
| 10,662,749 B1 | 5/2020 | Hill et al. |

(56) References Cited

U.S. PATENT DOCUMENTS

| | | |
|---|---|---|
| 10,711,787 B1 | 7/2020 | Darley |
| 10,738,580 B1 | 8/2020 | Fischer et al. |
| 10,753,153 B1 | 8/2020 | Fischer et al. |
| 10,753,165 B1 | 8/2020 | Fischer et al. |
| 10,760,556 B1 | 9/2020 | Crom et al. |
| 10,794,165 B2 | 10/2020 | Fischer et al. |
| 10,794,166 B2 | 10/2020 | Reckels et al. |
| 10,801,311 B1 | 10/2020 | Cui et al. |
| 10,815,764 B1 | 10/2020 | Yeung et al. |
| 10,815,978 B2 | 10/2020 | Glass |
| 10,830,032 B1 | 11/2020 | Zhang et al. |
| 10,859,203 B1 | 12/2020 | Cui et al. |
| 10,864,487 B1 | 12/2020 | Han et al. |
| 10,865,624 B1 | 12/2020 | Cui et al. |
| 10,865,631 B1 | 12/2020 | Zhang et al. |
| 10,870,093 B1 | 12/2020 | Zhong et al. |
| 10,871,045 B2 | 12/2020 | Fischer et al. |
| 10,895,202 B1 | 1/2021 | Yeung et al. |
| 10,907,459 B1 | 2/2021 | Yeung et al. |
| 10,927,774 B2 | 2/2021 | Cai et al. |
| 10,954,770 B1 | 3/2021 | Yeung et al. |
| 10,954,855 B1 | 3/2021 | Ji et al. |
| 10,961,908 B1 | 3/2021 | Yeung et al. |
| 10,961,912 B1 | 3/2021 | Yeung et al. |
| 10,961,914 B1 | 3/2021 | Yeung et al. |
| 10,961,993 B1 | 3/2021 | Ji et al. |
| 10,982,523 B1 | 4/2021 | Hill et al. |
| 10,989,019 B2 | 4/2021 | Cai et al. |
| 10,995,564 B2 | 5/2021 | Miller et al. |
| 11,002,189 B2 | 5/2021 | Yeung et al. |
| 11,008,950 B2 | 5/2021 | Ethier et al. |
| 11,015,423 B1 | 5/2021 | Yeung et al. |
| 11,035,214 B2 | 6/2021 | Cui et al. |
| 11,047,379 B1 | 6/2021 | Li et al. |
| 11,053,853 B2 | 7/2021 | Li et al. |
| 11,060,455 B1 | 7/2021 | Yeung et al. |
| 11,085,281 B1 | 8/2021 | Yeung et al. |
| 11,105,250 B1 | 8/2021 | Zhang et al. |
| 11,105,266 B2 | 8/2021 | Zhou et al. |
| 11,125,156 B2 | 9/2021 | Zhang et al. |
| 11,143,000 B2 | 10/2021 | Li et al. |
| 11,143,006 B1 | 10/2021 | Zhang et al. |
| 11,236,739 B2 | 2/2022 | Yeung et al. |
| 11,242,737 B2 | 2/2022 | Zhang et al. |
| 11,243,509 B2 | 2/2022 | Cai et al. |
| 11,251,650 B1 | 2/2022 | Liu et al. |
| 11,268,346 B2 | 3/2022 | Yeung et al. |
| 11,346,200 B2 | 5/2022 | Cai et al. |
| 11,401,927 B2 | 8/2022 | Li et al. |
| 2002/0126922 A1 | 9/2002 | Cheng et al. |
| 2003/0061819 A1 | 4/2003 | Kuroki et al. |
| 2004/0016245 A1 | 1/2004 | Pierson |
| 2004/0074238 A1 | 4/2004 | Wantanabe et al. |
| 2004/0076526 A1 | 4/2004 | Fukano et al. |
| 2004/0187950 A1 | 9/2004 | Cohen et al. |
| 2004/0219040 A1 | 11/2004 | Kugelev et al. |
| 2005/0051322 A1 | 3/2005 | Speer |
| 2005/0139286 A1 | 6/2005 | Poulter |
| 2005/0196298 A1 | 9/2005 | Manning |
| 2005/0226754 A1 | 10/2005 | Orr et al. |
| 2005/0274134 A1 | 12/2005 | Ryu et al. |
| 2006/0061091 A1 | 3/2006 | Osterloh |
| 2006/0062914 A1 | 3/2006 | Garg et al. |
| 2006/0196251 A1 | 9/2006 | Richey |
| 2006/0211356 A1 | 9/2006 | Grassman |
| 2006/0260331 A1 | 11/2006 | Andreychuk |
| 2006/0272333 A1 | 12/2006 | Sundin |
| 2007/0029090 A1 | 2/2007 | Andreychuk et al. |
| 2007/0066406 A1 | 3/2007 | Keller et al. |
| 2007/0107981 A1 | 5/2007 | Sicotte |
| 2007/0125544 A1 | 6/2007 | Robinson et al. |
| 2007/0181212 A1 | 8/2007 | Fell |
| 2007/0277982 A1 | 12/2007 | Shampine et al. |
| 2007/0295569 A1 | 12/2007 | Manzoor et al. |
| 2008/0006089 A1 | 1/2008 | Winan et al. |
| 2008/0098891 A1 | 5/2008 | Feher |
| 2008/0161974 A1 | 7/2008 | Alston |
| 2008/0264625 A1 | 10/2008 | Ochoa |
| 2008/0264649 A1 | 10/2008 | Crawford |
| 2009/0064685 A1 | 3/2009 | Busekros et al. |
| 2009/0068031 A1 | 3/2009 | Gambier et al. |
| 2009/0092510 A1 | 4/2009 | Williams et al. |
| 2009/0124191 A1 | 5/2009 | Van Becelaere et al. |
| 2009/0178412 A1 | 7/2009 | Spytek |
| 2009/0249794 A1 | 10/2009 | Wilkes et al. |
| 2009/0252616 A1 | 10/2009 | Brunet et al. |
| 2009/0308602 A1 | 12/2009 | Bruins et al. |
| 2010/0019626 A1 | 1/2010 | Stout et al. |
| 2010/0071899 A1 | 3/2010 | Coquilleau et al. |
| 2010/0218508 A1 | 9/2010 | Brown et al. |
| 2010/0300683 A1 | 12/2010 | Looper et al. |
| 2010/0310384 A1 | 12/2010 | Stephenson et al. |
| 2011/0052423 A1 | 3/2011 | Gambier et al. |
| 2011/0054704 A1 | 3/2011 | Karpman et al. |
| 2011/0085924 A1 | 4/2011 | Shampine et al. |
| 2011/0146244 A1 | 6/2011 | Farman et al. |
| 2011/0146246 A1 | 6/2011 | Farman et al. |
| 2011/0173991 A1 | 7/2011 | Dean |
| 2011/0197988 A1 | 8/2011 | Van Vliet et al. |
| 2011/0241888 A1 | 10/2011 | Lu et al. |
| 2011/0265443 A1 | 11/2011 | Ansari |
| 2011/0272158 A1 | 11/2011 | Neal |
| 2012/0048242 A1 | 3/2012 | Sumilla et al. |
| 2012/0085541 A1 | 4/2012 | Love et al. |
| 2012/0137699 A1 | 6/2012 | Montagne et al. |
| 2012/0179444 A1 | 7/2012 | Ganguly et al. |
| 2012/0192542 A1 | 8/2012 | Chillar et al. |
| 2012/0199001 A1 | 8/2012 | Chillar et al. |
| 2012/0204627 A1 | 8/2012 | Anderl et al. |
| 2012/0255734 A1 | 10/2012 | Coli et al. |
| 2012/0310509 A1 | 12/2012 | Pardo et al. |
| 2012/0324903 A1 | 12/2012 | Dewis et al. |
| 2013/0068307 A1 | 3/2013 | Hains et al. |
| 2013/0087045 A1 | 4/2013 | Sullivan et al. |
| 2013/0087945 A1 | 4/2013 | Kusters et al. |
| 2013/0134702 A1 | 5/2013 | Boraas et al. |
| 2013/0189915 A1 | 7/2013 | Hazard |
| 2013/0255953 A1 | 10/2013 | Tudor |
| 2013/0259707 A1 | 10/2013 | Yin |
| 2013/0284455 A1 | 10/2013 | Kajaria et al. |
| 2013/0300341 A1 | 11/2013 | Gillette |
| 2013/0306322 A1 | 11/2013 | Sanborn |
| 2014/0010671 A1 | 1/2014 | Cryer et al. |
| 2014/0013768 A1 | 1/2014 | Laing et al. |
| 2014/0032082 A1 | 1/2014 | Gehrke et al. |
| 2014/0044517 A1 | 2/2014 | Saha et al. |
| 2014/0048253 A1 | 2/2014 | Andreychuk |
| 2014/0090729 A1 | 4/2014 | Coulter et al. |
| 2014/0090742 A1 | 4/2014 | Coskrey et al. |
| 2014/0094105 A1 | 4/2014 | Lundh et al. |
| 2014/0095114 A1* | 4/2014 | Thomeer ............... G06Q 10/20 702/187 |
| 2014/0095554 A1* | 4/2014 | Thomeer ............ G06F 16/9535 707/821 |
| 2014/0123621 A1 | 5/2014 | Driessens et al. |
| 2014/0130422 A1 | 5/2014 | Laing et al. |
| 2014/0138079 A1 | 5/2014 | Broussard et al. |
| 2014/0144641 A1 | 5/2014 | Chandler |
| 2014/0147291 A1 | 5/2014 | Burnette |
| 2014/0158345 A1 | 6/2014 | Jang et al. |
| 2014/0196459 A1 | 7/2014 | Futa et al. |
| 2014/0216736 A1 | 8/2014 | Leugemors et al. |
| 2014/0219824 A1 | 8/2014 | Burnette |
| 2014/0250845 A1 | 9/2014 | Jackson et al. |
| 2014/0251623 A1 | 9/2014 | Lestz et al. |
| 2014/0277772 A1 | 9/2014 | Lopez et al. |
| 2014/0290266 A1 | 10/2014 | Veilleux, Jr. et al. |
| 2014/0318638 A1 | 10/2014 | Harwood et al. |
| 2015/0027730 A1 | 1/2015 | Hall et al. |
| 2015/0078924 A1 | 3/2015 | Zhang et al. |
| 2015/0101344 A1 | 4/2015 | Jarrier et al. |
| 2015/0114652 A1 | 4/2015 | Lestz et al. |
| 2015/0129210 A1 | 5/2015 | Chong et al. |
| 2015/0135659 A1 | 5/2015 | Jarrier et al. |

(56) References Cited

U.S. PATENT DOCUMENTS

| | | |
|---|---|---|
| 2015/0159553 A1 | 6/2015 | Kippel et al. |
| 2015/0192117 A1 | 7/2015 | Bridges |
| 2015/0204148 A1 | 7/2015 | Liu et al. |
| 2015/0204322 A1 | 7/2015 | Iund et al. |
| 2015/0211512 A1 | 7/2015 | Wiegman et al. |
| 2015/0214816 A1 | 7/2015 | Raad |
| 2015/0217672 A1 | 8/2015 | Shampine et al. |
| 2015/0226140 A1 | 8/2015 | Zhang et al. |
| 2015/0252661 A1 | 9/2015 | Glass |
| 2015/0275891 A1 | 10/2015 | Chong et al. |
| 2015/0337730 A1 | 11/2015 | Kupiszewski et al. |
| 2015/0340864 A1 | 11/2015 | Compton |
| 2015/0345385 A1 | 12/2015 | Santini |
| 2015/0369351 A1 | 12/2015 | Hermann et al. |
| 2016/0032703 A1 | 2/2016 | Broussard et al. |
| 2016/0032836 A1 | 2/2016 | Hawkinson et al. |
| 2016/0102581 A1 | 4/2016 | Del Bono |
| 2016/0105022 A1 | 4/2016 | Oehring et al. |
| 2016/0108713 A1 | 4/2016 | Dunaeva et al. |
| 2016/0168979 A1 | 6/2016 | Zhang et al. |
| 2016/0177675 A1 | 6/2016 | Morris et al. |
| 2016/0177945 A1 | 6/2016 | Byrne et al. |
| 2016/0186671 A1 | 6/2016 | Austin et al. |
| 2016/0195082 A1* | 7/2016 | Wiegman .............. F04B 49/065 |
| | | 417/53 |
| 2016/0215774 A1 | 7/2016 | Oklejas et al. |
| 2016/0230525 A1 | 8/2016 | Lestz et al. |
| 2016/0244314 A1 | 8/2016 | Van Vliet et al. |
| 2016/0248230 A1 | 8/2016 | Tawy et al. |
| 2016/0253634 A1 | 9/2016 | Thomeer et al. |
| 2016/0258267 A1 | 9/2016 | Payne et al. |
| 2016/0273328 A1 | 9/2016 | Oehring |
| 2016/0273346 A1 | 9/2016 | Tang et al. |
| 2016/0290114 A1 | 10/2016 | Oehring et al. |
| 2016/0319650 A1 | 11/2016 | Oehring et al. |
| 2016/0326845 A1 | 11/2016 | Djikpesse et al. |
| 2016/0348479 A1 | 12/2016 | Oehring et al. |
| 2016/0369609 A1 | 12/2016 | Morris et al. |
| 2017/0009905 A1 | 1/2017 | Arnold |
| 2017/0016433 A1 | 1/2017 | Chong et al. |
| 2017/0030177 A1 | 2/2017 | Oehring et al. |
| 2017/0038137 A1 | 2/2017 | Turney |
| 2017/0045055 A1 | 2/2017 | Hoefel et al. |
| 2017/0074074 A1 | 3/2017 | Joseph et al. |
| 2017/0074076 A1 | 3/2017 | Joseph et al. |
| 2017/0074089 A1 | 3/2017 | Agarwal et al. |
| 2017/0082110 A1 | 3/2017 | Lammers |
| 2017/0089189 A1 | 3/2017 | Norris et al. |
| 2017/0114613 A1 | 4/2017 | Lecerf et al. |
| 2017/0114625 A1* | 4/2017 | Norris .................. F04B 51/00 |
| 2017/0122310 A1 | 5/2017 | Ladron de Guevara |
| 2017/0145918 A1 | 5/2017 | Oehring et al. |
| 2017/0191350 A1 | 7/2017 | Johns et al. |
| 2017/0218727 A1 | 8/2017 | Oehring et al. |
| 2017/0226839 A1 | 8/2017 | Broussard et al. |
| 2017/0226998 A1 | 8/2017 | Zhang et al. |
| 2017/0227002 A1 | 8/2017 | Mikulski et al. |
| 2017/0233103 A1 | 8/2017 | Teicholz et al. |
| 2017/0234165 A1 | 8/2017 | Kersey et al. |
| 2017/0234308 A1 | 8/2017 | Buckley |
| 2017/0241336 A1 | 8/2017 | Jones et al. |
| 2017/0248034 A1 | 8/2017 | Dzieciol et al. |
| 2017/0248308 A1 | 8/2017 | Makarychev-Mikhailov et al. |
| 2017/0275149 A1 | 9/2017 | Schmidt |
| 2017/0288400 A1 | 10/2017 | Williams |
| 2017/0292409 A1 | 10/2017 | Aguilar et al. |
| 2017/0302135 A1 | 10/2017 | Cory |
| 2017/0305736 A1 | 10/2017 | Haile et al. |
| 2017/0306847 A1 | 10/2017 | Suciu et al. |
| 2017/0322086 A1 | 11/2017 | Luharuka |
| 2017/0333086 A1 | 11/2017 | Jackson |
| 2017/0334448 A1 | 11/2017 | Schwunk |
| 2017/0335842 A1 | 11/2017 | Robinson et al. |
| 2017/0350471 A1 | 12/2017 | Steidl et al. |
| 2017/0370199 A1 | 12/2017 | Witkowski et al. |
| 2017/0370480 A1 | 12/2017 | Witkowski et al. |
| 2018/0034280 A1 | 2/2018 | Pedersen |
| 2018/0038328 A1 | 2/2018 | Louven et al. |
| 2018/0041093 A1 | 2/2018 | Miranda |
| 2018/0045202 A1 | 2/2018 | Crom |
| 2018/0038216 A1 | 3/2018 | Zhang et al. |
| 2018/0058171 A1 | 3/2018 | Roesner et al. |
| 2018/0087499 A1 | 3/2018 | Zhang et al. |
| 2018/0156210 A1 | 6/2018 | Oehring et al. |
| 2018/0172294 A1 | 6/2018 | Owen |
| 2018/0183219 A1 | 6/2018 | Oehring et al. |
| 2018/0186442 A1 | 7/2018 | Maier |
| 2018/0187662 A1 | 7/2018 | Hill et al. |
| 2018/0209415 A1 | 7/2018 | Zhang et al. |
| 2018/0223640 A1 | 8/2018 | Keihany et al. |
| 2018/0224044 A1 | 8/2018 | Penney |
| 2018/0229998 A1 | 8/2018 | Shock |
| 2018/0258746 A1 | 9/2018 | Broussard et al. |
| 2018/0266412 A1 | 9/2018 | Stokkevag et al. |
| 2018/0278124 A1 | 9/2018 | Oehring et al. |
| 2018/0283102 A1 | 10/2018 | Cook |
| 2018/0283618 A1 | 10/2018 | Cook |
| 2018/0284817 A1 | 10/2018 | Cook et al. |
| 2018/0290877 A1 | 10/2018 | Shock |
| 2018/0291781 A1 | 10/2018 | Pedrini |
| 2018/0298731 A1 | 10/2018 | Bishop |
| 2018/0298735 A1 | 10/2018 | Conrad |
| 2018/0307255 A1 | 10/2018 | Bishop |
| 2018/0313456 A1 | 11/2018 | Bayyouk et al. |
| 2018/0328157 A1 | 11/2018 | Bishop |
| 2018/0334893 A1 | 11/2018 | Oehring |
| 2018/0363435 A1 | 12/2018 | Coli et al. |
| 2018/0363436 A1 | 12/2018 | Coli et al. |
| 2018/0363437 A1 | 12/2018 | Coli et al. |
| 2018/0363438 A1 | 12/2018 | Coli et al. |
| 2019/0003272 A1 | 1/2019 | Morris et al. |
| 2019/0003329 A1 | 1/2019 | Morris et al. |
| 2019/0010793 A1 | 1/2019 | Hinderliter |
| 2019/0011051 A1 | 1/2019 | Yeung |
| 2019/0048993 A1 | 2/2019 | Akiyama et al. |
| 2019/0063263 A1 | 2/2019 | Davis et al. |
| 2019/0063341 A1 | 2/2019 | Davis |
| 2019/0067991 A1 | 2/2019 | Davis et al. |
| 2019/0071992 A1 | 3/2019 | Feng |
| 2019/0072005 A1 | 3/2019 | Fisher et al. |
| 2019/0078471 A1 | 3/2019 | Braglia et al. |
| 2019/0091619 A1 | 3/2019 | Huang |
| 2019/0106316 A1 | 4/2019 | Van Vliet et al. |
| 2019/0106970 A1 | 4/2019 | Oehring |
| 2019/0112908 A1 | 4/2019 | Coli et al. |
| 2019/0112910 A1 | 4/2019 | Oehring et al. |
| 2019/0119096 A1 | 4/2019 | Haile et al. |
| 2019/0120024 A1 | 4/2019 | Oehring et al. |
| 2019/0120031 A1 | 4/2019 | Gilje |
| 2019/0120134 A1 | 4/2019 | Goleczka et al. |
| 2019/0128247 A1 | 5/2019 | Douglas, III |
| 2019/0128288 A1 | 5/2019 | Konada et al. |
| 2019/0131607 A1 | 5/2019 | Gillette |
| 2019/0136677 A1 | 5/2019 | Shampine et al. |
| 2019/0153843 A1 | 5/2019 | Headrick |
| 2019/0153938 A1 | 5/2019 | Hammoud |
| 2019/0154020 A1 | 5/2019 | Glass |
| 2019/0155318 A1 | 5/2019 | Meunier |
| 2019/0264667 A1 | 5/2019 | Byrne |
| 2019/0178234 A1 | 6/2019 | Beisel |
| 2019/0178235 A1 | 6/2019 | Coskrey et al. |
| 2019/0185312 A1 | 6/2019 | Bush et al. |
| 2019/0203572 A1 | 7/2019 | Morris et al. |
| 2019/0204021 A1 | 7/2019 | Morris et al. |
| 2019/0211661 A1 | 7/2019 | Reckels et al. |
| 2019/0211814 A1 | 7/2019 | Weightman et al. |
| 2019/0217258 A1 | 7/2019 | Bishop |
| 2019/0226317 A1 | 7/2019 | Payne et al. |
| 2019/0245348 A1 | 8/2019 | Hinderliter et al. |
| 2019/0249652 A1 | 8/2019 | Stephenson et al. |
| 2019/0249754 A1 | 8/2019 | Oehring et al. |
| 2019/0257297 A1 | 8/2019 | Botting et al. |
| 2019/0277279 A1 | 9/2019 | Byrne et al. |
| 2019/0277295 A1 | 9/2019 | Clyburn et al. |

(56) References Cited

U.S. PATENT DOCUMENTS

| | | |
|---|---|---|
| 2019/0309585 A1 | 10/2019 | Miller et al. |
| 2019/0316447 A1 | 10/2019 | Oehring et al. |
| 2019/0316456 A1 | 10/2019 | Beisel et al. |
| 2019/0323337 A1 | 10/2019 | Glass et al. |
| 2019/0330923 A1 | 10/2019 | Gable et al. |
| 2019/0331117 A1 | 10/2019 | Gable et al. |
| 2019/0337392 A1 | 11/2019 | Joshi et al. |
| 2019/0338762 A1 | 11/2019 | Curry et al. |
| 2019/0345920 A1 | 11/2019 | Surjaatmadja et al. |
| 2019/0353103 A1 | 11/2019 | Roberge |
| 2019/0356199 A1 | 11/2019 | Morris et al. |
| 2019/0376449 A1 | 12/2019 | Carrell |
| 2019/0383123 A1 | 12/2019 | Hinderliter |
| 2020/0003205 A1 | 1/2020 | Stokkevåg et al. |
| 2020/0011165 A1 | 1/2020 | George et al. |
| 2020/0040878 A1 | 2/2020 | Morris |
| 2020/0049136 A1 | 2/2020 | Stephenson |
| 2020/0049153 A1 | 2/2020 | Headrick et al. |
| 2020/0071998 A1 | 3/2020 | Oehring et al. |
| 2020/0072201 A1 | 3/2020 | Marica |
| 2020/0088202 A1 | 3/2020 | Sigmar et al. |
| 2020/0095854 A1 | 3/2020 | Hinderliter |
| 2020/0109610 A1 | 4/2020 | Husoy et al. |
| 2020/0132058 A1 | 4/2020 | Mollatt |
| 2020/0141219 A1 | 5/2020 | Oehring et al. |
| 2020/0141907 A1 | 5/2020 | Meek et al. |
| 2020/0166026 A1 | 5/2020 | Marica |
| 2020/0206704 A1 | 7/2020 | Chong |
| 2020/0208733 A1 | 7/2020 | Kim |
| 2020/0223648 A1 | 7/2020 | Herman et al. |
| 2020/0224645 A1 | 7/2020 | Buckley |
| 2020/0232454 A1 | 7/2020 | Chretien et al. |
| 2020/0256333 A1 | 8/2020 | Surjaatmadja |
| 2020/0263498 A1 | 8/2020 | Fischer et al. |
| 2020/0263525 A1 | 8/2020 | Reid |
| 2020/0263526 A1 | 8/2020 | Fischer et al. |
| 2020/0263527 A1 | 8/2020 | Fischer et al. |
| 2020/0263528 A1 | 8/2020 | Fischer et al. |
| 2020/0267888 A1 | 8/2020 | Putz |
| 2020/0291731 A1 | 9/2020 | Haiderer et al. |
| 2020/0295574 A1 | 9/2020 | Batsch-Smith |
| 2020/0309113 A1 | 10/2020 | Hunter et al. |
| 2020/0325752 A1 | 10/2020 | Clark et al. |
| 2020/0325760 A1 | 10/2020 | Markham |
| 2020/0325761 A1 | 10/2020 | Williams |
| 2020/0325893 A1 | 10/2020 | Kraige et al. |
| 2020/0332784 A1 | 10/2020 | Zhang et al. |
| 2020/0332788 A1 | 10/2020 | Cui et al. |
| 2020/0340313 A1 | 10/2020 | Fischer et al. |
| 2020/0340340 A1 | 10/2020 | Oehring et al. |
| 2020/0340344 A1 | 10/2020 | Reckels et al. |
| 2020/0340404 A1 | 10/2020 | Stockstill |
| 2020/0347725 A1 | 11/2020 | Morris et al. |
| 2020/0354928 A1 | 11/2020 | Wehler et al. |
| 2020/0362760 A1 | 11/2020 | Morenko et al. |
| 2020/0362764 A1 | 11/2020 | Saintignan et al. |
| 2020/0370394 A1 | 11/2020 | Cai et al. |
| 2020/0370408 A1 | 11/2020 | Cai et al. |
| 2020/0370429 A1 | 11/2020 | Cai et al. |
| 2020/0371490 A1 | 11/2020 | Cai et al. |
| 2020/0340322 A1 | 12/2020 | Sizemore et al. |
| 2020/0392826 A1 | 12/2020 | Cui et al. |
| 2020/0392827 A1 | 12/2020 | George et al. |
| 2020/0393088 A1 | 12/2020 | Sizemore et al. |
| 2020/0398238 A1 | 12/2020 | Zhong et al. |
| 2020/0400000 A1 | 12/2020 | Ghasripoor et al. |
| 2020/0400005 A1 | 12/2020 | Han et al. |
| 2020/0407625 A1 | 12/2020 | Stephenson |
| 2020/0408071 A1 | 12/2020 | Li et al. |
| 2020/0408144 A1 | 12/2020 | Feng et al. |
| 2020/0408147 A1 | 12/2020 | Zhang et al. |
| 2020/0408149 A1 | 12/2020 | Li et al. |
| 2021/0025324 A1 | 1/2021 | Morris et al. |
| 2021/0025383 A1 | 1/2021 | Bodishbaugh et al. |
| 2021/0032961 A1 | 2/2021 | Hinderliter et al. |
| 2021/0054727 A1 | 2/2021 | Floyd |
| 2021/0071574 A1 | 3/2021 | Feng et al. |
| 2021/0071579 A1 | 3/2021 | Li et al. |
| 2021/0071654 A1 | 3/2021 | Brunson |
| 2021/0071752 A1 | 3/2021 | Cui et al. |
| 2021/0079758 A1 | 3/2021 | Yeung et al. |
| 2021/0079851 A1 | 3/2021 | Yeung et al. |
| 2021/0086851 A1 | 3/2021 | Zhang et al. |
| 2021/0087883 A1 | 3/2021 | Zhang et al. |
| 2021/0087916 A1 | 3/2021 | Zhang et al. |
| 2021/0087925 A1 | 3/2021 | Heidari et al. |
| 2021/0087943 A1 | 3/2021 | Cui et al. |
| 2021/0088042 A1 | 3/2021 | Zhang et al. |
| 2021/0123425 A1 | 4/2021 | Cui et al. |
| 2021/0123434 A1 | 4/2021 | Cui et al. |
| 2021/0123435 A1 | 4/2021 | Cui et al. |
| 2021/0131409 A1 | 5/2021 | Cui et al. |
| 2021/0156240 A1 | 5/2021 | Cicci et al. |
| 2021/0156241 A1 | 5/2021 | Cook |
| 2021/0172282 A1 | 6/2021 | Wang et al. |
| 2021/0180517 A1 | 6/2021 | Zhou et al. |
| 2021/0199110 A1 | 7/2021 | Albert et al. |
| 2021/0222690 A1 | 7/2021 | Beisel |
| 2021/0246774 A1 | 8/2021 | Cui et al. |
| 2021/0285311 A1 | 9/2021 | Ji et al. |
| 2021/0285432 A1 | 9/2021 | Ji et al. |
| 2021/0301807 A1 | 9/2021 | Cui et al. |
| 2021/0306720 A1 | 9/2021 | Sandoval et al. |
| 2021/0308638 A1 | 10/2021 | Zhong et al. |
| 2021/0348475 A1 | 11/2021 | Yeung et al. |
| 2021/0348476 A1 | 11/2021 | Yeung et al. |
| 2021/0348477 A1 | 11/2021 | Yeung et al. |
| 2021/0355927 A1 | 11/2021 | Jian et al. |
| 2021/0372395 A1 | 12/2021 | Li et al. |
| 2021/0388760 A1 | 12/2021 | Feng et al. |
| 2022/0082007 A1 | 3/2022 | Zhang et al. |
| 2022/0090476 A1 | 3/2022 | Zhang et al. |
| 2022/0090477 A1 | 3/2022 | Zhang et al. |
| 2022/0090478 A1 | 3/2022 | Zhang et al. |
| 2022/0112892 A1 | 4/2022 | Cui et al. |
| 2022/0120262 A1 | 4/2022 | Ji et al. |
| 2022/0145740 A1 | 5/2022 | Yuan et al. |
| 2022/0154775 A1 | 5/2022 | Liu et al. |
| 2022/0155373 A1 | 5/2022 | Liu et al. |
| 2022/0162931 A1 | 5/2022 | Zhong et al. |
| 2022/0162991 A1 | 5/2022 | Zhang et al. |
| 2022/0181859 A1 | 6/2022 | Ji et al. |
| 2022/0186724 A1 | 6/2022 | Chang et al. |
| 2022/0213777 A1 | 7/2022 | Cui et al. |
| 2022/0220836 A1 | 7/2022 | Zhang et al. |
| 2022/0224087 A1 | 7/2022 | Ji et al. |
| 2022/0228468 A1 | 7/2022 | Cui et al. |
| 2022/0228469 A1 | 7/2022 | Zhang et al. |
| 2022/0235639 A1 | 7/2022 | Zhang et al. |
| 2022/0235640 A1 | 7/2022 | Mao et al. |
| 2022/0235641 A1 | 7/2022 | Zhang et al. |
| 2022/0235642 A1 | 7/2022 | Zhang et al. |
| 2022/0235802 A1 | 7/2022 | Jiang et al. |
| 2022/0242297 A1 | 8/2022 | Tian et al. |
| 2022/0243613 A1 | 8/2022 | Ji et al. |
| 2022/0243724 A1 | 8/2022 | Li et al. |
| 2022/0250000 A1 | 8/2022 | Zhang et al. |
| 2022/0255319 A1 | 8/2022 | Liu et al. |

FOREIGN PATENT DOCUMENTS

| | | |
|---|---|---|
| CA | 2043184 | 8/1994 |
| CA | 2829762 | 9/2012 |
| CA | 2876687 A1 | 5/2014 |
| CA | 2693567 | 9/2014 |
| CA | 2876687 C | 4/2019 |
| CA | 2964597 | 10/2020 |
| CA | 2919175 | 3/2021 |
| CN | 2622404 | 6/2004 |
| CN | 2779054 | 5/2006 |
| CN | 2890325 | 4/2007 |
| CN | 200964929 Y | 10/2007 |
| CN | 101323151 A | 12/2008 |
| CN | 201190660 Y | 2/2009 |

(56) References Cited

FOREIGN PATENT DOCUMENTS

| | | |
|---|---|---|
| CN | 201190892 Y | 2/2009 |
| CN | 201190893 Y | 2/2009 |
| CN | 101414171 A | 4/2009 |
| CN | 201215073 Y | 4/2009 |
| CN | 201236650 Y | 5/2009 |
| CN | 201275542 Y | 7/2009 |
| CN | 201275801 Y | 7/2009 |
| CN | 201333385 Y | 10/2009 |
| CN | 201443300 U | 4/2010 |
| CN | 201496415 U | 6/2010 |
| CN | 201501365 U | 6/2010 |
| CN | 201507271 U | 6/2010 |
| CN | 101323151 B | 7/2010 |
| CN | 201560210 U | 8/2010 |
| CN | 201581862 U | 9/2010 |
| CN | 201610728 U | 10/2010 |
| CN | 201610751 U | 10/2010 |
| CN | 201618530 U | 11/2010 |
| CN | 201661255 U | 12/2010 |
| CN | 101949382 | 1/2011 |
| CN | 201756927 U | 3/2011 |
| CN | 101414171 B | 5/2011 |
| CN | 102128011 A | 7/2011 |
| CN | 102140898 A | 8/2011 |
| CN | 102155172 A | 8/2011 |
| CN | 102182904 | 9/2011 |
| CN | 202000930 U | 10/2011 |
| CN | 202055781 U | 11/2011 |
| CN | 202082265 U | 12/2011 |
| CN | 202100216 U | 1/2012 |
| CN | 202100217 U | 1/2012 |
| CN | 202100815 U | 1/2012 |
| CN | 202124340 U | 1/2012 |
| CN | 202140051 U | 2/2012 |
| CN | 202140080 U | 2/2012 |
| CN | 202144789 U | 2/2012 |
| CN | 202144943 U | 2/2012 |
| CN | 202149354 U | 2/2012 |
| CN | 102383748 A | 3/2012 |
| CN | 202156297 U | 3/2012 |
| CN | 202158355 U | 3/2012 |
| CN | 202163504 U | 3/2012 |
| CN | 202165236 U | 3/2012 |
| CN | 202180866 U | 4/2012 |
| CN | 202181875 U | 4/2012 |
| CN | 202187744 U | 4/2012 |
| CN | 202191854 U | 4/2012 |
| CN | 202250008 U | 5/2012 |
| CN | 101885307 | 7/2012 |
| CN | 102562020 A | 7/2012 |
| CN | 202326156 U | 7/2012 |
| CN | 202370773 U | 8/2012 |
| CN | 202417397 U | 9/2012 |
| CN | 202417461 U | 9/2012 |
| CN | 102729335 A | 10/2012 |
| CN | 202463955 U | 10/2012 |
| CN | 202463957 U | 10/2012 |
| CN | 202467739 U | 10/2012 |
| CN | 202467801 U | 10/2012 |
| CN | 202531016 U | 11/2012 |
| CN | 202544794 U | 11/2012 |
| CN | 102825039 A | 12/2012 |
| CN | 202578592 U | 12/2012 |
| CN | 202579164 U | 12/2012 |
| CN | 202594808 U | 12/2012 |
| CN | 202594928 U | 12/2012 |
| CN | 202596615 U | 12/2012 |
| CN | 202596616 U | 12/2012 |
| CN | 102849880 A | 1/2013 |
| CN | 102889191 A | 1/2013 |
| CN | 202641535 U | 1/2013 |
| CN | 202645475 U | 1/2013 |
| CN | 202666716 U | 1/2013 |
| CN | 202669645 U | 1/2013 |
| CN | 202669944 U | 1/2013 |
| CN | 202671336 U | 1/2013 |
| CN | 202673269 U | 1/2013 |
| CN | 202751982 U | 2/2013 |
| CN | 102963629 A | 3/2013 |
| CN | 202767964 U | 3/2013 |
| CN | 202789791 U | 3/2013 |
| CN | 202789792 U | 3/2013 |
| CN | 202810717 U | 3/2013 |
| CN | 202827276 U | 3/2013 |
| CN | 202833093 U | 3/2013 |
| CN | 202833370 U | 3/2013 |
| CN | 102140898 B | 4/2013 |
| CN | 202895467 U | 4/2013 |
| CN | 202926404 U | 5/2013 |
| CN | 202935216 U | 5/2013 |
| CN | 202935798 U | 5/2013 |
| CN | 202935816 U | 5/2013 |
| CN | 202970631 U | 6/2013 |
| CN | 103223315 A | 7/2013 |
| CN | 203050598 U | 7/2013 |
| CN | 103233714 A | 8/2013 |
| CN | 103233715 A | 8/2013 |
| CN | 103245523 A | 8/2013 |
| CN | 103247220 A | 8/2013 |
| CN | 103253839 A | 8/2013 |
| CN | 103277290 A | 9/2013 |
| CN | 103321782 A | 9/2013 |
| CN | 203170270 U | 9/2013 |
| CN | 203172509 U | 9/2013 |
| CN | 203175778 U | 9/2013 |
| CN | 203175787 U | 9/2013 |
| CN | 102849880 B | 10/2013 |
| CN | 203241231 U | 10/2013 |
| CN | 203244941 U | 10/2013 |
| CN | 203244942 U | 10/2013 |
| CN | 203303798 U | 11/2013 |
| CN | 102155172 B | 12/2013 |
| CN | 102729335 B | 12/2013 |
| CN | 103420532 A | 12/2013 |
| CN | 203321792 U | 12/2013 |
| CN | 203412658 | 1/2014 |
| CN | 203420697 U | 2/2014 |
| CN | 203480755 U | 3/2014 |
| CN | 103711437 A | 4/2014 |
| CN | 203531815 U | 4/2014 |
| CN | 203531871 U | 4/2014 |
| CN | 203531883 U | 4/2014 |
| CN | 203556164 U | 4/2014 |
| CN | 203558809 U | 4/2014 |
| CN | 203559861 U | 4/2014 |
| CN | 203559893 U | 4/2014 |
| CN | 203560189 U | 4/2014 |
| CN | 102704870 B | 5/2014 |
| CN | 203611843 U | 5/2014 |
| CN | 203612531 U | 5/2014 |
| CN | 203612843 U | 5/2014 |
| CN | 203614062 U | 5/2014 |
| CN | 203614388 U | 5/2014 |
| CN | 203621045 U | 6/2014 |
| CN | 203621046 U | 6/2014 |
| CN | 203621051 U | 6/2014 |
| CN | 203640993 U | 6/2014 |
| CN | 203655221 U | 6/2014 |
| CN | 103899280 A | 7/2014 |
| CN | 103923670 A | 7/2014 |
| CN | 203685052 U | 7/2014 |
| CN | 203716936 U | 7/2014 |
| CN | 103990410 A | 8/2014 |
| CN | 103993869 A | 8/2014 |
| CN | 203754009 U | 8/2014 |
| CN | 203754025 U | 8/2014 |
| CN | 203754341 U | 8/2014 |
| CN | 203756614 U | 8/2014 |
| CN | 203770264 U | 8/2014 |
| CN | 203784519 U | 8/2014 |
| CN | 203784520 U | 8/2014 |
| CN | 104057864 A | 9/2014 |
| CN | 203819819 U | 9/2014 |
| CN | 203823431 U | 9/2014 |

(56) References Cited

FOREIGN PATENT DOCUMENTS

| | | | |
|---|---|---|---|
| CN | 203835337 U | 9/2014 |
| CN | 104074500 A | 10/2014 |
| CN | 203876633 U | 10/2014 |
| CN | 203876636 U | 10/2014 |
| CN | 203877364 U | 10/2014 |
| CN | 203877365 U | 10/2014 |
| CN | 203877375 U | 10/2014 |
| CN | 203877424 U | 10/2014 |
| CN | 203879476 U | 10/2014 |
| CN | 203879479 U | 10/2014 |
| CN | 203890292 U | 10/2014 |
| CN | 203899476 U | 10/2014 |
| CN | 203906206 U | 10/2014 |
| CN | 104150728 A | 11/2014 |
| CN | 104176522 A | 12/2014 |
| CN | 104196464 A | 12/2014 |
| CN | 104234651 A | 12/2014 |
| CN | 203971841 U | 12/2014 |
| CN | 203975450 U | 12/2014 |
| CN | 204020788 U | 12/2014 |
| CN | 204021980 U | 12/2014 |
| CN | 204024625 U | 12/2014 |
| CN | 204051401 U | 12/2014 |
| CN | 204060661 U | 12/2014 |
| CN | 104260672 A | 1/2015 |
| CN | 104314512 A | 1/2015 |
| CN | 204077478 U | 1/2015 |
| CN | 204077526 U | 1/2015 |
| CN | 204078307 U | 1/2015 |
| CN | 204083051 U | 1/2015 |
| CN | 204113168 U | 1/2015 |
| CN | 104340682 A | 2/2015 |
| CN | 104358536 A | 2/2015 |
| CN | 104369687 A | 2/2015 |
| CN | 104402178 A | 3/2015 |
| CN | 104402185 A | 3/2015 |
| CN | 104402186 A | 3/2015 |
| CN | 204209819 U | 3/2015 |
| CN | 204224560 U | 3/2015 |
| CN | 204225813 U | 3/2015 |
| CN | 204225839 U | 3/2015 |
| CN | 104533392 A | 4/2015 |
| CN | 104563938 A | 4/2015 |
| CN | 104563994 A | 4/2015 |
| CN | 104563995 A | 4/2015 |
| CN | 104563998 A | 4/2015 |
| CN | 104564033 A | 4/2015 |
| CN | 204257122 U | 4/2015 |
| CN | 204283610 U | 4/2015 |
| CN | 204283782 U | 4/2015 |
| CN | 204297682 U | 4/2015 |
| CN | 204299810 U | 4/2015 |
| CN | 103223315 B | 5/2015 |
| CN | 104594857 A | 5/2015 |
| CN | 104595493 A | 5/2015 |
| CN | 104612647 A | 5/2015 |
| CN | 104612928 A | 5/2015 |
| CN | 104632126 A | 5/2015 |
| CN | 204325094 U | 5/2015 |
| CN | 204325098 U | 5/2015 |
| CN | 204326983 U | 5/2015 |
| CN | 204326985 U | 5/2015 |
| CN | 204344040 U | 5/2015 |
| CN | 204344095 U | 5/2015 |
| CN | 104727797 A | 6/2015 |
| CN | 204402414 U | 6/2015 |
| CN | 204402423 U | 6/2015 |
| CN | 204402450 U | 6/2015 |
| CN | 103247220 B | 7/2015 |
| CN | 104803568 A | 7/2015 |
| CN | 204436360 U | 7/2015 |
| CN | 204457524 U | 7/2015 |
| CN | 204472485 U | 7/2015 |
| CN | 204473625 U | 7/2015 |
| CN | 204477303 U | 7/2015 |
| CN | 204493095 U | 7/2015 |
| CN | 204493309 U | 7/2015 |
| CN | 103253839 B | 8/2015 |
| CN | 104820372 A | 8/2015 |
| CN | 104832093 A | 8/2015 |
| CN | 104863523 A | 8/2015 |
| CN | 204552723 U | 8/2015 |
| CN | 204553866 U | 8/2015 |
| CN | 204571831 U | 8/2015 |
| CN | 204703814 U | 10/2015 |
| CN | 204703833 U | 10/2015 |
| CN | 204703834 U | 10/2015 |
| CN | 105092401 A | 11/2015 |
| CN | 103233715 B | 12/2015 |
| CN | 103790927 | 12/2015 |
| CN | 105207097 | 12/2015 |
| CN | 204831952 U | 12/2015 |
| CN | 204899777 U | 12/2015 |
| CN | 102602323 | 1/2016 |
| CN | 105240064 A | 1/2016 |
| CN | 204944834 | 1/2016 |
| CN | 205042127 U | 2/2016 |
| CN | 205172478 U | 4/2016 |
| CN | 103993869 B | 5/2016 |
| CN | 105536299 A | 5/2016 |
| CN | 105545207 A | 5/2016 |
| CN | 205260249 | 5/2016 |
| CN | 103233714 B | 6/2016 |
| CN | 104340682 B | 6/2016 |
| CN | 205297518 U | 6/2016 |
| CN | 205298447 U | 6/2016 |
| CN | 205391821 U | 7/2016 |
| CN | 205400701 U | 7/2016 |
| CN | 103277290 B | 8/2016 |
| CN | 104260672 B | 8/2016 |
| CN | 205477370 U | 8/2016 |
| CN | 205479153 U | 8/2016 |
| CN | 205503058 U | 8/2016 |
| CN | 205503068 U | 8/2016 |
| CN | 205503089 U | 8/2016 |
| CN | 105958098 A | 9/2016 |
| CN | 205599180 | 9/2016 |
| CN | 205599180 U | 9/2016 |
| CN | 106121577 A | 11/2016 |
| CN | 205709587 | 11/2016 |
| CN | 104612928 B | 12/2016 |
| CN | 106246120 A | 12/2016 |
| CN | 205805471 | 12/2016 |
| CN | 106321045 A | 1/2017 |
| CN | 205858306 | 1/2017 |
| CN | 106438310 A | 2/2017 |
| CN | 205937833 | 2/2017 |
| CN | 104563994 B | 3/2017 |
| CN | 206129196 | 4/2017 |
| CN | 104369687 B | 5/2017 |
| CN | 106715165 | 5/2017 |
| CN | 106761561 A | 5/2017 |
| CN | 105240064 B | 6/2017 |
| CN | 206237147 | 6/2017 |
| CN | 206287832 | 6/2017 |
| CN | 206346711 | 7/2017 |
| CN | 104563995 B | 9/2017 |
| CN | 107120822 | 9/2017 |
| CN | 107143298 A | 9/2017 |
| CN | 107159046 A | 9/2017 |
| CN | 107188018 A | 9/2017 |
| CN | 206496016 | 9/2017 |
| CN | 104564033 B | 10/2017 |
| CN | 107234358 A | 10/2017 |
| CN | 107261975 A | 10/2017 |
| CN | 206581929 | 10/2017 |
| CN | 104820372 B | 12/2017 |
| CN | 105092401 B | 12/2017 |
| CN | 107476769 A | 12/2017 |
| CN | 107520526 A | 12/2017 |
| CN | 206754664 | 12/2017 |
| CN | 107605427 A | 1/2018 |
| CN | 106438310 B | 2/2018 |
| CN | 107654196 A | 2/2018 |

(56) References Cited

FOREIGN PATENT DOCUMENTS

| | | |
|---|---|---|
| CN | 107656499 A | 2/2018 |
| CN | 107728657 A | 2/2018 |
| CN | 206985503 | 2/2018 |
| CN | 207017968 | 2/2018 |
| CN | 107859053 A | 3/2018 |
| CN | 207057867 | 3/2018 |
| CN | 207085817 | 3/2018 |
| CN | 105545207 B | 4/2018 |
| CN | 107883091 A | 4/2018 |
| CN | 107902427 A | 4/2018 |
| CN | 107939290 A | 4/2018 |
| CN | 107956708 | 4/2018 |
| CN | 207169595 | 4/2018 |
| CN | 207194873 | 4/2018 |
| CN | 207245674 | 4/2018 |
| CN | 108034466 A | 5/2018 |
| CN | 108036071 A | 5/2018 |
| CN | 108087050 A | 5/2018 |
| CN | 207380566 | 5/2018 |
| CN | 108103483 A | 6/2018 |
| CN | 108179046 A | 6/2018 |
| CN | 108254276 A | 7/2018 |
| CN | 108311535 A | 7/2018 |
| CN | 207583576 | 7/2018 |
| CN | 207634064 | 7/2018 |
| CN | 207648054 | 7/2018 |
| CN | 207650621 | 7/2018 |
| CN | 108371894 A | 8/2018 |
| CN | 207777153 | 8/2018 |
| CN | 108547601 A | 9/2018 |
| CN | 108547766 A | 9/2018 |
| CN | 108555826 A | 9/2018 |
| CN | 108561098 A | 9/2018 |
| CN | 108561750 A | 9/2018 |
| CN | 108590617 A | 9/2018 |
| CN | 207813495 | 9/2018 |
| CN | 207814698 | 9/2018 |
| CN | 207862275 | 9/2018 |
| CN | 108687954 A | 10/2018 |
| CN | 207935270 | 10/2018 |
| CN | 207961582 | 10/2018 |
| CN | 207964530 | 10/2018 |
| CN | 108789848 A | 11/2018 |
| CN | 108799473 | 11/2018 |
| CN | 108868675 A | 11/2018 |
| CN | 208086829 | 11/2018 |
| CN | 208089263 | 11/2018 |
| CN | 208169068 | 11/2018 |
| CN | 108979569 A | 12/2018 |
| CN | 109027662 A | 12/2018 |
| CN | 109058092 A | 12/2018 |
| CN | 208179454 | 12/2018 |
| CN | 208179502 | 12/2018 |
| CN | 208253147 | 12/2018 |
| CN | 208260574 | 12/2018 |
| CN | 109114418 A | 1/2019 |
| CN | 109141990 A | 1/2019 |
| CN | 208313120 | 1/2019 |
| CN | 208330319 | 1/2019 |
| CN | 208342730 | 1/2019 |
| CN | 208430982 | 1/2019 |
| CN | 208430986 | 1/2019 |
| CN | 109404274 A | 3/2019 |
| CN | 109429610 A | 3/2019 |
| CN | 109491318 A | 3/2019 |
| CN | 109515177 A | 3/2019 |
| CN | 109526523 A | 3/2019 |
| CN | 109534737 A | 3/2019 |
| CN | 208564504 | 3/2019 |
| CN | 208564516 | 3/2019 |
| CN | 208564525 | 3/2019 |
| CN | 208564918 | 3/2019 |
| CN | 208576026 | 3/2019 |
| CN | 208576042 | 3/2019 |
| CN | 208650818 | 3/2019 |
| CN | 208669244 | 3/2019 |
| CN | 109555484 A | 4/2019 |
| CN | 109682881 A | 4/2019 |
| CN | 208730959 | 4/2019 |
| CN | 208735264 | 4/2019 |
| CN | 208746733 | 4/2019 |
| CN | 208749529 | 4/2019 |
| CN | 208750405 | 4/2019 |
| CN | 208764658 | 4/2019 |
| CN | 109736740 A | 5/2019 |
| CN | 109751007 A | 5/2019 |
| CN | 208868428 | 5/2019 |
| CN | 208870761 | 5/2019 |
| CN | 109869294 A | 6/2019 |
| CN | 109882144 A | 6/2019 |
| CN | 109882372 A | 6/2019 |
| CN | 209012047 | 6/2019 |
| CN | 209100025 | 7/2019 |
| CN | 110080707 A | 8/2019 |
| CN | 110118127 A | 8/2019 |
| CN | 110124574 A | 8/2019 |
| CN | 110145277 A | 8/2019 |
| CN | 110145399 A | 8/2019 |
| CN | 110152552 A | 8/2019 |
| CN | 110155193 A | 8/2019 |
| CN | 110159225 A | 8/2019 |
| CN | 110159432 | 8/2019 |
| CN | 110159432 A | 8/2019 |
| CN | 110159433 A | 8/2019 |
| CN | 110208100 A | 9/2019 |
| CN | 110252191 A | 9/2019 |
| CN | 110284854 A | 9/2019 |
| CN | 110284972 A | 9/2019 |
| CN | 209387358 | 9/2019 |
| CN | 110374745 A | 10/2019 |
| CN | 209534736 | 10/2019 |
| CN | 110425105 A | 11/2019 |
| CN | 110439779 A | 11/2019 |
| CN | 110454285 A | 11/2019 |
| CN | 110454352 A | 11/2019 |
| CN | 110467298 A | 11/2019 |
| CN | 110469312 A | 11/2019 |
| CN | 110469314 A | 11/2019 |
| CN | 110469405 A | 11/2019 |
| CN | 110469654 A | 11/2019 |
| CN | 110485982 A | 11/2019 |
| CN | 110485983 A | 11/2019 |
| CN | 110485984 A | 11/2019 |
| CN | 110486249 A | 11/2019 |
| CN | 110500255 A | 11/2019 |
| CN | 110510771 A | 11/2019 |
| CN | 110513097 A | 11/2019 |
| CN | 209650738 | 11/2019 |
| CN | 209653968 | 11/2019 |
| CN | 209654004 | 11/2019 |
| CN | 209654022 | 11/2019 |
| CN | 209654128 | 11/2019 |
| CN | 209656622 | 11/2019 |
| CN | 107849130 B | 12/2019 |
| CN | 108087050 B | 12/2019 |
| CN | 110566173 A | 12/2019 |
| CN | 110608030 A | 12/2019 |
| CN | 110617187 A | 12/2019 |
| CN | 110617188 A | 12/2019 |
| CN | 110617318 A | 12/2019 |
| CN | 209740823 | 12/2019 |
| CN | 209780827 | 12/2019 |
| CN | 209798631 | 12/2019 |
| CN | 209799942 | 12/2019 |
| CN | 209800178 | 12/2019 |
| CN | 209855723 | 12/2019 |
| CN | 209855742 | 12/2019 |
| CN | 209875063 | 12/2019 |
| CN | 110656919 A | 1/2020 |
| CN | 107520526 B | 2/2020 |
| CN | 110787667 A | 2/2020 |
| CN | 110821464 A | 2/2020 |
| CN | 110833665 A | 2/2020 |
| CN | 110848028 A | 2/2020 |

(56) References Cited

FOREIGN PATENT DOCUMENTS

| | | |
|---|---|---|
| CN | 210049880 | 2/2020 |
| CN | 210049882 | 2/2020 |
| CN | 210097596 | 2/2020 |
| CN | 210105817 | 2/2020 |
| CN | 210105818 | 2/2020 |
| CN | 210105993 | 2/2020 |
| CN | 110873093 A | 3/2020 |
| CN | 210139911 | 3/2020 |
| CN | 110947681 A | 4/2020 |
| CN | 111058810 A | 4/2020 |
| CN | 111075391 A | 4/2020 |
| CN | 210289931 | 4/2020 |
| CN | 210289932 | 4/2020 |
| CN | 210289933 | 4/2020 |
| CN | 210303516 | 4/2020 |
| CN | 211412945 | 4/2020 |
| CN | 111089003 A | 5/2020 |
| CN | 111151186 A | 5/2020 |
| CN | 111167769 A | 5/2020 |
| CN | 111169833 A | 5/2020 |
| CN | 111173476 A | 5/2020 |
| CN | 111185460 A | 5/2020 |
| CN | 111185461 A | 5/2020 |
| CN | 111188763 A | 5/2020 |
| CN | 111206901 A | 5/2020 |
| CN | 111206992 A | 5/2020 |
| CN | 111206994 A | 5/2020 |
| CN | 210449044 | 5/2020 |
| CN | 210460875 | 5/2020 |
| CN | 210522432 | 5/2020 |
| CN | 210598943 | 5/2020 |
| CN | 210598945 | 5/2020 |
| CN | 210598946 | 5/2020 |
| CN | 210599194 | 5/2020 |
| CN | 210599303 | 5/2020 |
| CN | 210600110 | 5/2020 |
| CN | 111219326 A | 6/2020 |
| CN | 111350595 A | 6/2020 |
| CN | 210660319 | 6/2020 |
| CN | 210714569 | 6/2020 |
| CN | 210769168 | 6/2020 |
| CN | 210769169 | 6/2020 |
| CN | 210769170 | 6/2020 |
| CN | 210770133 | 6/2020 |
| CN | 210825844 | 6/2020 |
| CN | 210888904 | 6/2020 |
| CN | 210888905 | 6/2020 |
| CN | 210889242 | 6/2020 |
| CN | 111397474 A | 7/2020 |
| CN | 111412064 A | 7/2020 |
| CN | 111441923 A | 7/2020 |
| CN | 111441925 A | 7/2020 |
| CN | 111503517 A | 8/2020 |
| CN | 111515898 A | 8/2020 |
| CN | 111594059 A | 8/2020 |
| CN | 111594062 A | 8/2020 |
| CN | 111594144 A | 8/2020 |
| CN | 211201919 | 8/2020 |
| CN | 211201920 | 8/2020 |
| CN | 211202218 | 8/2020 |
| CN | 111608965 A | 9/2020 |
| CN | 111664087 A | 9/2020 |
| CN | 111677476 A | 9/2020 |
| CN | 111677647 A | 9/2020 |
| CN | 111692064 A | 9/2020 |
| CN | 111692065 A | 9/2020 |
| CN | 211384571 | 9/2020 |
| CN | 211397553 | 9/2020 |
| CN | 211397677 | 9/2020 |
| CN | 211500955 | 9/2020 |
| CN | 211524765 | 9/2020 |
| DE | 4004854 | 8/1991 |
| DE | 4241614 | 6/1994 |
| DE | 102012018825 | 3/2014 |
| DE | 102013111655 | 12/2014 |
| DE | 102015103872 | 10/2015 |
| DE | 102013114335 | 12/2020 |
| EP | 0835983 | 4/1998 |
| EP | 1378683 | 1/2004 |
| EP | 2143916 | 1/2010 |
| EP | 2613023 | 7/2013 |
| EP | 3095989 | 11/2016 |
| EP | 3211766 | 8/2017 |
| EP | 3049642 | 4/2018 |
| EP | 3354866 | 8/2018 |
| EP | 3075946 | 5/2019 |
| FR | 2795774 | 6/1999 |
| GB | 474072 | 10/1937 |
| GB | 1438172 | 6/1976 |
| JP | S57135212 | 2/1984 |
| KR | 20020026398 | 4/2002 |
| RU | 13562 | 4/2000 |
| WO | 1993020328 | 10/1993 |
| WO | 2006025886 | 3/2006 |
| WO | 2009023042 | 2/2009 |
| WO | 20110133821 | 10/2011 |
| WO | 2012139380 | 10/2012 |
| WO | 2013158822 | 10/2013 |
| WO | PCT/CN2012/074945 | 11/2013 |
| WO | 2013185399 | 12/2013 |
| WO | 2015158020 | 10/2015 |
| WO | 2016/014476 | 1/2016 |
| WO | WO 2016/014476 * | 1/2016 |
| WO | 2016033983 | 3/2016 |
| WO | 2016078181 | 5/2016 |
| WO | 2016101374 | 6/2016 |
| WO | 2016112590 | 7/2016 |
| WO | 2017123656 A | 7/2017 |
| WO | 2017146279 | 8/2017 |
| WO | 2017213848 | 12/2017 |
| WO | 2018031029 | 2/2018 |
| WO | 2018038710 | 3/2018 |
| WO | 2018044293 | 3/2018 |
| WO | 2018044307 | 3/2018 |
| WO | 2018071738 | 4/2018 |
| WO | 2018101909 | 6/2018 |
| WO | 2018101912 | 6/2018 |
| WO | 2018106210 | 6/2018 |
| WO | 2018106225 | 6/2018 |
| WO | 2018106252 | 6/2018 |
| WO | 2018/132106 | 7/2018 |
| WO | 2018156131 | 8/2018 |
| WO | 2018075034 | 10/2018 |
| WO | 2018187346 | 10/2018 |
| WO | 2018031031 | 2/2019 |
| WO | 2019045691 | 3/2019 |
| WO | 2019046680 | 3/2019 |
| WO | 2019060922 | 3/2019 |
| WO | 2019117862 | 6/2019 |
| WO | 2019126742 | 6/2019 |
| WO | 2019147601 | 8/2019 |
| WO | 2019169366 | 9/2019 |
| WO | 2019195651 | 10/2019 |
| WO | 2019200510 | 10/2019 |
| WO | 2019210417 | 11/2019 |
| WO | 2020018068 | 1/2020 |
| WO | 2020046866 | 3/2020 |
| WO | 2020072076 | 4/2020 |
| WO | 2020076569 | 4/2020 |
| WO | 2020097060 | 5/2020 |
| WO | 2020104088 | 5/2020 |
| WO | 2020131085 | 6/2020 |
| WO | 2020211083 | 10/2020 |
| WO | 2020211086 | 10/2020 |
| WO | 2021/038604 | 3/2021 |
| WO | 2021038604 | 3/2021 |
| WO | 2021041783 | 3/2021 |

OTHER PUBLICATIONS

Capstone Turbine Corporation, Capstone Receives Three Megawatt Order from Large Independent Oil & Gas Company in Eagle Ford Shale Play, Dec. 7, 2010.

(56) References Cited

OTHER PUBLICATIONS

Wikipedia, Westinghouse Combustion Turbine Systems Division, https://en.wikipedia.org/wiki/Westinghouse_Combustion_Turbine_Systems_Division, circa 1960.
Wikipedia,Union Pacific GTELs, https://en.wikipedia.org/wiki/Union_Pacific_GTELs, circa 1950.
HCI JET Frac, Screenshots from YouTube, Dec. 11, 2010. https://www.youtube.com/watch?v=6HjXkdbFaFQ.
AFD Petroleum Ltd., Automated Hot Zone, Frac Refueling System, Dec. 2018.
Eygun, Christiane, et al., URTeC: 2687987, Mitigating Shale Gas Developments Carbon Footprint: Evaluating and Implementing Solutions in Argentina, Copyright 2017, Unconventional Resources Technology Conference.
Walzel, Brian, Hart Energy, Oil, Gas Industry Discovers Innovative Solutions to Environmental Concerns, Dec. 10, 2018.
Frac Shack, Bi-Fuel FracFueller brochure, 2011.
Pettigrew, Dana, et al., High Pressure Multi-Stage Centrifugal Pump for 10,000 psi Frac Pump—HPHPS Frac Pump, Copyright 2013, Society of Petroleum Engineers, SPE 166191.
Elle Seybold, et al., Evolution of Dual Fuel Pressure Pumping for Fracturing: Methods, Economics, Field Trial Results and Improvements in Availability of Fuel, Copyright 2013, Society of Petroleum Engineers, SPE 166443.
Wallace, E.M., Associated Shale Gas: From Flares to Rig Power, Copyright 2015, Society of Petroleum Engineers, SPE-173491-MS.
Williams, C.W. (Gulf Oil Corp. Odessa Texas), The Use of Gas-turbine Engines in an Automated High-Pressure Water-injection Stations; American Petroleum Institute; API-63-144 (Jan. 1, 1963).
Neal, J.C. (Gulf Oil Corp. Odessa Texas), Gas Turbine Driven Centrifugal Pumps for High Pressure Water Injection; American Institute of Mining, Metallurgical and Petroleum Engineers, Inc.; SPE-1888 (1967).
Porter, John A. (Solar Division International Harvester Co.), Modern Industrial Gas Turbines for the Oil Field; American Petroleum Institute; Drilling and Production Practice; API-67-243 (Jan. 1, 1967).
Cooper et al., Jet Frac Porta-Skid—A New Concept in Oil Field Service Pump Equipments[sic]; Halliburton Services; SPE-2706 (1969).
Ibragimov, É.S., Use of gas-turbine engines in oil field pumping units; Chem Petrol Eng; (1994) 30: 530. https://doi.org/10.1007/BF01154919. (Translated from Khimicheskaya i Neftyanoe Mashinostroenie, No. 11, pp. 24-26, Nov. 1994.).
Kas'yanov et al., Application of gas-turbine engines in pumping units complexes of hydraulic fracturing of oil and gas reservoirs; Exposition Oil & Gas; (Oct. 2012) (published in Russian).
SPM® QEM 5000 E-Frac Pump Specification Sheet, Weir Group (2019) ("Weir 5000").
Green Field Energy Services Natural Gas Driven Turbine Frac Pumps HHP Summit Presentation, Yumpu (Sep. 2012), https://www.yumpu.com/en/document/read/49685291/turbine-frac-pump-assembly-hhp ("Green Field").
Dowell B908 "Turbo-Jet" Operator's Manual.
Jereh Debut's Super power Turbine Fracturing Pump, Leading the Industrial Revolution, Jereh Oilfield Services Group (Mar. 19, 2014), https://www.prnewswire.com/news-releases/jereh-debuts-super-power-turbine-fracturing-pump-leading-the-industrial-revolution-250992111.html.
Jereh Apollo 4500 Turbine Frac Pumper Finishes Successful Field Operation in China, Jereh Group (Feb. 13, 2015), as available on Apr. 20, 2015, https://web.archive.org/web/20150420220625/https://www. prnewswire.com/news-releases/jereh-apollo-4500-turbine-frac-pumper-finishes-successful-field-operation-in-china-300035829.html.
35% Economy Increase, Dual-fuel System Highlighting Jereh Apollo Frac Pumper, Jereh Group (Apr. 13, 2015), https://www.jereh.com/en/news/press-release/news-detail-7345.htm.
Hydraulic Fracturing: Gas turbine proves successful in shale gas field operations, Vericor (2017), https://www.vericor.com/wp-content/uploads/2020/02/7.-Fracing-4500hp-Pump-China-En.pdf ("Vericor Case Study").
Jereh Apollo Turbine Fracturing Pumper Featured on China Central Television, Jereh Group (Mar. 9, 2018), https://www.jereh.com/en/news/press-release/news-detail-7267.htm.
Jereh Unveiled New Electric Fracturing Solution at OTC 2019, Jereh Group (May 7, 2019), as available on May 28, 2019, https://web.archive.org/web/20190528183906/https://www.pmewswire.com/news-releases/jereh-unveiled-new-electric-fracturing-solution-at-otc-2019-300845028.html.
Jereh Group, Jereh Fracturing Unit, Fracturing Spread, YouTube (Mar. 30, 2015), https://www.youtube.com/watch?v=PlkDbU5dE0o.
Transcript of Jereh Group, Jereh Fracturing Unit, Fracturing Spread, YouTube (Mar. 30, 2015).
Jereh Group, Jereh Fracturing Equipment. YouTube (Jun. 8, 2015), https://www.youtube.com/watch?v=m0vMiq84P4Q.
Transcript of Jereh Group, Jereh Fracturing Equipment, YouTube (Jun. 8, 2015), https://www.youtube.com/watch?v=m0vMiq84P4Q.
Ferdinand P. Beer et al., Mechanics of Materials (6th ed. 2012).
Weir Oil & Gas Introduces Industry's First Continuous Duty 5000-Horsepower Pump, Weir Group (Jul. 25, 2019), https://www.global.weir/newsroom/news-articles/weir-oil-and-gas-introduces-industrys-first-continuous-duty-5000-horsepower-pump/.
2012 High Horsepower Summit Agenda, Natural Gas for High Horsepower Applications (Sep. 5, 2012).
Review of HHP Summit 2012, Gladstein, Neandross & Associates https://www.gladstein.org/gna-conferences/high-horsepower-summit-2012/.
Green Field Energy Services Deploys Third New Hydraulic Fracturing System, Green Field Energy Services, Inc. (Jul. 11, 2012), https://www.prnewswire.com/news-releases/green-field-energy-services-deploys-third-new-hydraulic-fracturing-spread-162113425.
Karen Boman, Turbine Technology Powers Green Field Multi-Fuel Frack Pump, Rigzone (Mar. 7, 2015), as available on Mar. 14, 2015, https://web.archive.org/web/20150314203227/https://www.rigzone.com/news/oil-gas/a/124883/Turbine_Technology_Powers_Green_Field_MultiFuel_Frack_Pump.
"Turbine Frac Units," WMD Squared (2012), https://wmdsquared.com/work/gfes-turbine-frac-units/.
Leslie Turj, Green Field asset sale called 'largest disposition industry has seen,' The INDsider Media (Mar. 19, 2014), http://theind.com/article-16497-green-field-asset-sale-called-%E2%80%98largest-disposition-industry-has-seen%60.html.
American Petroleum Institute. API 674: Positive Displacement Pumps—Reciprocating. 3rd ed. Washington, DC: API Publishing Services, 2010.
American Petroleum Institute. API 616: Gas Turbines for the Petroleum, Chemical, and Gas Industry Services. 5th ed. Washington, DC: API Publishing Services, 2011.
Karassik, Igor, Joseph Messina, Paul Cooper, and Charles Heald. Pump Handbook. 4th ed. New York: McGraw-Hill Education, 2008.
Weir SPM. Weir SPM General Catalog: Well Service Pumps, Flow Control Products, Manifold Trailers, Safety Products, Post Sale Services. Ft. Worth, TX: Weir Oil & Gas. May 28, 2016. https://www.pumpfundamentals.com/pumpdatabase2/weir-spm-general.pdf.
The Weir Group, Inc. Weir SPM Pump Product Catalog. Ft. Worth, TX: S.P.M. Flow Control, Inc. Oct. 30, 2017. https://manage.global.weir/assets/files/product%20brochures/SPM_2P140706_Pump_Product_Catalogue_View.pdf.
Shandong Saigao Group Corporation. Q4 (5W115) Quintuplex Plunger Pump. Jinan City, Shandong Province, China: Saigao Oct. 20, 2014. https://www.saigaogroup.com/product/q400-5w115-quintuplex-plunger-pump.html.
Marine Turbine. Turbine Powered Frac Units. Franklin, Louisiana: Marine Turbine Technologies, 2020.
Rotating Right. Quintuplex Power Pump Model Q700. Edmonton, Alberta, Canada: Weatherford International Ltd. https://www.rotatingright.com/pdf/weatherford/RR%2026-Weatherford%20Model%20Q700.pdf, 2021.

(56) References Cited

OTHER PUBLICATIONS

CanDyne Pump Services, Inc. Weatherford Q700 Pump. Calgary, Alberta, Canada: CanDyne Pump Services. Aug. 15, 2015. http://candyne.com/wp-content/uploads/2014/10/181905-94921.q700-quintuplex-pump.pdf.
Arop, Julius Bankong. Geomechanical review of hydraulic fracturing technology. Thesis (M. Eng.). Cambridge, MA: Massachusetts Institute of Technology, Dept. of Civil and Environmental Engineering. Oct. 29, 2013. https://dspace.mit.edu/handle/1721.1/82176.
ResearchGate, Answer by Byron Woolridge, found at https://www.researchgate.net/post/How_can_we_improve_the_efficiency_of_the_gas_turbine_cycles, Jan. 1, 2013.
Filipović, Ivan, Preliminary Selection of Basic Parameters of Different Torsional Vibration Dampers Intended for use in Medium-Speed Diesel Engines, Transactions of Famena XXXVI-3 (2012).
Marine Turbine Technologies, 1 MW Power Generation Package, http://marineturbine.com/power-generation, 2017.
Business Week: Fiber-optic cables help fracking, cablinginstall.com. Jul. 12, 2013. https://www.cablinginstall.com/cable/article/16474208/businessweek-fiberoptic-cables-help-fracking.
Fracking companies switch to electric motors to power pumps, iadd-intl.org. Jun. 27, 2019. https://www.iadd-intl.org/articles/fracking-companies-switch-to-electric-motors-to-power-pumps/.
The Leader in Frac Fueling, suncoastresources.com. Jun. 29, 2015. https://web.archive.org/web/20150629220609/https://www.suncoastresources.com/oilfield/fueling-services/.
Mobile Fuel Delivery, atlasoil.com. Mar. 6, 2019. https://www.atlasoil.com/nationwide-fueling/onsite-and-mobile-fueling.
Frac Tank Hose (FRAC), 4starhose.com. Accessed: Nov. 10, 2019. http://www.4starhose.com/product/frac_tank_hose_frac.aspx.
Plos One, Dynamic Behavior of Reciprocating Plunger Pump Discharge Valve Based on Fluid Structure Interaction and Experimental Analysis. Oct. 21, 2015.
FMC Technologies, Operation and Maintenance Manual, L06 Through L16 Triplex Pumps Doc No. OMM50000903 Rev: E p. 1 of 66. Aug. 27, 2009.
Gardner Denver Hydraulic Fracturing Pumps GD 3000 https://www.gardnerdenver.com/en-us/pumps/triplex-fracking-pump-gd-3000.
Lekontsev, Yu M., et al. "Two-side sealer operation." Journal of Mining Science 49.5 (2013): 757-762.
Tom Hausfeld, GE Power & Water, and Eldon Schelske, Evolution Well Services, TM2500+ Power for Hydraulic Fracturing.
FTS International's Dual Fuel Hydraulic Fracturing Equipment Increases Operational Efficiencies, Provides Cost Benefits, Jan. 3, 2018.
CNG Delivery, Fracturing with natural gas, dual-fuel drilling with CNG, Aug. 22, 2019.
PbNG, Natural Gas Fuel for Drilling and Hydraulic Fracturing, Diesel Displacement / Dual Fuel & Bi-Fuel, May 2014.
Integrated Flow, Skid-mounted Modular Process Systems, https://ifsolutions.com/.
Dameron, A Schlumberger Company, Frac Manifold Systems, 2016.
ZSi-Foster, Energy | Solar | Fracking | Oil and Gas, https://www.zsi-foster.com/energy-solar-fracking-oil-and-gas.html.
JBG Enterprises, Inc., WS-Series Blowout Prevention Safety Coupling—Quick Release Couplings, http://www.jgbhose.com/products/WS-Series-Blowout-Prevention-Safety-Coupling.asp.
Halliburton, Vessel-based Modular Solution (VMS), 2015.
Chun, M. K., H. K. Song, and R. Lallemand. "Heavy duty gas turbines in petrochemical plants: Samsung's Daesan plant (Korea) beats fuel flexibility records with over 95% hydrogen in process gas." Proceedings of PowerGen Asia Conference, Singapore. 1999.
Wolf, Jürgen J., and Marko A. Perkavec. "Safety Aspects and Environmental Considerations for a 10 MW Cogeneration Heavy Duty Gas Turbine Burning Coke Oven Gas with 60% Hydrogen Content." ASME 1992 International Gas Turbine and Aeroengine Congress and Exposition. American Society of Mechanical Engineers Digital Collection, 1992.

Ginter, Timothy, and Thomas Bouvay. "Uprate options for the MS7001 heavy duty gas turbine." GE paper GER-3808C, GE Energy 12 (2006).
Chaichan, Miqdam Tariq. "The impact of equivalence ratio on performance and emissions of a hydrogen-diesel dual fuel engine with cooled exhaust gas recirculation." International Journal of Scientific & Engineering Research 6.6 (2015): 938-941.
Ecob, David J., et al. "Design and Development of a Landfill Gas Combustion System for the Typhoon Gas Turbine." ASME 1996 International Gas Turbine and Aeroengine Congress and Exhibition. American Society of Mechanical Engineers Digital Collection, 1996.
II-VI Marlow Industries, Thermoelectric Technologies in Oil, Gas, and Mining Industries, blog.marlow.com (Jul. 24, 2019).
B.M. Mahlalela, et al., .Electric Power Generation Potential Based on Waste Heat and Geothermal Resources in South Africa, pangea.stanford.edu (Feb. 11, 2019).
Department of Energy, United States of America, The Water-Energy Nexus: Challenges and Opportunities ourenergypolicy.org (Jun. 2014).
Ankit Tiwari, Design of a Cooling System for a Hydraulic Fracturing Equipment, The Pennsylvania State University, The Graduate School, College of Engineering, 2015.
Jp Yadav et al., Power Enhancement of Gas Turbine Plant by Intake Air Fog Cooling, Jun. 2015.
Mee Industries: Inlet Air Fogging Systems for Oil, Gas and Petrochemical Processing, Verdict Media Limited Copyright 2020.
M. Ahmadzadehtalatapeh et al.Performance enhancement of gas turbine units by retrofitting with inlet air cooling technologies (IACTs): an hour-by-hour simulation study, Journal of the Brazilian Society of Mechanical Sciences and Engineering, Mar. 2020.
Advances in Popular Torque-Link Solution Offer OEMs Greater Benefit, Jun. 21, 2018.
Emmanuel Akita et al., Mewbourne College of Earth & Energy, Society of Petroleum Engineers; Drilling Systems Automation Technical Section (DSATS); 2019.
PowerShelter Kit II, nooutage.com, Sep. 6, 2019.
EMPengineering.com, HEMP Resistant Electrical Generators / Hardened Structures HEMP/GMD Shielded Generators, Virginia.
Blago Minovski, Coupled Simulations of Cooling and Engine Systems for Unsteady Analysis of the Benefits of Thermal Engine Encapsulation, Department of Applied Mechanics, Chalmers University of Technology Goteborg, Sweden 2015.
J. Porteiro et al., Feasibility of a new domestic CHP trigeneration with heat pump: II. Availability analysis. Design and development, Applied Thermal Engineering 24 (2004) 1421-1429.
AFGlobal Corporation, Durastim Hydraulic Fracturing Pump, A Revolutionary Design for Continuous Duty Hydraulic Fracturing, 2018.
ISM, What is Cracking Pressure, 2019.
Swagelok, The right valve for controlling flow direction? Check, 2016.
Technology.org, Check valves how do they work and what are the main type, 2018.
"Honghua developing new-generation shale-drilling rig, plans testing of frac pump"; Katherine Scott; Drilling Contractor; May 23, 2013; accessed at https://www.drillingcontractor.org/honghua-developing-new-generation-shale-drilling-rig-plans-testing-of-frac-pump-23278.
De Gevigney et al., "Analysis of no-load dependent power losses in a planetary gear train by using thermal network method", International Gear Conference 2014: Aug. 26-28, 2014, Lyon, pp. 615-624.
Special-Purpose Couplings for Petroleum, Chemical, and Gas Industry Services, API Standard 671 (4th Edition) (2010).
The Application of Flexible Couplings for Turbomachinery, Jon R.Mancuso et al., Proceedings of the EighteenthTurbomachinery Symposium (1989).
Pump Control With Variable Frequency Drives, Kevin Tory, Pumps & Systems: Advances in Motors and Drives, Reprint from Jun. 2008.
Fracture Design and Stimulation, Mike Eberhard, P.E., WellConstruction & Operations Technical Workshop inSupport of the EPA Hydraulic Fracturing Study, Mar. 10-11, 2011.

(56) References Cited

OTHER PUBLICATIONS

General Purpose vs. Special Purpose Couplings, Jon Mancuso, Proceedings of the Twenty-Third TurboMachinerySymposium (1994).
Overview of Industry Guidance/Best Practices on Hydraulic Fracturing (HF), American Petroleum Institute, © 2012.
API Member Companies, American Petroleum Institute, WaybackMachine Capture, https://web.archive.org/web/20130424080625/http://api.org/globalitems/globalheaderpages/membership/api-member-companies, accessed Jan. 4, 2021.
API's Global Industry Services, American Petroleum Institute, © Aug. 2020.
About API, American Petroleum Institute, https://www.api.org/about, accessed Dec. 30, 2021.
About API, American Petroleum Institute, WaybackMachine Capture, https://web.archive.org/web/20110422104346 / http://api.org/aboutapi/, captured Apr. 22, 2011.
Publications, American Petroleum Institute, WaybackMachine Capture, https://web.archive.org/web/20110427043936 /http://www.api.org:80/Publications/, captured Apr. 27, 2011.
Procedures for Standards Development, American Petroleum Institute, Third Edition (2006).
WorldCat Library Collections Database Records for API Standard 671 and API Standard 674, https://www.worldcat.org/title/positive-displacement-pumps-reciprocating/oclc/ 858692269&referer=brief_results, accessed Dec. 30, 2021; and https://www.worldcat.org/title/special-purpose-couplings-for-petroleum-chemical-and-gas-industry-services/oclc/871254217&referer=brief_results, accessed Dec. 22, 2021.
2011 Publications and Services, American Petroleum Institute (2011).
Standards, American Petroleum Institute, WaybackMachine Capture, https://web.archive.org/web/20110207195046/http:/www.api.org/Standards/, captured Feb. 7, 2011; and https://web.archive.org/web/20110204112554/http://global.ihs.com/?RID=API1, captured Feb. 4, 2011.
IHS Markit Standards Store, https://global.ihs.com/doc_detail.cfm?document_name=API%20STD%20674&item_s_key=00010672#doc-detail-history-anchor, accessed Dec. 30, 2021; and https://global.ihs.com/doc_detail.cfm?&input_doc _number=671 &input_doc_title=&document_name=API%20STD%20671&item_s_key=00010669&item_key_date=890331&origin=DSSC, accessed Dec. 30, 2021.
Dziubak, Tadeusz, "Experimental Studies of Dust Suction Irregularity from Multi-Cyclone Dust Collector of Two-Stage Air Filter", Energies 2021, 14, 3577, 28 pages.

\* cited by examiner

SYSTEMS AND METHODS OF UTILIZATION OF A HYDRAULIC FRACTURING UNIT PROFILE TO OPERATE HYDRAULIC FRACTURING UNITS

PRIORITY CLAIM

This U.S. non-provisional patent application claims priority to and the benefit of, under 35 U.S.C. § 119(e), U.S. Provisional Application No. 62/705,628, filed Jul. 8, 2020 titled "USE OF A PUMP PROFILER AND HEALTH MONITORING FUNCTION TO OPERATE HYDRAULIC FRACTURING PUMPS AND ASSOCIATED METHODS," and U.S. Provisional Application No. 62/705,357, filed Jun. 23, 2020, titled "THE USE OF A PUMP PROFILER AND HEALTH MONITORING FUNCTION TO OPERATE HYDRAULIC FRACTURING PUMPS AND ASSOCIATED METHODS," the disclosures of both of which are incorporated herein by reference in their entirety.

TECHNICAL FIELD

The present disclosure relates to methods and systems for enhancing operation of hydraulic fracturing equipment at a hydraulic fracturing wellsite.

BACKGROUND

Hydrocarbon exploration and energy industries employ various systems and operations to accomplish activities including drilling, formation evaluation, stimulation and production. Hydraulic fracturing may be utilized to produce oil and gas economically from low permeability reservoir rocks or other formations, for example, shale, at a wellsite. During a hydraulic fracturing stage, slurry may be pumped, via hydraulic fracturing pumps, under high pressure to perforations, fractures, pores, faults, or other spaces in the reservoir rocks or formations. The slurry may be pumped at a rate faster than the reservoir rocks or formation may accept. As the pressure of the slurry builds, the reservoir rocks or formation may fail and begin to fracture further. As the pumping of the slurry continues, the fractures may expand and extend in different directions away from a well bore. Once the reservoir rocks or formations are fractured, the hydraulic fracturing pumps may remove the slurry. As the slurry is removed, proppants in the slurry may be left behind and may prop or keep open the newly formed fractures, thus preventing the newly formed fractures from closing or, at least, reducing contracture of the newly formed fractures. Further, after the slurry is removed and the proppants left behind, production streams of hydrocarbons may be obtained from the reservoir rocks or formation.

For a wellsite, a plurality of hydraulic fracturing stages may be performed. Further, each hydraulic fracturing stage may require configuration of many and various hydraulic fracturing equipment. For example, prior to a next hydraulic fracturing stage, an operator or user may enter multiple data points for that next hydraulic fracturing stage for each piece of equipment, such as, for hydraulic fracturing pumps, a blender, a chemical additive unit, a hydration unit, a conveyor, and/or other hydraulic fracturing equipment located at the wellsite. As each hydraulic fracturing stage arises, hydraulic fracturing units may be utilized. After hydraulic fracturing stages, hydraulic fracturing units may require or may soon after require maintenance, based on several factors, such as prior use or fluid/consumable levels. Each hydraulic fracturing unit may require a user to physically inspect the units to determine a maintenance schedule. Such tasks may be inaccurately interpreted and time consuming.

SUMMARY

Accordingly, Applicant has recognized a need for methods and system to enhance operation of hydraulic fracturing equipment at a hydraulic fracturing wellsite. The present disclosure may address one or more of the above-reference drawbacks, as well as other potential drawbacks.

As referenced above, due to a large number of hydraulic fracturing stages and the large number of hydraulic fracturing equipment associated with the hydraulic fracturing stages, monitoring hydraulic fracturing equipment health and determining potential maintenance periods may be difficult, complex, and time-consuming, and may introduce error, for example, utilizing equipment requiring maintenance. Further, missing maintenance may result in equipment life being reduced, thus resulting in a potential breakdown of the equipment.

The present disclosure generally is directed to methods and systems for operating hydraulic fracturing equipment at a hydraulic fracturing wellsite. In some embodiments, the methods and systems may provide for efficient and enhanced operation of the hydraulic fracturing equipment, for example, during setup, maintenance, or as through hydraulic fracturing equipment stages or operations.

According to an embodiment of the disclosure, a wellsite hydraulic fracturing system may include one or more hydraulic fracturing units. The one or more hydraulic fracturing units, when positioned at a hydraulic fracturing wellsite, may be configured to provide a slurry to a wellhead in hydraulic fracturing pumping stages. Each of the one or more hydraulic fracturing units may include an internal combustion engine, a local controller for the internal combustion engine, and engine sensors disposed on the internal combustion engine. Each of the one or more hydraulic fracturing units may include a transmission connected to the internal combustion engine, transmission sensors disposed on the transmission, and a local controller for the transmission. The hydraulic fracturing unit may include a pump connected to the transmission. The pump may be powered by the internal combustion engine via the transmission. The hydraulic fracturing unit may include a local controller for the pump and pump sensors disposed on the pump.

The wellsite hydraulic fracturing system may include a supervisory controller to control the hydraulic fracturing units, the supervisory controller being positioned in signal communication with a terminal and, for each of the one or more hydraulic fracturing units, the engine sensors, the transmission sensors, the pump sensors, the local controller for the internal combustion engine, and the local controller for the pump. The supervisory controller may include a processor and memory storing instructions. The processor may be configured to execute instructions stored in memory. The instructions, when executed by the processor, may be configured to, for each of the one or more hydraulic fracturing units, obtain hydraulic fracturing unit parameters from the local controller of the internal combustion engine, the local controller of the pump, the engine sensors, the transmission sensors, and the pump sensors. The hydraulic fracturing unit parameters may include one or more of hydraulic fracturing unit data, a hydraulic fracturing unit configuration, a hydraulic fracturing health rating, and a hydraulic fracturing unit alarm history. The supervisory controller may include instructions, when executed by the processor, to determine a hydraulic fracturing unit health assessment for each of the one or more hydraulic fracturing units based on, at least in part, the hydraulic fracturing unit data, the hydraulic fracturing unit configuration, the hydraulic fracturing health rating, and the hydraulic fracturing unit alarm history. The supervisory controller may include instructions, when executed by the processor, to build a hydraulic unit profile for each of the one or more with the hydraulic fracturing units to include the hydraulic fracturing unit health assessment and hydraulic fracturing unit parameters. The supervisory controller may, based on a hydraulic fracturing unit's hydraulic fracturing health assessment, determine the hydraulic fracturing unit's capability to be operated at a maximum power output.

According to another embodiment of the disclosure, a supervisory controller for a hydraulic fracturing system may include a first control output in signal communication with one or more pump controllers, each pump controller being included on a pump and each pump being included on a hydraulic fracturing unit. The supervisory controller may be configured to, for each of the one or more pump controllers, obtain a set of pump information. The pump information may include one or more of the number of hours of use of the pump, the pump's plunger size, the pump's stroke size, the pump's maximum speed, the pump's health efficiency, and/or an age of the pump. The supervisory controller may include a second control output in signal communication with one or more hydraulic fracturing unit controllers, each hydraulic fracturing unit controller being included on a hydraulic fracturing unit. The supervisory controller may be configured to, for each of the one or more hydraulic fracturing unit controllers, obtain a set of maintenance data. The set of maintenance data may include one or more of the number of hours to next engine maintenance, the number of hours to next transmission maintenance, an oil change log, pump valve and seat (V&S) hours, packing hours, total pump strokes, average V&S hours, and average packing hours. As will be understood by those skilled in the art, each of the one or more hydraulic fracturing unit controllers may include one or more alarm conditions to be communicated to the supervisory controller. The supervisory controller may be configured to, for each of the one or more hydraulic fracturing unit controllers, obtain a set of operation data. The operation data may include one or more of the maximum hydraulic power produced during a previous hydraulic fracturing stage, a maximum hydraulic power utilized, a minimum hydraulic power utilized, an average hydraulic power, a maximum pressure produced, a maximum flow produced, a maximum pump speed, and/or a user override register. The supervisory controller may be configured, for each of the one or more hydraulic fracturing unit controllers, to obtain a set of equipment health ratings. The equipment health ratings may include one or more of the engine health, engine power rating based on engine health, transmission health, transmission deration based on health, pump health, and/or pump deration based on health. The supervisory controller may be configured to, for each of the one or more hydraulic fracturing unit controllers, obtain a set of equipment configurations. The set of equipment configurations may include one or more of engine model, engine serial number, transmission model, transmission serial number, pump model, pump serial number, fluid end model, and/or fluid end serial number. The supervisory controller may be configured to, for each of the one or more hydraulic fracturing unit controllers, obtain a set of equipment alarm history. The set of equipment alarm history may include one or more of life reduction event counter total, life reduction event for current week, pump cavitation event counter total, pump cavitation event counter for current week, pump pulsation event counter total, pump pulsation event counter for current week, emergency shutdown counter total, and/or emergency shutdown counter for current week. The supervisory controller may include a third control output in signal communication with one or more engine controllers, each engine controller being included on an engine and each engine being included on the hydraulic fracturing unit. The supervisory controller may be configured to, for each of the one or more engine controllers, obtain a set of engine information. The set of engine information may include one or more of the number of hours of use of the engine, the engine's available power, the engine's installation age, and/or the engine's efficiency health. The supervisory controller may include a fourth control output in signal communication with one or more transmission controllers, each transmission controller being included on a transmission and each transmission being included on the hydraulic fracturing unit. The supervisory controller may be configured to, for each of the one or more transmission controllers, obtain a set of transmission information. The set of transmission information may include the number of hours of use of the transmission, the transmission's installation age, and/or the transmission's efficiency health. The supervisory controller may include a terminal input/output socket in signal communication with a terminal. In response to a determination that pump information, maintenance data, operation data, equipment health ratings, equipment configuration, equipment health ratings, equipment alarm history, and engine information for each of the hydraulic fracturing units is received, the supervisory controller may be configured to build a pump profile for each of the hydraulic fracturing units. Each pump profile may include the pump information, maintenance data, operation data, equipment health ratings, equipment configuration, equipment alarm history, and engine information. Further, the supervisory controller may be configured to determine a health assessment for each of the hydraulic fracturing units, based on, at least in part, the equipment health ratings and the pump profile for each of the hydraulic fracturing units. Further still, the supervisory controller may be configured to add the health assessment to the pump profile. The supervisory controller may be configured to determine which of the one or more hydraulic fracturing units to utilize in a hydraulic fracturing operation based on the pump profile.

According to another embodiment of the disclosure, a method of utilizing a pump profile to operate hydraulic fracturing pumps for a hydraulic fracturing system may include determining if one or more pump controllers are available. Each of the one or more pump controllers may be associated with a pump of a hydraulic fracturing unit. The method may also include, in response to an availability of one or more pump controllers and for each pump associated with the one or more pump controllers, obtaining pump assembly data, pump maintenance data, and pump event and alarm history data. The method may further include determining a pump maintenance cycle based on the pump maintenance data and pump event and alarm history data. The method also may include determining maximum pump flow, maximum pump pressure, and maximum pump speed, indicated by, for example, rotations per minute (RPM), based on pump assembly data, pump maintenance data, and pump event and alarm history data.

The method may further include determining if one or more engine controllers are available. Each of the one or more engine controllers may be associated with an engine of the hydraulic fracturing unit. The method still further may include, in response to an availability of one or more engine controllers and for each engine associated with the one or more engine controllers, obtaining engine assembly data, engine maintenance data, and engine event and alarm history data. The method also may include determining life expectancy of consumables associated with the engine based on the engine maintenance data and engine event and alarm history data. The method may further include determining engine maintenance cycles based on the pump maintenance data and pump even and alarm history data. The method also may include determining maximum power output based on engine assembly data, engine maintenance data, and pump event and alarm history data. The method may include determining which of the hydraulic fracturing units to utilize for a hydraulic fracturing operation based on each hydraulic fracturing unit profile.

The method further may include building a hydraulic fracturing unit profile for each of the hydraulic fracturing units, including pump and engine data and determined characteristics. The pump and engine data and determined characteristics may include one or more of (a) pump assembly data, (b) pump maintenance data, (c) pump event and alarm history data, (d) the pump maintenance cycle, (e) the maximum pump flow, (f) the maximum pump pressure, (g) the maximum pump speed, (h) engine assembly data, (i) engine maintenance data, (j) engine event and alarm history data, (k) the engine maintenance cycle, and/or (l) the maximum power output.

Still other aspects and advantages of these embodiments and other embodiments, are discussed in detail herein. Moreover, it is to be understood that both the foregoing information and the following detailed description provide merely illustrative examples of various aspects and embodiments, and are intended to provide an overview or framework for understanding the nature and character of the claimed aspects and embodiments. Accordingly, these and other objects, along with advantages and features of the present disclosure, will become apparent through reference to the following description and the accompanying drawings. Furthermore, it is to be understood that the features of the various embodiments described herein are not mutually exclusive and may exist in various combinations and permutations.

BRIEF DESCRIPTION OF THE DRAWINGS

The accompanying drawings, which are included to provide a further understanding of the embodiments of the present disclosure, are incorporated in and constitute a part of this specification, illustrate embodiments of the present disclosure, and together with the detailed description, serve to explain principles of the embodiments discussed herein. No attempt is made to show structural details of this disclosure in more detail than may be necessary for a fundamental understanding of the embodiments discussed herein and the various ways in which they may be practiced. According to common practice, the various features of the drawings discussed below are not necessarily drawn to scale. Dimensions of various features and elements in the drawings may be expanded or reduced to more clearly illustrate embodiments of the disclosure.

DETAILED DESCRIPTION

Figure 1:
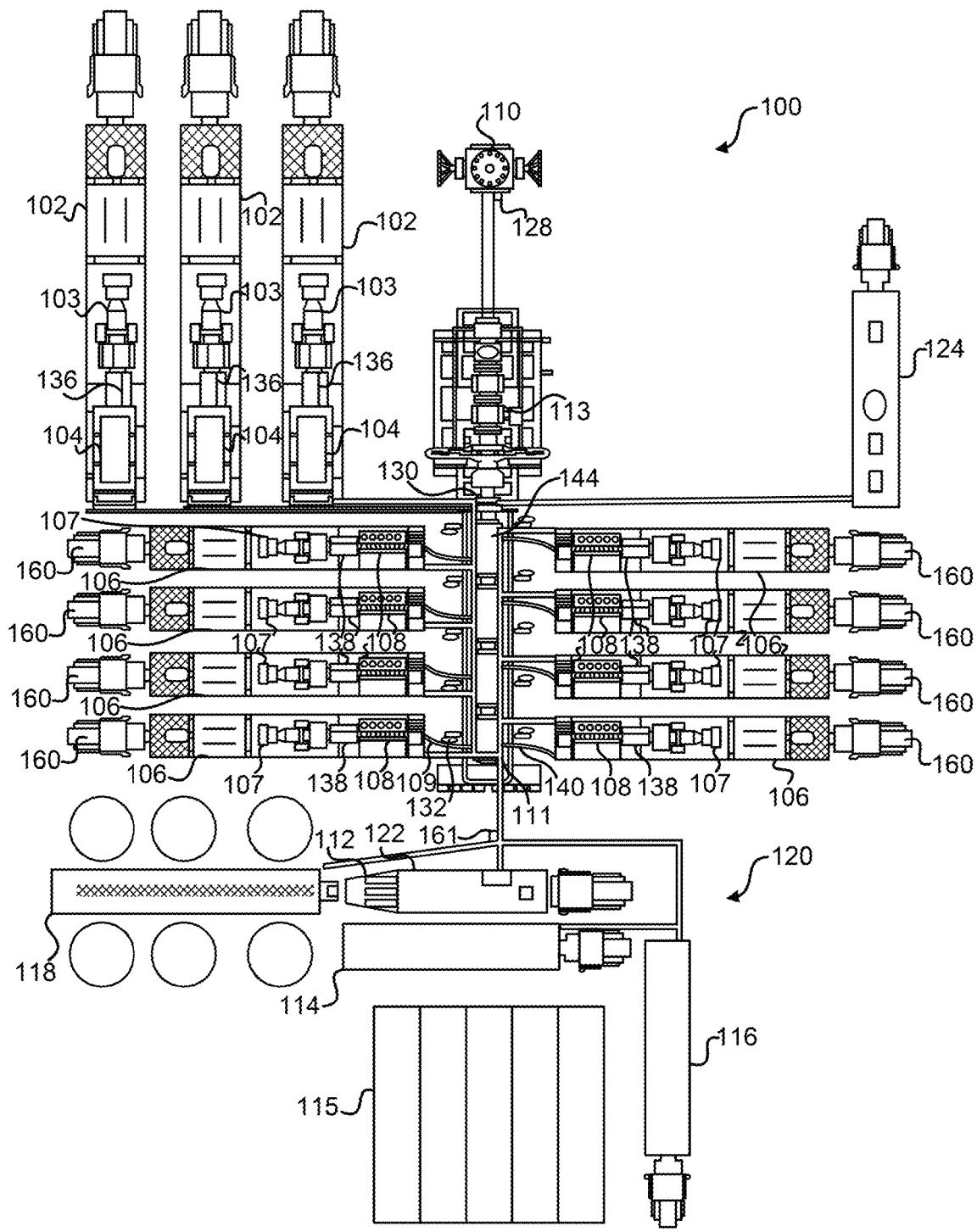
FIG. 1 is a top plan schematic view of an example wellsite hydraulic fracturing system, according to an embodiment of the disclosure.

The present disclosure will now be described more fully hereinafter with reference to example embodiments thereof with reference to the drawings in which like reference numerals designate identical or corresponding elements in each of the several views. These example embodiments are described so that this disclosure will be thorough and complete, and will fully convey the scope of the disclosure to those skilled in the art. Features from one embodiment or aspect may be combined with features from any other embodiment or aspect in any appropriate combination. For example, any individual or collective features of method aspects or embodiments may be applied to apparatus, product, or component aspects or embodiments and vice versa. The disclosure may be embodied in many different forms and should not be construed as limited to the embodiments set forth herein; rather, these embodiments are provided so that this disclosure will satisfy applicable legal requirements. As used in the specification and the appended claims, the singular forms "a," "an," "the," and the like include plural referents unless the context clearly dictates otherwise. In addition, while reference may be made herein to quantitative measures, values, geometric relationships or the like, unless otherwise stated, any one or more if not all of these may be absolute or approximate to account for acceptable variations that may occur, such as those due to manufacturing or engineering tolerances or the like.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to," unless otherwise stated. Thus, the use of such terms is meant to encompass the items listed thereafter, and equivalents thereof, as well as additional items. The transitional phrases "consisting of" and "consisting essentially of," are closed or semi-closed transitional phrases, respectively, with respect to any claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish claim elements.

Embodiments of the present disclosure are directed to methods and systems for enhancing operation of hydraulic fracturing equipment at a hydraulic fracturing wellsite. The methods and systems detailed herein may be executed on a controller which controls all equipment at the hydraulic fracturing wellsite and may provide various determinations, prompts, and/or requests in relation to hydraulic fracturing pumps and/or engines to provide power to the hydraulic fracturing pumps.

FIG. 1 is a top-down schematic view of a wellsite hydraulic fracturing system 100, according to an embodiment. The wellsite hydraulic fracturing system 100 may include a plurality of mobile power units 102 to drive electrical generators 104. The electrical generators 104 may provide electrical power to the wellsite hydraulic fracturing system 100. In other words, the electric generators 104 may provide electrical power to hydraulic fracturing equipment at the wellsite hydraulic fracturing system 100. In such examples, the mobile power units 102 may include an internal combustion engine 103. The internal combustion engine 103 may connect to a source of fuel. The internal combustion engine 103 may be a gas turbine engine (GTE) or a reciprocating-piston engine. In another example, other types of engines may be utilized to provide energy. In another embodiment, the electrical generators 104 may power the backside equipment 120.

In another example, the GTEs may be dual-fuel or bi-fuel. In other words, the GTE may be operable using two or more different types of fuel, such as natural gas and diesel fuel, or other types of fuel. A dual-fuel or bi-fuel GTE may be operable using a first type of fuel, a second type of fuel, and/or a combination of the first type of fuel and the second type of fuel. For example, the fuel may include gaseous fuels, such as, compressed natural gas (CNG), natural gas, field gas, pipeline gas, methane, propane, butane, and/or liquid fuels, such as, diesel fuel (e.g., #2 diesel), bio-diesel fuel, bio-fuel, alcohol, gasoline, gasohol, aviation fuel, and other fuels. The gaseous fuels may be supplied by CNG bulk vessels, a gas compressor, a liquid natural gas vaporizer, line gas, and/or well-gas produced natural gas. Other types and associated fuel supply sources are contemplated. The one or more internal combustion engines 103 may be operated to provide power or horse power to drive the transmission 136 connected to the electrical generators to provide electrical power to the hydraulic fracturing equipment at the wellsite hydraulic fracturing system 100.

The wellsite hydraulic fracturing system 100 may also include one or more hydraulic fracturing units 160. The hydraulic fracturing units 160 may include a plurality of mobile power units 106 to drive hydraulic fracturing pumps 108. The mobile power units 106 may include an internal combustion engine 107 (e.g., a GTE or reciprocating-piston engine), other engine, or power source. The hydraulic fracturing pumps 108 may be directly-driven turbine (DDT) hydraulic fracturing pumps. In such examples, the internal combustion engine 107 may connect to a DDT hydraulic fracturing pump via transmission 138 connected to a drive shaft, the drive shaft connected to an input flange of the DDT hydraulic fracturing pump. Other engine-to-pump connections may be utilized. In another embodiment, the mobile power units 106 may include auxiliary internal combustion engines, auxiliary electric generators, backup power sources, and/or some combination thereof.

In another example, the hydraulic fracturing pumps 108 may be positioned around a wellhead 110 and may discharge, at a high pressure, slurry to a manifold 144 such that the slurry may be provided to the wellhead 110 for a hydraulic fracturing stage, as will be understood by those skilled in the art. In such examples, each of the hydraulic fracturing pumps 108 may discharge the slurry through high-pressure discharge lines 109 to flow lines 111 on manifold 144. The flow lines 111 may connect to or combine at the manifold 144. The manifold 144 may provide the slurry to a manifold assembly 113. The manifold assembly 113 may provide the slurry to the one or more wellheads 110. After a hydraulic fracturing stage is complete, some portion of the slurry may return to a flowback manifold (not shown). From the flowback manifold, the slurry may flow to a flowback tank (not shown).

In an embodiment, the slurry may refer to a mixture of fluid (such as water), proppants, and chemical additives. The proppants may be small granules, for example, sand, ceramics, gravel, other particulates, and/or some combination thereof. Further, the granules may be coated in resin. As noted above, once fractures are introduced in reservoir rocks or formations and the slurry is drained or pumped back, the proppants may remain and "prop," or keep open, the newly formed fractures, thus preventing the newly formed fractures from closing or, at least, reducing contracture of the newly formed fractures. Further, chemicals may be added to the slurry. For example, the chemicals may be thickening agents, gels, dilute acids, biocides, breakers, corrosion inhibitors, friction reducers, potassium chloride, oxygen scavengers, pH adjusting agents, scale inhibitors, and/or surfactants. Other chemical additives may be utilized.

The wellsite hydraulic fracturing system 100 may also include a blender unit 112, a hydration unit 114, a chemical additive unit 116, and a conveyor 118, one or more of which may referred to as backside equipment 120. In an embodiment, for a hydraulic fracturing stage, the blender unit 112 may provide an amount of slurry at a specified flow rate to the hydraulic fracturing pumps 108, the slurry to be discharged by the hydraulic fracturing pumps 108 to the wellhead 110 (as described above). The flow rate for slurry from the blender unit 112 may be determined by a sensor such as a flow meter (e.g., a blender flow rate meter 161). Further, the conveyor 118 may provide proppant to a mixer 122 of the blender unit 112. The conveyor 118 may include a conveyor belt, an auger, a chute (e.g., including a mechanism to allow passage of a specified amount of proppant), and/or other equipment to move or transfer proppant to the blender unit 112, as will be understood by those skilled in the art. Further still, the hydration unit 114 may provide a specified amount of fluid, from water tanks 115, and chemicals, from the chemical additive unit 116, to the mixer 122 of the blender unit 112. The chemical additive unit 116 may provide a specified amount and type of chemicals to hydration unit 114. The mixer 122 of the blender unit 112 may mix the fluid, proppant, and chemicals to create the slurry to be utilized by the hydraulic fracturing pumps 108. As noted above, the blender unit 112 may then pressurize and discharge the slurry from hose 142 to flow line 140 to the hydraulic fracturing pumps 108.

In another example, the wellsite hydraulic fracturing system 100 or a portion of the wellsite hydraulic fracturing system 100 may be mobile or portable. Such mobility may allow for the wellsite hydraulic fracturing system 100 to be assembled or disassembled quickly. For example, a majority of the hydraulic fracturing equipment may be included on trailers attached to vehicles or on the vehicles. When a wellsite starts hydraulic fracturing stages (e.g., hydraulic fracturing operations and/or jobs), the hydraulic fracturing equipment may be brought to the wellsite, assembled, and utilized and when the hydraulic fracturing stages are completed, the hydraulic fracturing equipment may be disassembled and transported to another wellsite. In such examples, data or hydraulic fracturing stage parameters may be retained by a supervisory controller 124 or another computing device.

The wellsite hydraulic fracturing system 100 may also include a control unit, a control center, a data van, a data center, a computing device, a controller, and/or a supervisory controller 124 to monitor and/or control operations of hydraulic fracturing equipment at the wellsite. In other words, the supervisory controller 124 or any of the other devices or systems noted above may be in signal communication with the hydraulic fracturing equipment. For example, the supervisory controller 124 may be in signal communication, to transmit and receive signals, with components, other controllers, and/or sensors included on or with the mobile power units 102 driving the electrical generators 104, the electrical generators 104, the internal combustion engines 103, the hydraulic fracturing units 160, the mobile power units 106 driving the hydraulic fracturing pumps 108, the hydraulic fracturing pumps 108, the internal combustion engines 107, the manifold 144, the wellhead 110, the flow line 111, the hose 142, the backside equipment 120, or some combination thereof. Further, other equipment may be included in the same location as the supervisory controller 124, such as a display or terminal, an input device, other computing devices, and/or other electronic devices.

As used herein, "signal communication" refers to electric communication such as hard wiring two components together or wireless communication, as will be understood by those skilled in the art. For example, wireless communication may be Wi-Fi®, Bluetooth®, ZigBee®, or forms of near field communications. In addition, signal communication may include one or more intermediate controllers or relays disposed between elements that are in signal communication with one another.

In another embodiment, the supervisory controller 124 may be in signal communication with a display, terminal and/or a computing device, as well as associated input devices. Further, the display may be included with a computing device. The computing device may include a user interface, the user interface to be displayed on the display. In such examples, the user interface may be a graphical user interface (GUI). In another example, the user interface may be an operating system. In such examples, the operating system may include various firmware, software, and/or drivers that allow a user to communicate or interface with, via input devices, the hardware of the computing device and, thus, with the supervisory controller 124. The supervisory controller 124 may provide data, a user interface, a GUI, and/or a window with various data points and interactive selections based on a pump profile, an engine profile, and/or a hydraulic fracturing unit profile. Such data may be provided via instructions stored in memory of the supervisory controller 124, the instructions to be executed by a processor of the supervisory controller 124. The computing device may include other peripherals or input devices, such as a mouse, a pointer device, a keyboard, a touchscreen, and/or other input devices. The supervisory controller 124 may communicate, send, or transmit prompts, requests, dashboards, or notifications to the display (e.g., through the computing device to the display). As used herein, "user" may refer to an operator, a single operator, a person, or any personnel at, or remote from, the wellsite hydraulic fracturing system 100. In another embodiment, a user may send data, for example, through data entry, via an input device, into a computing device associated with the display for a hydraulic fracturing stage profile, from the display to the supervisory controller 124. The user may send responses, for example, through user selection of a prompt, via the input device, or on the display, from the display to the supervisory controller 124.

In an embodiment, the supervisory controller 124 may be in signal communication with the backside equipment 120 to control the hydraulic fracturing stage parameters for a hydraulic fracturing stage. In other words, the supervisory controller 124 may communicate the hydraulic fracturing stage parameters to and/or control the backside equipment 120 for a current hydraulic fracturing stage. Further, the supervisory controller 124 may communicate with controllers of the backside equipment 120. For example, the supervisory controller 124 may transmit, to controller 150 the chemical additive unit 116, the amount and type of chemicals to be sent to the hydration unit 114 for the current hydraulic fracturing stage. The supervisory controller 124 may also transmit, through the signal communication, the amount of fluid, to the controller 148 of the hydration unit 114, to provide to the mixer 122 of the blender unit 112 for the current hydraulic fracturing stage. Further, the supervisory controller 124 may also transmit, through the signal communication, the amount and type of proppant, to the controller 152 of the conveyor 118, to provide to the mixer 122 of the blender unit 112 for the current hydraulic fracturing stage. Further still, the supervisory controller 124 may transmit, through the signal communication, to a controller 154 of the blender unit 112 the flow rate of the slurry from the blender unit 112 to a set of the hydraulic fracturing pumps 108 for the current hydraulic fracturing stage. The supervisory controller 124 may also be in signal communication with the hydraulic fracturing pumps 108 and/or a controller 146 of the hydraulic fracturing pumps 108 to control or transmit the flow rate (minimum and/or maximum flow rate) of the discharge of the slurry from the set of the hydraulic fracturing pumps 108, the maximum pressure of the slurry, and/or the pressure rating (e.g., a minimum and/or maximum pressure rate) of the slurry for the current hydraulic fracturing stage. Each of the one or more hydraulic fracturing unit controllers may include one or more alarms, alarm conditions, events, and/or event conditions to be communicated to the supervisory controller 124. For example, a controller 146 of a hydraulic fracturing pump may store conditions for when to generate an alarm and/or event and/or a history of prior generated alarms and/or events.

The supervisory controller 124 may also be in signal communication with various sensors, equipment, controllers and/or other components disposed around and on the hydraulic fracturing equipment at the wellsite hydraulic fracturing system 100. For example, the supervisory controller 124 may receive a measurement of pressure and flow rate of the slurry being delivered to the wellhead 110 from a wellhead pressure transducer 128, the pressure and flow rate of the slurry at a manifold pressure transducer 130, the pressure of the slurry at a hydraulic fracturing pump output pressure transducer 132, and/or data related to each of the hydraulic fracturing pumps 108 from a hydraulic fracturing pump profiler. The wellhead pressure transducer 128 may be disposed at the wellhead 110 to measure a pressure of the fluid at the wellhead 110. While the manifold pressure transducer 130 may be disposed at the end of the manifold 144 (as shown in FIG. 1), it will be understood by those skilled in the art, that the pressure within the manifold 144 may be substantially the same throughout the entire manifold 144 such that the manifold pressure transducer 130 may be disposed anywhere within the manifold 144 to provide a pressure of the fluid being delivered to the wellhead 110. The hydraulic fracturing pump output pressure transducer 132 may be disposed adjacent an output of one of the hydraulic fracturing pumps 108, which may be in fluid communication with the manifold 144 and thus, the fluid at the output of the hydraulic fracturing pumps 108 may be at substantially the same pressure as the fluid in the manifold 144 and the fluid being provided to the wellhead 110. Each of the hydraulic fracturing pumps 108 may include a hydraulic fracturing pump output pressure transducer 132 and the supervisory controller 124 may determine the fluid pressure provided to the wellhead 110 as an average of the fluid pressure measured by each of the hydraulic fracturing pump output pressure transducers 132.

One or more of the hydraulic fracturing units 160 may include a hydraulic fracturing pump profiler. The hydraulic fracturing pump profiler may be instructions stored in a memory, executable by a processor, in a controller 146. The hydraulic fracturing pump profiler may be a computing device or controller disposed on or connected to each of the hydraulic fracturing units 160. In another example, one controller or more may connect to more than one of the one or more hydraulic fracturing units 160. The hydraulic fracturing pump profiler may provide various data points related to each of the one or more hydraulic fracturing pumps 108 to the supervisory controller 124, for example, the hydraulic fracturing pump profiler may provide data including hydraulic fracturing pump characteristics (e.g., minimum flow rate, maximum flow rate, harmonization rate, and/or hydraulic fracturing pump condition). The hydraulic fracturing pump profiler may provide, to the supervisory controller 124, maintenance data associated with the one or more hydraulic fracturing pumps 108 and/or mobile power units 106 (e.g., health, maintenance schedules and/or histories associated with the hydraulic fracturing pumps 108, the internal combustion engine 107, and/or the transmission 138). The hydraulic fracturing pump profiler may provide, to the supervisory controller 124, operation data associated with the one or more hydraulic fracturing pumps 108 and/or mobile power units 106, for example, historical data associated with power or horse power, fluid pressures, fluid flow rates, etc., such examples being associated with operation of the hydraulic fracturing pumps 108 and mobile power units 106. The hydraulic fracturing pump profiler may provide, to the supervisory controller 124, data related to the transmissions 138, for example, hours of operation, health, efficiency, and/or installation age. The hydraulic fracturing pump profiler may provide, to the supervisory controller 124, data related to the internal combustion engines 107, for example, hours of operation, health, available power, and/or installation age. The hydraulic fracturing pump profiler may provide, to the supervisory controller 124, information related to the one or more hydraulic fracturing pumps 108, for example, hours of operation, plunger and/or stroke size, maximum speed, efficiency, health, and/or installation age. The hydraulic fracturing pump profiler may provide, to the supervisory controller 124, one or more of numerous alarm conditions and/or equipment alarm history, for example, life reduction events, pump cavitation events, pump pulsation events, and/or emergency shutdown events. The supervisory controller 124 may generate or obtain this data from a local controller for the internal combustion engines 107, engine sensors disposed on the internal combustion engines 107, a local controller for the transmissions 138, transmission sensors disposed on the transmissions 138, a local controller for the hydraulic fracturing pump 108, and/or pump sensors disposed on the hydraulic fracturing pumps 108.

In an embodiment, data, configuration, health ratings, and/or consumable data associated with any of the components or equipment included on the hydraulic fracturing unit 160 may be considered hydraulic fracturing unit parameters. The components or equipment may refer to the hydraulic fracturing pumps 108, the internal combustion engine 107, the transmission 138, a fluid end, and/or any other equipment included on or with or disposed on the hydraulic fracturing unit 160.

Figure 2A:
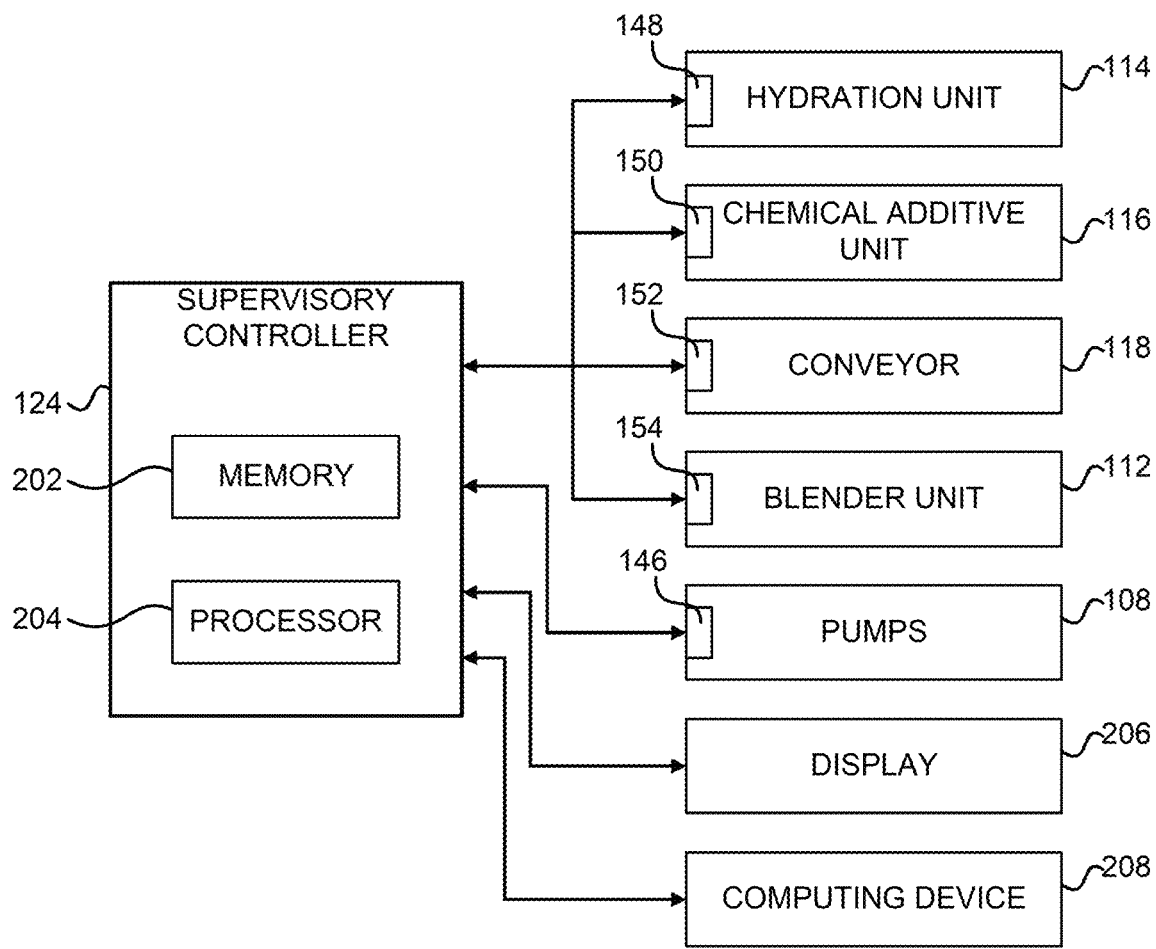
FIG. 2A and FIG. 2B are block diagrams of an example controller connected to backside equipment, hydraulic fracturing pumps, a display, and a computing device according to an embodiment of the disclosure.
Figure 2B:
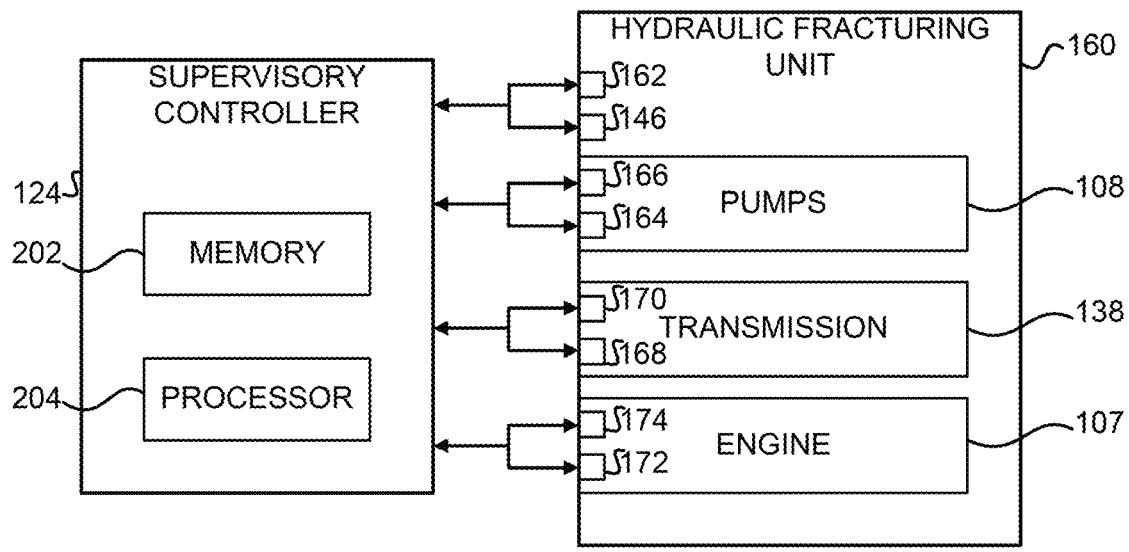

FIGS. 2A and 2B are block diagrams of a supervisory controller 124 connected to backside equipment 120, hydraulic fracturing pumps 108, a display 206, and a computing device 208, according to an embodiment. The supervisory controller 124 may include a machine-readable storage medium (for example, memory 202) and processor 204. As used herein, a "machine-readable storage medium" may be any electronic, magnetic, optical, or other physical storage apparatus to contain or store information such as executable instructions, data, and the like. For example, any machine-readable storage medium described herein may be any of random access memory (RAM), volatile memory, non-volatile memory, flash memory, a storage drive (e.g., hard drive), a solid state drive, any type of storage disc, and the like, or a combination thereof. As noted, the memory 202 may store or include instructions executable by the processor 204. As used herein, a "processor" may include, for example one processor or multiple processors included in a single device or distributed across multiple computing devices. The processor 204 may be at least one of a central processing unit (CPU), a semiconductor-based microprocessor, a graphics processing unit (GPU), a field-programmable gate array (FPGA) to retrieve and execute instructions, a real time processor (RTP), other electronic circuitry suitable for the retrieval and execution of instructions stored on a machine-readable storage medium, or a combination thereof. The supervisory controller 124 may include instructions to build pump profiles or hydraulic fracturing unit profiles to monitor hydraulic fracturing units 160 and/or other hydraulic fracturing equipment and to determine characteristics, maintenance cycles, adjustments to ratings, health, and/or other factors associated with the hydraulic fracturing units 160 and/or other hydraulic fracturing equipment.

As noted, the supervisory controller 124 may be in signal communication with the backside equipment and the hydraulic fracturing units 160. The hydraulic fracturing units 160 may include large sets of data (e.g., operation data, maintenance data, and equipment data) related to the hydraulic fracturing units 160. The hydraulic fracturing units 160 may include various sensors, controllers, and/or other devices. The supervisory controller 124 may connect to each of the sensors, controllers, and/or other devices (for example, via a serial, RS422, REST, RESTful, Web Socket®, wirelessly, and/or wired interface) and include instructions, when executed by the processor, to obtain data from various sensors, controllers, and/or other devices. The hydraulic fracturing units 160 may include a controller 146 and/or sensors 162. Further, the supervisory controller 124 may obtain data from the one or more hydraulic fracturing unit 160 controller 146 and/or sensor 162 or from other components, devices, or equipment included on or with the one or more hydraulic fracturing units 160, such as, a set of maintenance data, a set of operation data, a set of equipment health ratings, a set of equipment configurations, and a set of equipment event and alarm histories. The maintenance data may include the number of hours until next required or suggested engine maintenance, the number of hours until the next required or suggested transmission maintenance, an oil change log, pump valve and seat (V&S) hours, packing hours, total pump strokes, average V&S hours, and average packing hours. The operation data may include the maximum hydraulic power produced and/or utilized during a previous hydraulic fracturing stage, a minimum hydraulic power utilized, an average hydraulic power, a maximum pressure produced, a maximum flow produced, a maximum pump speed, and/or a user override register. The pump speed may be represented or indicated by the rotations per minute (RPM) of the pump. The hydraulic power may be represented or indicated by hydraulic horse power (HHP). The equipment health ratings may include the engine health, engine power rating based on engine health, transmission health, transmission deration based on health, pump health, and/or pump deration based on health. The engine power may be represented or indicated by horse power (HP). The equipment configurations may include an engine model, engine serial number, transmission model, transmission serial number, pump model, pump serial number, fluid end model, and/or fluid end serial number. The equipment event and alarm histories may include life reduction event counter total, life reduction event for current week, pump cavitation event counter total, pump cavitation event counter for current week, pump pulsation event counter total, pump pulsation event counter for current week, emergency shutdown counter total, and/or emergency shutdown counter for current week. In another example, the supervisory controller 124 may obtain the locations and/or positions of the hydraulic fracturing units 160, for example, the location or position of a particular hydraulic fracturing unit in relation to the other hydraulic fracturing units, which may be denoted by a number, a letter, coordinates, and/or other information indicating a position and/or location of equipment. Other data related to the hydraulic fracturing units 160 may be included and/or may be obtained by the supervisory controller 124.

As noted, the hydraulic fracturing pumps 108 may include a controller 164 and/or sensors 166. The supervisory controller 124 may obtain data from a hydraulic fracturing pump 108 controller 164 and/or sensors 166 or from other components, devices, and/or equipment included on or with the hydraulic fracturing unit's 160, such as pump information, including the number of hours of use of the pump, the pump's plunger size, the pump's stroke size, the pump's maximum speed, the pump's health efficiency, consumables age (e.g., V&S hours and/or age), and an age of the pump. Further, the supervisory controller 124 may continuously or periodically obtain, retrieve, or request data from the hydraulic fracturing pump's 108 controller 164 and/or sensors 166. Further still, the supervisory controller 124 may continuously, substantially continuously, or periodically obtain, retrieve, or request specific data from the hydraulic fracturing pump's 108 controller 164 and/or sensors 166 (e.g., hours per use, health efficiency, pressure at the hydraulic fracturing pump's 108 output, flow rate, speed, or other information that may change periodically or frequently).

In another embodiment, the supervisory controller 124 and/or the hydraulic fracturing pump's 108 controller 164 may include instructions to generate and transmit events and/or alarms of varying severity (e.g., low severity, allowing for continued operation, to critical severity, which may cause immediate shutdown of equipment). For example, a threshold may be set for various factors associated with the hydraulic fracturing pump 108, for example, pressure at the hydraulic fracturing pump's 108 output, flow rate, speed, consumables age, and/or other operating factors. The supervisory controller 124 may monitor the data associated with a threshold from the hydraulic fracturing pump's 108 controller 164 and/or sensors 166. If the threshold is met or exceeded, then the supervisory controller 124 and/or controller 164 may prevent use of, prevent further use of, stop, or send a stop signal to the hydraulic fracturing pump 108. In another embodiment, the supervisory controller 124 and/or controller 164 may record the event and prevent the use of the pump in a next hydraulic fracturing stage until maintenance is performed on hydraulic fracturing pump 108. In such embodiments, the threshold may be a value that operating parameters are not to be greater than, greater than or equal to, less than, or less than or equal to.

The hydraulic fracturing unit's 160 transmission 138 may include a controller 168 and/or sensors 170. The supervisory controller 124 may obtain data from the transmission's 138 controller 168 and/or sensors 170 or from other components, devices, or equipment included on or with the hydraulic fracturing unit's 160, such as transmission information, number of hours of use of the transmission, the transmission's installation age, the transmission's efficiency health, transmission fluid level, transmission fluid age, transmission fluid grade or health, and/or other data related to the transmission 138. The supervisory controller 124 or controller 168 may include a threshold or conditions and/or may include an option to set a threshold or conditions to trigger events and/or alarms of varying severity (e.g., low severity, allowing for continued operation, to critical severity, which may cause immediate shutdown of equipment). For example, the supervisory controller 124 or controller 168 may include a threshold for transmission fluid level. If the transmission fluid falls below or is at a certain level, either specified or preset, then the supervisory controller 124 or controller 168 may generate an alarm. Further, the supervisory controller 124 or controller 168 may inhibit upshift out of neutral, thus preventing damage to the transmission 138. The supervisory controller 124 or controller 168 may prevent upshift out of neutral until manual intervention or maintenance is performed. The threshold may be preset or set in the supervisory controller 124. In another example, the supervisory controller 124 may determine the threshold based on transmission data.

As noted, the internal combustion engine 107 may include a controller 172 and/or sensors 174. The supervisory controller 124 may obtain data from the internal combustion engine's 107 controller 172 and/or sensors 174 or from other components, devices, or equipment included on or with the hydraulic fracturing unit's 160, such as engine information, including the number of hours of use of the engine, the engine's available power, the engine's installation age, the engine's efficiency health, consumables levels, consumables age, and/or other information related to the engine. The supervisory controller 124 or controller 172 may include a threshold or conditions and/or may include an option to set a threshold or conditions to trigger events and/or alarms of varying severity (e.g., low severity, allowing for continued operation, to critical severity, which may cause immediate shutdown of equipment). For example, the supervisory controller 124 or controller 172 may include a threshold for consumable level, consumable age, hours of use, and/or other factors. If a measurement falls below, exceeds, or is at a certain level, either specified, preset, or determined by the supervisory controller 124 based on engine data, then the supervisory controller 124 or controller 172 may generate an alarm. Further, the supervisory controller 124 or controller 172 may prevent further use of the internal combustion engine 107 to ensure that no damage occurs to the internal combustion engine 107. The supervisory controller 124 or controller 172 may prevent start-up of the internal combustion engine 107 until manual intervention or maintenance is performed.

As noted above, the supervisory controller 124 may be in signal communication with the backside equipment 120. In such examples, the connection between the controller 124 and backside equipment 120 may be a representational state transfer (REST or RESTful) interface, a WebSocket® interface, or some other transmission control protocol (TCP) or QUIC based interface. In such examples, the current hydraulic fracturing stage parameters may be sent from the controller 124 to the backside equipment 120 over hypertext transfer protocol (HTTP), hypertext transfer protocol secure (HTTPS), or other protocol. The supervisory controller 124 may also obtain data and build profiles relating to associated backside equipment 120.

The supervisory controller 124 may include instructions stored in the memory 202, when executed by the processor 204, to build, determine, or create a hydraulic fracturing unit profile or pump profile. The supervisory controller 124 may obtain the data noted above and create and/or format the data into a format suitable for the display 206. In such examples, in response to reception of the data described above, the processor 204 of the supervisory controller 124 may execute instructions to build, determine, and/or create a health assessment. The health assessment may be based on the equipment health ratings. The health assessment may also be based on all the data obtained by the supervisory controller 124, for example, hours used, age of equipment, consumable levels, consumable age, and/or other factors as described herein. The health assessment may be stored as a value or indicator. The value or indicator may correspond to a color to transmit or send to the display 206. For example, a poor health assessment of a hydraulic fracturing unit may be determined and stored in the memory 202 of the supervisory controller 124 as, for example, a "1". Other values and indicators may be utilized, as will be understood by those skilled in the art. The supervisory controller 124 may package or transmit the health assessment with the hydraulic fracturing profile or pump profile. The health assessment may then be presented to a user, via the display 206, as a color, for example, red for the poor health assessment. Green may represent a good health assessment, and yellow may represent a state in between good and poor. For example, the supervisory controller 124 may recommend or automatically set a maintenance date between a week and two weeks for a hydraulic fracturing unit with a yellow health assessment may.

The supervisory controller 124 may include instructions stored in the memory 202, when executed by the processor 204, to present a GUI or dashboard to the display 206, a terminal, a smartphone, and/or a tablet. The GUI or dashboard may include a selectable list of the hydraulic fracturing units 160 or selectable tabs, each tab associated with a hydraulic fracturing unit 160. In another embodiment, the GUI or dashboard may include a representation of the equipment at the wellsite (e.g., boxes or drawings for equipment, such as for the hydraulic fracturing units 160). In such an embodiment, each representation may be selectable. The user may select one of the hydraulic fracturing units 160. In response to a selection of one of the one or more hydraulic fracturing units 160, the GUI or dashboard may present the hydraulic fracturing unit profile or the pump profile. The hydraulic fracturing unit profile or pump profile may be presented on the display 206 as a series of tabs. When a user selects a tab, the GUI or dashboard may present the relevant data. For example, one tab may be an internal combustion engine tab (indicated by text, such as "Engine"). When a user clicks the internal combustion engine tab, the internal combustion engine data may be presented. The GUI or dashboard may include a main tab, home tab, or home page for each hydraulic fracturing unit profiles or pump profiles. The main tab, home tab, or home page may include the health assessment. When the health assessment is poor or includes an indication that user intervention may be needed and the user hovers over or selects the health assessment, a list of the issues causing or potentially causing the state of the health assessment may be listed. Such a list may include potential corrective actions that may be performed. At such a point, the user may take corrective action. After a corrective action is taken, the supervisory controller 124 may determine what time the corrective action was taken and what type of corrective action occurred. The supervisory controller 124 may update the GUI or dashboard for the respective hydraulic fracturing unit 160. The supervisory controller 124 may store the taken corrective action, with a timestamp, and present the corrective action in the GUI or dashboard in a section related to an associated hydraulic fracturing unit.

The supervisory controller 124 may include instructions stored in the memory 202, when executed by the processor 204, to prompt or notify a user in response to an event. In an embodiment, an event may be a life reduction event, pump cavitation event, pump pulsation event, and/or emergency shutdown. While such events, as well as other events, may include an associated corrective action, the events may not require a corrective action. The supervisory controller 124 may, for example, derate a pump based one or more such events or data obtained or determined, e.g., health ratings, health assessment, pump information/data, and/or other data or information described herein. In another embodiment, the supervisory controller 124 may determine a level to derate the pump to. In such cases, the supervisory controller may send a prompt to a user to accept such an action or may automatically derate the pump. In another embodiment, the supervisory controller 124 may adjust factors associated the hydraulic fracturing units 160 based on such events. For example, when an event occurs (e.g., pump cavitation, pump pulsation, etc.), the supervisory controller 124 may adjust factors associated with the respective hydraulic fracturing unit 160 (e.g., lowering a pumps maximum speed, pressure, or flow rate, or lowering max power output by an engine, etc.).

The supervisory controller 124 may include instructions stored in the memory 202, when executed by the processor 204, to determine a hydraulic fracturing pumps 108 flow or maximum flow based on the hydraulic fracturing unit's profile or pump profile. The supervisory controller 124 may utilize the stroke length (SL), the plunger size or diameter (PD), number of cylinders (NC), and maximum speed to accurately calculate maximum flow rate of a hydraulic fracturing pump 108. The following formula may be utilized to determine the displacement per revolution (GPR) of the hydraulic fracturing pump 108:

$$\frac{PD^2 \times .7854 \times SL \times NC}{231} = GPR$$

Once the GPR is determined, the supervisory controller 124 may convert GPR to gallons per minute (GPM) by multiplying GPR by pump speed. The pump speed may be represented or indicated by a pump's RPM. The supervisory controller 124 may further convert GPM to barrels per minute (BPM). Further, the supervisory controller 124 may determine the maximum pressure of the hydraulic fracturing pump 108 using the maximum rod load (RL) and PD. The following equation may be utilized to determine the maximum pressure of the hydraulic fracturing pump 108:

$$\frac{RL}{PD^2 \times .7854} = PSI$$

Other aspects of or factors associated with the hydraulic fracturing pumps 108 or the hydraulic fracturing unit 160 may be determined based on data in the hydraulic fracturing unit's profile or pump profile, such as, power utilization, power output, or other aspects.

The supervisory controller 124 may include instructions stored in the memory 202, when executed by the processor 204, to obtain or determine a life of the consumables in the one or more hydraulic fracturing units 160. The supervisory controller 124 may determine or calculate an expected or average life of a consumable based on the hydraulic fracturing unit profile or pump profile. Further the supervisory controller 124 may check the consumables continuously, substantially continuously, periodically, or at regular intervals. If the consumables are lower than an expected or average level and/or older than an expected or average age, the supervisory controller 124 may prompt the user. Further, if the consumables are lower than an expected or average level at a time period less than the expected or average life of the consumables, then the prompt may include a warning that the hydraulic fracturing unit 160 may be experiencing an issue or wear. The prompt may include a notice that a hydraulic fracturing unit 160 may not be utilized until maintenance is performed and the supervisory controller 124 may prevent such use until the maintenance is performed. For example, such a prompt may indicate hydraulic fracturing pump 108 operation issues, internal combustion engine 107 issues, transmission 138 issues, suction line issues, and/or fluid end wear. Consumables may refer to any fluid or solid consumed by the hydraulic fracturing units 160 during the hydraulic fracturing stage or process. A consumable may also be diesel fuel (e.g., #2 diesel), bio-diesel fuel, bio-fuel, alcohol, gasoline, gasohol, aviation fuel, other fuels, fluids, water, chemicals, or other substances as will be understood by those skilled in the art. Consumables may also refer to any components that are periodically replaced or wear out, e.g., V&S.

The supervisory controller 124 may include instructions stored in the memory 202, when executed by the processor 204, to determine which hydraulic fracturing units 160 to utilize in or for a hydraulic fracturing stage or operation. The supervisory controller 124 may determine which hydraulic fracturing units 160 to use based on the hydraulic unit profile and/or the pump profile. The supervisory controller 124 may determine that a specific hydraulic fracturing unit 160 may not be utilized for a particular hydraulic fracturing stage or operation based on the maximum power of the specific hydraulic fracturing unit being less than required for the hydraulic fracturing stage or operation, the maximum flow rate of the specific hydraulic fracturing unit being less than required for the hydraulic fracturing stage or operation, the level and/or age of consumables within the specific hydraulic fracturing unit, upcoming maintenance for the specific hydraulic fracturing unit, health ratings and/or assessments, other data and/or determinations associated with the hydraulic fracturing unit as described herein, and/or some combination thereof. For example, a specific hydraulic fracturing unit with an insufficient amount of a consumable (e.g., diesel) for a desired length of time of a hydraulic fracturing stage or operation may not be selected for such a hydraulic fracturing stage or operation. In another example, a specific hydraulic fracturing unit with a low or poor health rating or assessment may be taken offline for maintenance, rather than to be utilized in the hydraulic fracturing stage or operation. Other factors may be considered in various other examples.

Figure 3A:
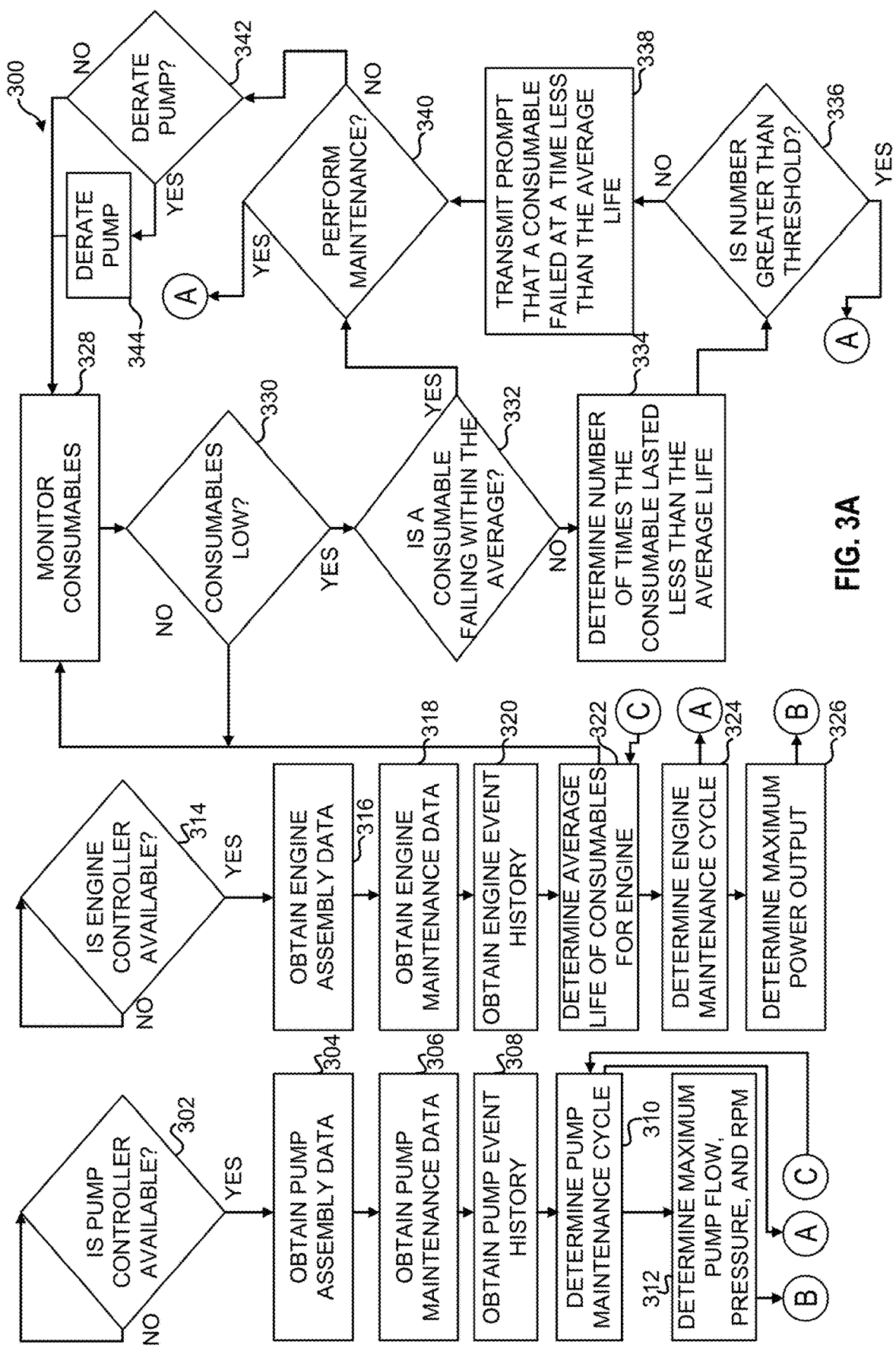
FIG. 3A and FIG. 3B are flowcharts of an example method of utilizing a pump profile to operate hydraulic fracturing pumps for a wellsite hydraulic fracturing system, according to an embodiment of the disclosure.
Figure 3B:
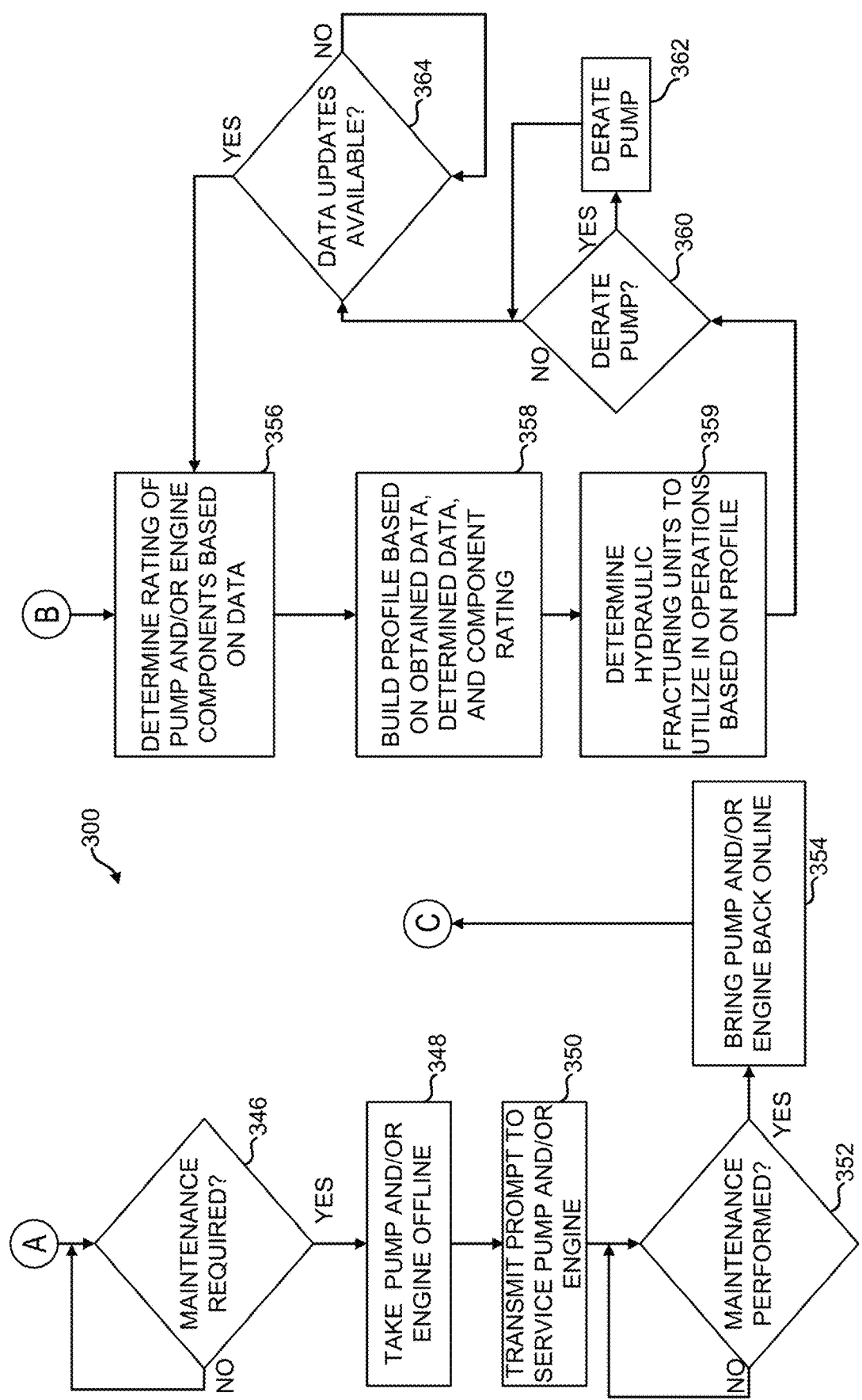

FIGS. 3A and 3B are flowcharts of example method 300 of utilizing and amending hydraulic fracturing stage profiles, according to an embodiment. The method is detailed with reference to the wellsite hydraulic fracturing system 100 and supervisory controller 124. Unless otherwise specified, the actions of method 300 may be completed within the supervisory controller 124. Specifically, method 300 may be included in one or more programs, protocols, or instructions loaded into the memory 202 of the supervisory controller 124 and executed on the processor 204. The order in which the operations are described is not intended to be construed as a limitation, and any number of the described blocks may be combined in any order and/or in parallel to implement the methods.

At block 302, the supervisory controller 124 may determine if a hydraulic fracturing pump's 108 controller 164 is available. The hydraulic fracturing pump's 108 controller 164 may be considered available when a hydraulic fracturing unit 160 is brought, driven, delivered, started, and/or initiated at a wellsite hydraulic fracturing system 100. In another embodiment, the hydraulic fracturing pump's 108 controller 164 may be considered available when a hydraulic fracturing unit 160 is brought online and the hydraulic fracturing pump's 108 controller 164 connected to the supervisory controller 124, either via a hard wired connection or wireless connection. The supervisory controller 124 may wait until at least one hydraulic fracturing pump's 108 controller 164 is available prior to initiating building or determining a hydraulic fracturing unit profile or pump profile.

At block 304, once the supervisory controller 124 has connected to one or more hydraulic fracturing pumps' 108 controllers 164, the supervisory controller 124 may obtain data from the controller 164. The supervisory controller 124 may obtain pump assembly data for each hydraulic fracturing pump 108 at the wellsite hydraulic fracturing system 100. The pump assembly data may include a pump's plunger size, a pump's stroke size, and/or a pump's maximum speed. Other information, such as pump curves, pump models, pump serial numbers, pump placement, and/or other pump assembly characteristics may be obtained by the supervisory controller 124.

At block 306, the supervisory controller 124 may, after, before, or during the obtaining of pump assembly data, obtain pump maintenance data. The pump maintenance data may include the total number of hours a hydraulic fracturing pump 108 has been in use or the age of the hydraulic fracturing pump, a number of hours the hydraulic fracturing pump 108 has been in use since the last maintenance operation, the type of the last maintenance operation, and/or the time until the next scheduled, expected, and/or typical maintenance operation. In another embodiment, the supervisory controller 124 may obtain or receive, rather than the time until the next scheduled, expected, and/or typical maintenance operation, a pump manufacturers recommended time frame or period for maintenance.

At block 308, the supervisory controller 124 may obtain pump event and/or alarm history. The pump event and/or alarm history may include life reduction event counter total, life reduction event for the current week, month, and/or year, pump cavitation event counter total, pump cavitation event counter for the current week, month, and/or year, pump pulsation event counter total, pump pulsation event counter for the current week, month, and/or year, emergency shutdown counter total, and/or emergency shutdown counter for the current week, month, and/or year. In another embodiment, the supervisory controller 124 may determine and/or generate events and/or alarms based on data obtained from the hydraulic fracturing pump's 108 controller 164.

At block 310, the supervisory controller 124 may determine a hydraulic fracturing pump's 108 maintenance cycle. The supervisory controller 124 may determine such a cycle based on the pump maintenance data, the pump event and/or alarm history, and/or the pump assembly data. For example, the supervisory controller 124 may schedule a sooner-than-typical maintenance operation for a hydraulic fracturing pump 108 that experiences a high amount of cavitation or pulsation events, but has been in operation for a short period of time since a last maintenance operation. Based on various other conditions and hydraulic fracturing pump 108 characteristics, events, and alarms, the supervisory controller 124 may set a maintenance date.

At block 312, the supervisory controller 124 may determine various characteristics of the hydraulic fracturing pump 108 based on pump assembly data. For example, the supervisory controller 124 may determine a maximum flow rate of the hydraulic fracturing pump 108 based on the pump assembly data and/or other data or information described herein. In another embodiment the supervisory controller 124 may determine the maximum pressure and the maximum speed of the hydraulic fracturing pump 108 based on the pump assembly data. The determinations may further be based on pump maintenance data and/or pump event and/or alarm history. For example, the supervisory controller 124 may determine whether to derate a hydraulic fracturing pump 108 based on the pump assembly data, the pump maintenance data, and/or the pump event and/or alarm history. Such an operation (e.g., derating a pump) may alter the maximum speed, maximum pressure, and/or maximum flow rate of the hydraulic fracturing pump 108.

At block 314, the supervisory controller 124 may determine if an internal combustion engine's 107 controller 172 is available. The internal combustion engine's 107 controller 172 may be considered available when a hydraulic fracturing unit 160 is brought, driven, delivered, started, and/or initiated at a wellsite hydraulic fracturing system 100. In another embodiment, the internal combustion engine's 107 controller 172 may be considered available when a hydraulic fracturing unit 160 is brought online and the internal combustion engine's 107 controller 172 connected to the supervisory controller 124, either via a hard wired connection or wireless connection. The supervisory controller 124 may wait until at least one internal combustion engine's 107 controller 172 is available prior to initiating building or determining a hydraulic fracturing unit profile or pump profile.

At block 316, once the supervisory controller 124 has connected to one or more internal combustion engines' 107 controllers 172, the supervisory controller 124 may obtain data from the controller 172. The supervisory controller 124 may obtain engine assembly data for each internal combustion engine 108 at the wellsite hydraulic fracturing system 100. The engine assembly data may include a type of engine (e.g., internal combustion engine), power output and/or fuel type. Other information, such as engine model, engine serial numbers, engine placement, and/or other engine assembly characteristics may be obtained by the supervisory controller 124.

At block 318, the supervisory controller 124 may, after, before, or during the obtaining of engine assembly data, obtain engine maintenance data. The engine maintenance data may include the total number of hours an internal combustion engine 107 has been in use or the age of the internal combustion engine 107, a number of hours the internal combustion engine 107 has been in use since the last maintenance operation, the type of the last maintenance operation, the time until the next scheduled, expected, and/or typical maintenance operation, the level of fluids utilized in the internal combustion engine 107, the typical and/or optimal amount of the fluids to be used in the internal combustion engine 107, and/or the typical and/or optimal type of fluid to be used in the internal combustion engine 107. In another embodiment, the supervisory controller 124 may obtain or receive, rather than the time until the next scheduled, expected, and/or typical maintenance operation, an engine manufacturers recommended time frame or period for maintenance.

At block 320, the supervisory controller 124 may obtain pump event and/or alarm history. The pump event and/or alarm history may include life reduction event counter total, life reduction event for the current week, month, and/or year, emergency shutdown counter total, emergency shutdown counter for the current week, month, and/or year, missed scheduled maintenance, low or critically low consumables, and/or other events related to or associated with the internal combustion engine 107. In another embodiment, the supervisory controller 124 may determine and/or generate events and/or alarms based on data obtained from the internal combustion engine's 108 controller 172.

At block 322, the supervisory controller 124 may determine an average or expected life of consumables utilized in the internal combustion engine 107. The supervisory controller 124 may determine the average or expected life of a particular consumable based on engine assembly data and/or engine maintenance data. For example, for a particular liquid, the supervisory controller may determine the average or expected life based on the amount or level of the consumable in the internal combustion engine 107, the amount or level indicated by the manufacturer (which may be included in the engine assembly data), and/or the amount or level of the consumable in the engine following maintenance associated with the consumable.

In another embodiment, the supervisory controller 124 may determine an average or expected life of consumables utilized by the hydraulic fracturing pumps 108. The supervisory controller 124 may determine the average or expected life of a particular consumable based on pump assembly data and/or pump maintenance data. For example, for a component of the hydraulic fracturing pumps 108, the supervisory controller may determine the average or expected life based on prior maintenance time periods for the component and/or the average or expected life indicated by the manufacturer (which may be included in pump assembly data).

At block 324, the supervisory controller 124 may determine an internal combustion engine's 107 maintenance cycle. The supervisory controller 124 may determine such a cycle based on the engine maintenance data, the engine event and/or alarm history, and/or the engine assembly data. For example, the supervisory controller 124 may schedule a sooner than typical maintenance operation for an internal combustion engine's 107 that experiences a high amount of emergency shutdowns, but has been in operation for a short period of time since a last maintenance operation. Based on various other conditions and internal combustion engine 107 characteristics, events, and alarms, the supervisory controller 124 may set a maintenance date At block 326, the supervisory controller 124 may determine various characteristics of the internal combustion engine 107 based on engine assembly data and/or engine maintenance data. For example, the supervisory controller 124 may determine a maximum power output of the internal combustion engine 107 based on the engine assembly data, engine maintenance data, health assessment, health rating, and/or other data.

In another embodiment, the data from the internal combustion engine's 107 controller 172 may be obtained at the same time or substantially the same time data is obtained from the hydraulic fracturing pump's controller 164. Data may be obtained sequentially, for example, from the hydraulic fracturing pumps 108 and then the internal combustion engine 107, or vice versa. Further, data from a transmission and/or fluid end may be obtained. Various factors and characteristics of the other equipment may be determined, as described herein. For example, transmission fluid level and maintenance may be monitored and determined.

After the average or expected life of the consumables utilized in the internal combustion engine 107 are determined, at block 328, the supervisory controller 124 may continue to monitor the consumables over time. For example, the supervisory controller 124 may continuously or periodically obtain or gather data associated with the consumables (e.g., current level, health, and/or time since last maintenance).

After an update to consumable related data, at block 330, the supervisory controller 124 may determine whether the consumables are low. For example, is the amount of consumables in the internal combustion engine 107 at a level that may cause damage or that may be insufficient to operate the internal combustion engine 107 for a period of time, for example, the time to finish a hydraulic fracturing stage.

If the consumables are not low, the supervisory controller 124 may continue to monitor the consumables. If the consumables are low, at block 332, the supervisory controller 124 may determine whether the consumable is low or has failed sooner than expected. For example, the supervisory controller 124 may determine whether the consumable has failed at a time less than the average or expected life. If the consumables are failing within the average or expected life, then the supervisory controller 124 may determine whether to perform maintenance. If the consumable has filed or is low at a time less the average or expected, at block 334, the supervisory controller 124 may determine the number of times that the consumables have failed in a time less than the average. In an embodiment, a threshold may be set to determine whether the consumable failure may indicate equipment failure. For example, if a consumable is utilized in a shorter than the average or expected life, then such repeated failure may indicate equipment failures, such as a leak. At block 338, if the number is greater than the threshold, the supervisory controller 124 may transmit a prompt, notification, and/or alarm.

At block 340, the supervisory controller 124 may determine whether maintenance is to be performed. For example, the consumable may be low, but not low enough to necessitate maintenance. If maintenance is not to be performed, the supervisory controller 124, at block 342, may determine whether to derate the pump. For example, if the consumables are at a specific level, the power output or maximum power output may be altered. In such an example, the supervisory controller may derate the hydraulic fracturing pump 108, at least until more consumable is added or maintained (e.g., removing old consumable and adding new consumable). If the supervisory controller 124 determines that the hydraulic fracturing pump 108 should be derated, the supervisory controller 124 may, at block 344, derate the pump or lower the capability (e.g., maximum pressure, maximum flow, and/or maximum speed of the hydraulic fracturing pump 108.

After the various characteristics and/or data related to the internal combustion engine 107 and/or hydraulic fracturing pump 108 are obtained and/or determined, at block 346, the supervisory controller 124 may determine whether the internal combustion engine 107 and/or hydraulic fracturing pump 108 require maintenance, based on the data gathered and determined. If the internal combustion engine 107 and/or hydraulic fracturing pump 108 are to receive maintenance, at block 348, the supervisory controller 124 may take the internal combustion engine 107 and/or hydraulic fracturing pump 108 offline, as in not available for use, or shut-off. Once the internal combustion engine 107 and/or hydraulic fracturing pump 108 are taken offline, at block 350, the supervisory controller 124 may transmit a prompt, notification, and/or alarm for maintenance to be performed. At block 352, the supervisory controller 124 may determine whether maintenance has been performed. The supervisory controller 124 may prevent the use of equipment until the maintenance has been performed. The supervisory controller 124 may obtain data from the internal combustion engine 107 and/or hydraulic fracturing pump 108 to determine whether the maintenance has been performed. In another embodiment, a user may indicate when the maintenance has been performed. After the maintenance has been performed, at block 354, the internal combustion engine 107 and/or hydraulic fracturing pump 108 may be brought back online, as in made available for use, or restarted.

At block 356, after all data in relation to the internal combustion engine 107 and/or hydraulic fracturing pump 108 has be obtained and/or determined, the supervisory controller may determine a rating or health rating for internal combustion engine 107 and/or hydraulic fracturing pump 108. A rating or health rating for other equipment included on the hydraulic fracturing unit 160 or elsewhere at the wellsite hydraulic fracturing system may be determined. Once the rating or health rating has been determined, the supervisory controller 358 may build a health profile, pump profile, and/or hydraulic fracturing unit profile for the internal combustion engine 107, hydraulic fracturing pump 108, and/or other equipment as described herein. The health profile, pump profile, and/or hydraulic fracturing unit profile may include the various data points, static and/or real-time, associated with the internal combustion engine 107 and/or hydraulic fracturing pump 108. The supervisory controller 124 may, at block 359, then determine which hydraulic fracturing units 160 to utilize in a hydraulic fracturing stage or operation based on the health profile, pump profile, and/or hydraulic fracturing unit profile.

At block 360, the supervisory controller 124 may determine whether to derate the hydraulic fracturing pump 108 based on the health profile. If the supervisory controller 124 determines that the hydraulic fracturing pump 108 should be derated, at block 362, the supervisory controller 124 may derate the hydraulic fracturing pump 108. The supervisory controller 124, at block 364, may then continuously or periodically check for data updates related to the internal combustion engine 107 and/or hydraulic fracturing pump 108. If an update is available, the supervisory controller 124 may determine an updated rating and update the health profile.

Figure 4:
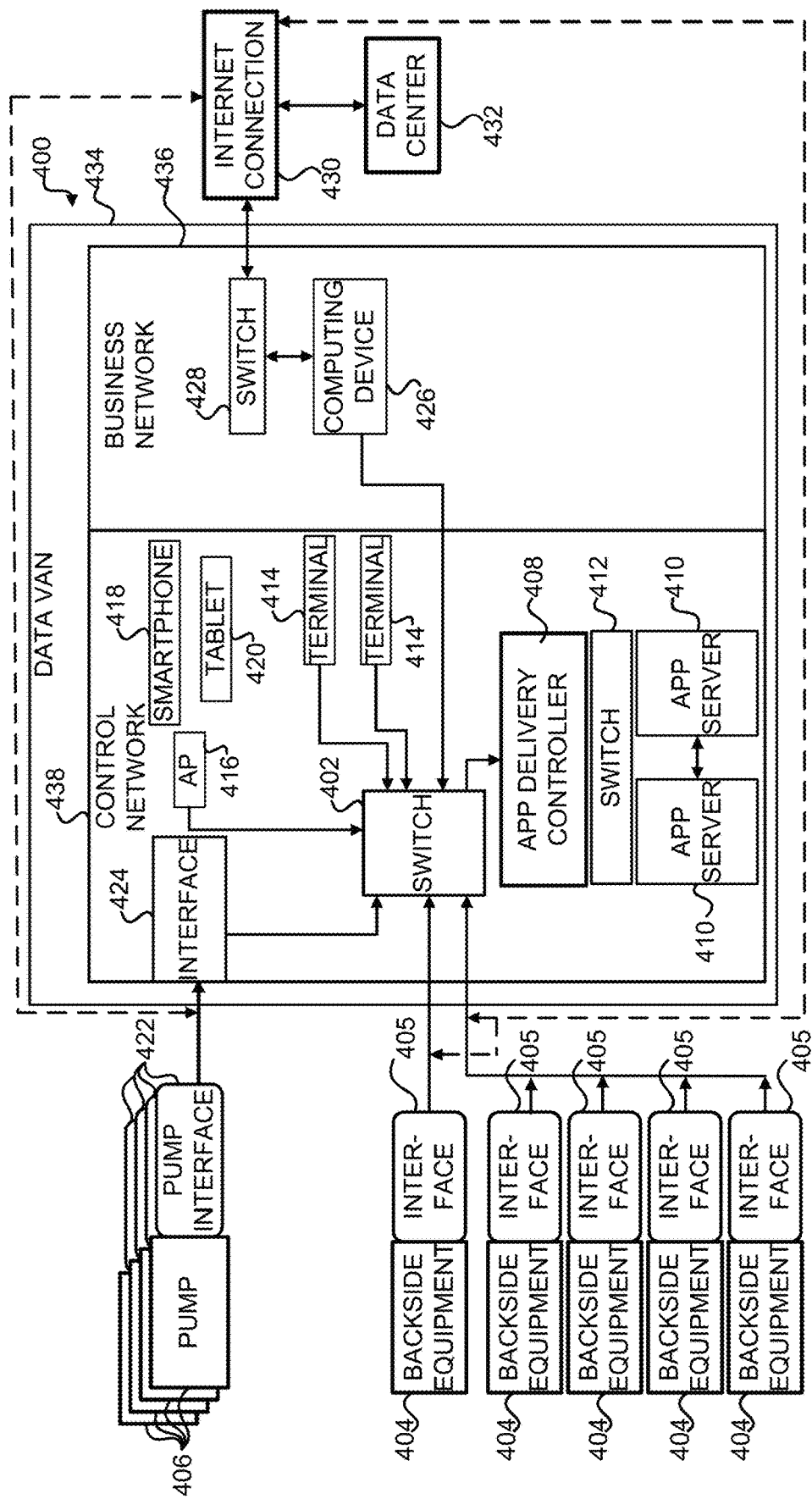
FIG. 4 is a block diagram of a wellsite hydraulic fracturing system, according to an embodiment of the disclosure.

FIG. 4 is a block diagram of a wellsite hydraulic fracturing pumper system 400, according to an example. In an example, the controller or supervisory controller may be included in a data van 434. In such examples, the data van 434 may be separated into a control network 438 and business network 436. In another example, the control network 434 may include the controller, as well as user displays (e.g., a user or operator terminal 414). In such examples, the controller may include various electronic components. For example, the controller may include a switch (e.g., an Ethernet switch 402) to connect to the backside equipment 404 or backside equipment 404 controllers (e.g., via an interface 405 such as a REST, RESTful, or WebSocket® interface) and one or more hydraulic fracturing units 406 or the one or more hydraulic fracturing unit 406 controllers to an application delivery controller 408. In such examples, the application delivery controller 408 may connect to a server and backup or mirrored server (e.g., two connected and/or mirrored application servers 410) via another switch 412. In such examples, the controller may be considered the Ethernet switch 402, the application delivery controller 408, the switch 412, and the application servers 410. In another example, the controller may be in signal communication with user or operator terminals 414. In another example, the controller may connect to a wireless access point 416 or wireless router. In such examples, a user may connect to the controller via wireless signals. Further the user may connect to the controller via a smartphone 418 or tablet 420. In another example, a hydraulic fracturing pump interface 422, disposed on a controller or component of each of the hydraulic fracturing units 406, may be in direct electrical communication with an intermediate interface 424. The hydraulic fracturing pump interface 422 may be a serial interface (e.g., a RS422 interface). In another example, the hydraulic fracturing pump interface 422 may be a wireless interface. For example, the hydraulic fracturing pump interface 422 may send data, via a wireless network, to the intermediate interface 424. The intermediate interface 424 may be in direct electrical communication or wireless communication with the controller (e.g., through the Ethernet switch 402). In another example, the controller may connect to a controller or controllers for other components of the hydraulic fracturing units 406.

As noted, the data van 434 may include a business network 436 or business unit. The business network 436 may include a computing device 426 to store the hydraulic fracturing unit profile or pump profile, as well as other wellsite data and analytics. The computing device 426 may be in signal communication with the controller. The computing device 426 may be a server. In another example, the computing device 426 may be an edge server. In a further example, the computing device 426 may connect to a switch 428 to send, through an internet connection 430, data and/or analytics of the wellsite to a data center 432 for further analysis. Further, the hydraulic fracturing units 406 and backside equipment 404 may connect, through the internet connection 430, to the data center 432, thus providing real time data to the data center 432.

Figure 5:
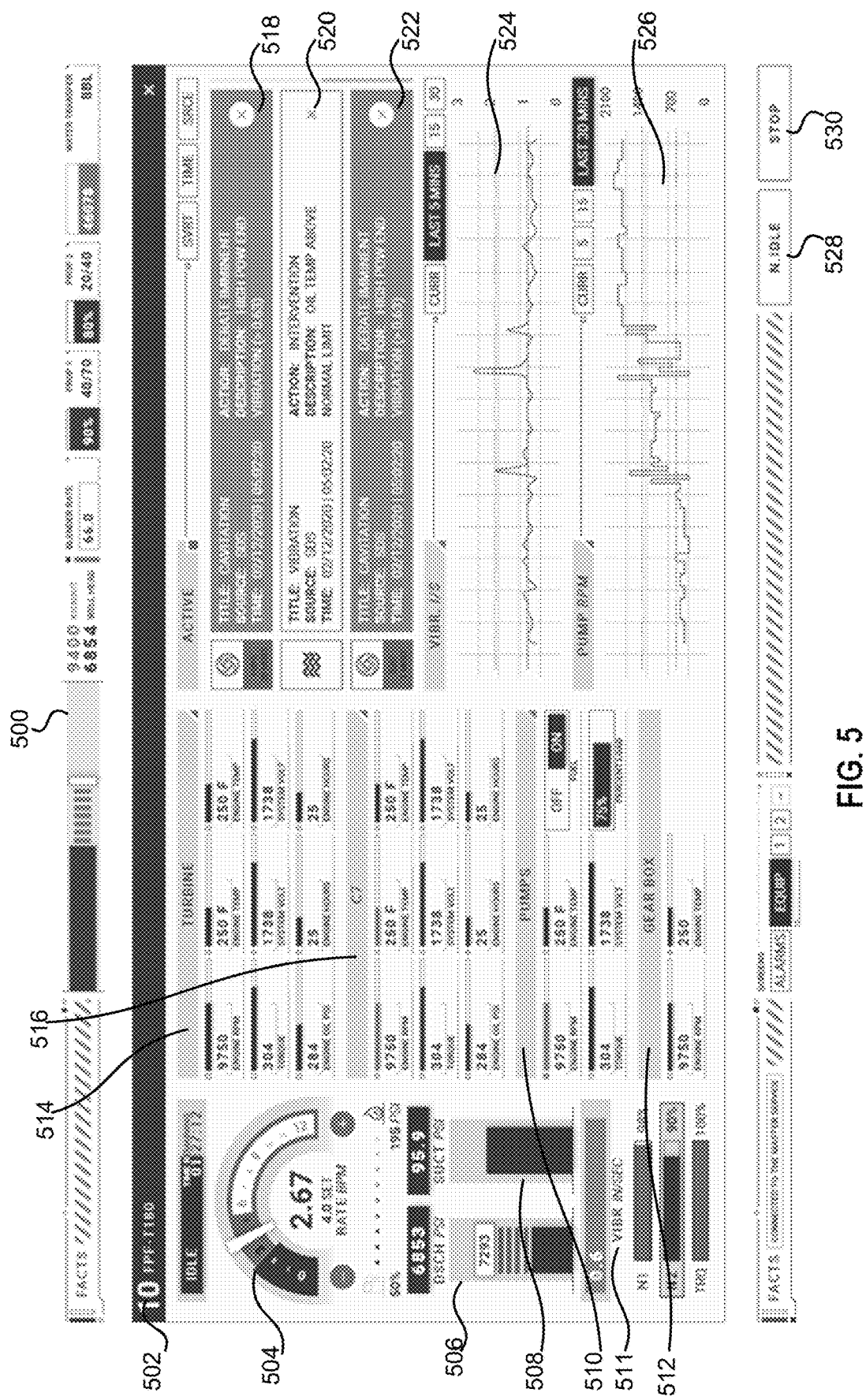
FIG. 5 is a representation of an example pump profile, according to an embodiment of the disclosure.

A processor executing instructions stored in memory of a supervisory controller or other computing device may build, determine, or create a hydraulic fracturing unit profile or pump profile. The supervisory controller may, for each pump profile, include, generate, or determine one or more corresponding or associated displays, pages, or GUIs. The pump profile may include a first GUI 500, as illustrated in FIG. 5. The first GUI 500 may include real-time data, diagnostics, and actions taken regarding each hydraulic fracturing pump at a wellsite. The first GUI 500 may include a pump identification number 502, as multiple pump profiles may be built for one or more hydraulic fracturing pumps at a wellsite. The pump identification number 502 as illustrated in FIG. 5 may be represented by a number, letter, or other type of tag. The pump identification number 502 may indicate that the pump profile 500 corresponds to a particular hydraulic fracturing pump.

Real-time data associated with a particular hydraulic fracturing pump may be updated continuously or periodically. The first GUI 500 may include an actual BPM and/or set point BPM section 504. The supervisory controller and/or a user may set the BPM or determine a set point or limit for the BPM of a pump, for example, based on events and other characteristics of a pump. The supervisory controller may limit the BPM of a pump, preventing the pump from operating past such a limit. The first GUI 500 may also include other real-time operating data, with or without set limits, for example, the discharge pressure 506, suction pressure 508, vibration 511 (e.g., inches per second). The first GUI 500 may include various sections displaying different values for different characteristics (real-time operating data or static data) of the hydraulic fracturing pump, for example, turbine and/or engine data 514, 516, pump component data 510, and/or gearbox data 512. Such sections may illustrate current life of consumables associated with the hydraulic fracturing pump. If a consumable reaches a limit indicating a time for maintenance or replacement, the supervisory controller may generate an event and derate the hydraulic fracturing pump or prevent use of the hydraulic fracturing pump. The first GUI 500 may include such events and other events or actions taken or to be taken. For example, if a hydraulic fracturing pump experiences a certain event, for example, cavitation, the supervisory controller may determine that the hydraulic fracturing pump is to be derated (see 518, 522) and may automatically perform such an action. The supervisory controller may further prompt a user to take action or intervene 520 based on an event, e.g., high vibration and/or oil temperature above a limit. The first GUI 500 may also display real-time pump vibrations 524 and/or pump RPM 526 over time. The first GUI 500 may additionally include an idle button 528 and/or a stop button 530. Selecting the idle button 528 during non-operation may cause the associated hydraulic fracturing pump to enter an idle state. Selecting the stop button 530 during operation or idle may cause the associated hydraulic fracturing pump to enter a stop state or cease operation.

Figure 6:
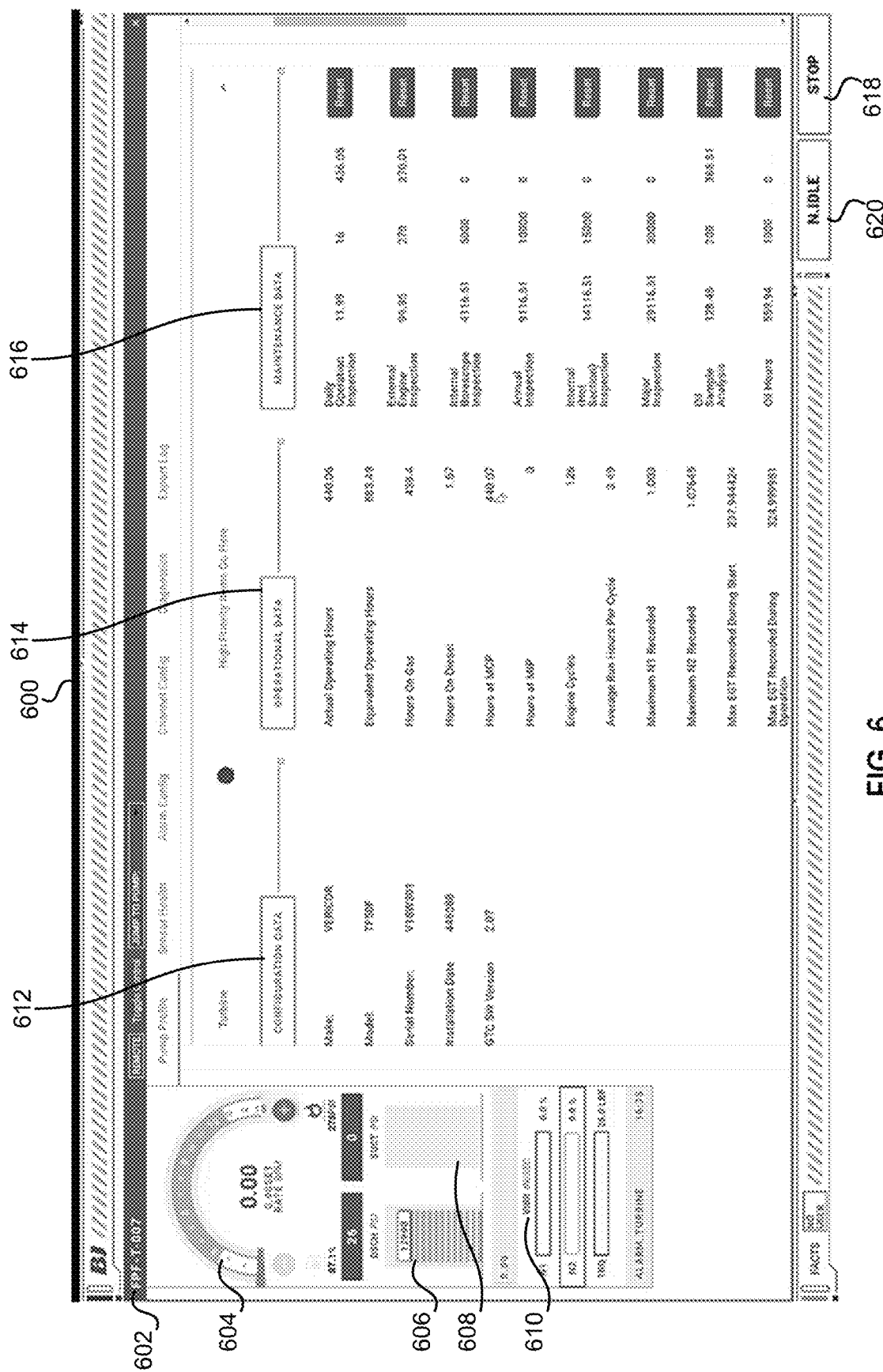
FIG. 6 is another representation of an example pump profile, according to an embodiment of the disclosure.
Figure 7:
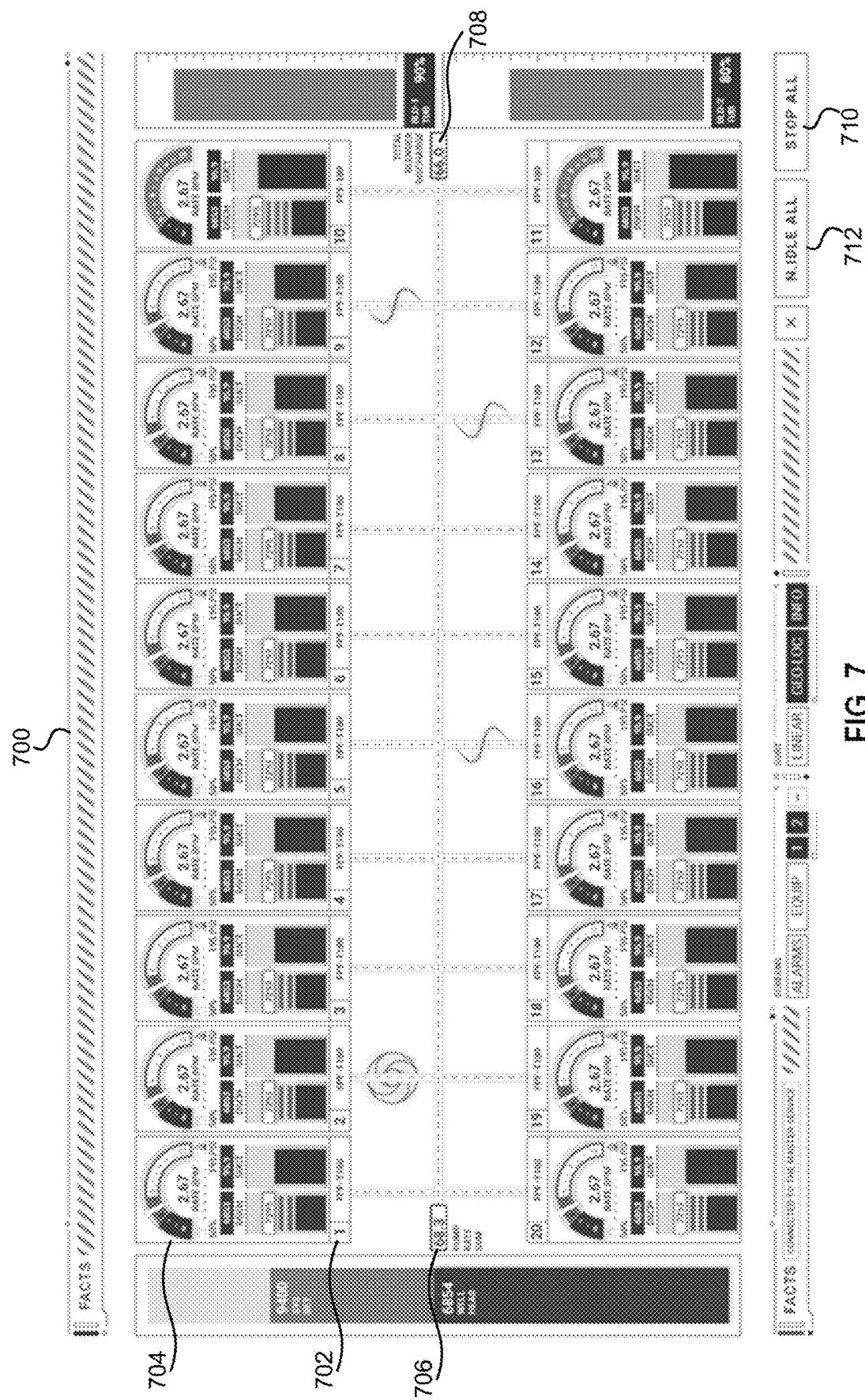
FIG. 7 is yet another representation of an example pump profile, according to an embodiment of the disclosure.

The supervisory controller may, for each pump profile, include, generate, or determine one or more corresponding or associated displays, pages, or GUIs. The pump profile may include a second GUI 600, as illustrated in FIG. 6. The second GUI 600 may include data similar to the first GUI 500, such as a pump identification number 602, an actual BPM and/or set point BPM section 604, discharge pressure 606, suction pressure 608, and/or vibration 610. The second GUI 600 may include configuration data 612 or assembly data of a hydraulic fracturing pump. Configuration data 612 may include the make, model, serial number, installation data, and/or software version of a particular hydraulic fracturing pump.

The second GUI 600 may include operational data 614. Operational data 614 may include operating data of a particular hydraulic fracturing pump, for example, hours in operation, hours on a type of fuel, engine cycles, among other aspects of hydraulic fracturing pump operation. The second GUI 600 may include maintenance data 616. The maintenance data 616 may include maintenance time for varying aspects of a hydraulic fracturing pump. The supervisory controller may determine when to perform maintenance on a hydraulic fracturing pump based on different aspects of the hydraulic fracturing pump as described above. When the supervisory controller determines a time for maintenance, the supervisory controller may include a prompt in the second GUI 600 indicating maintenance is required. Depending on the type of maintenance and/or other factors, the supervisory controller may prevent further use of the hydraulic fracturing pump, until maintenance is performed. The performance of maintenance may be indicated based on selecting a reset or other button under maintenance data. The performance of maintenance may also be determined automatically by components, e.g., a controller, of a hydraulic fracturing pump, and such determinations may be communicated to the supervisory controller.

The second GUI 600 may additionally include an idle button 620 and/or a stop button 618. Selecting the idle button 620 during non-operation may cause the associated hydraulic fracturing pump to enter an idle state. Selecting the stop button 618 during operation or idle may cause the associated hydraulic fracturing pump to enter a stop state or cease operation.

The supervisory controller may include, generate, or determine one or more corresponding or associated displays, pages, or GUIs for the overall wellsite. As noted, a pump profile may include a position or location of a hydraulic fracturing pump. The supervisory controller may generate a third GUI 700 to indicate the position, location, coordinates, and/or other aspects of hydraulic fracturing pumps at the wellsite. The third GUI 700 may include a block or representation 704 of each of the hydraulic fracturing pumps. Each block or representation 704 may indicate the location of each hydraulic fracturing pump. The block or representation 704 may include a pump identification number 702 to indicate such a location. In another embodiment, letters or other indicators may be utilized to indicate position or location. Each block or representation 704 may include other data relating to a hydraulic fracturing pump, such as BPM, discharge pressure, and/or suction pressure. The third GUI 700 may further include a total pump rate sum 706 flowing to a wellhead and total a blender discharge 708 flowing from a blender unit. The third GUI 700 may additionally include an idle all button 712 and/or a stop all button 710. Selecting the idle all button 712 during non-operation may cause all the hydraulic fracturing pumps to enter an idle state. Selecting the stop all button 712 during operation or idle may cause all the hydraulic fracturing pumps to enter a stop state or cease operation.

References are made to block diagrams of systems, methods, apparatuses, and computer program products according to example embodiments. It will be understood that at least some of the blocks of the block diagrams, and combinations of blocks in the block diagrams, may be implemented at least partially by computer program instructions. These computer program instructions may be loaded onto a general purpose computer, special purpose computer, special purpose hardware-based computer, or other programmable data processing apparatus to produce a machine, such that the instructions which execute on the computer or other programmable data processing apparatus create means for implementing the functionality of at least some of the blocks of the block diagrams, or combinations of blocks in the block diagrams discussed.

These computer program instructions may also be stored in a non-transitory machine-readable memory that may direct a computer or other programmable data processing apparatus to function in a particular manner, such that the instructions stored in the machine-readable memory produce an article of manufacture including instruction means that implement the function specified in the block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide task, acts, actions, or operations for implementing the functions specified in the block or blocks.

One or more components of the systems and one or more elements of the methods described herein may be implemented through an application program running on an operating system of a computer. They may also be practiced with other computer system configurations, including handheld devices, multiprocessor systems, microprocessor-based or programmable consumer electronics, mini-computers, mainframe computers, and the like.

Application programs that are components of the systems and methods described herein may include routines, programs, components, data structures, etc. that may implement certain abstract data types and perform certain tasks or actions. In a distributed computing environment, the application program (in whole or in part) may be located in local memory or in other storage. In addition, or alternatively, the application program (in whole or in part) may be located in remote memory or in storage to allow for circumstances where tasks may be performed by remote processing devices linked through a communications network.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims.

This U.S. non-provisional patent application claims priority to and the benefit of, under 35 U.S.C. § 119(e), U.S. Provisional Application No. 62/705,628, filed Jul. 8, 2020 titled "USE OF A PUMP PROFILER AND HEALTH MONITORING FUNCTION TO OPERATE HYDRAULIC FRACTURING PUMPS AND ASSOCIATED METHODS," and U.S. Provisional Application No. 62/705,357, filed Jun. 23, 2020, titled "THE USE OF A PUMP PROFILER AND HEALTH MONITORING FUNCTION TO OPERATE HYDRAULIC FRACTURING PUMPS AND ASSOCIATED METHODS," the disclosures of both of which are incorporated herein by reference in their entirety.

In the drawings and specification, several embodiments of systems and methods to operate hydraulic fracturing pumps for a hydraulic fracturing system or wellsite hydraulic fracturing system have been disclosed, and although specific terms are employed, the terms are used in a descriptive sense only and not for purposes of limitation. Embodiments of systems and methods have been described in considerable detail with specific reference to the illustrated embodiments. However, it will be apparent that various modifications and changes may be made within the spirit and scope of the embodiments of systems and methods as described in the foregoing specification, and such modifications and changes are to be considered equivalents and part of this disclosure.

What is claimed:

1. A method of utilizing a hydraulic fracturing unit profile to operate hydraulic fracturing units for a hydraulic fracturing system, the method comprising:
   determining if one or more pump controllers are available, each of the one or more pump controllers associated with a pump of a hydraulic fracturing unit;
   in response to an availability of one or more pump controllers, for each pump associated with the one or more pump controllers:
      obtaining pump assembly data, pump maintenance data, and pump event and alarm history data, and
      determining a pump maintenance cycle based on the pump maintenance data and pump event and alarm history data;
   determining if one or more engine controllers are available, each of the one or more engine controllers associated with an engine of the hydraulic fracturing unit;
   in response to an availability of one or more engine controllers, for each engine associated with the one or more engine controllers:
      obtaining engine assembly data, engine maintenance data, and engine event and alarm history data,
      determining life expectancy of consumables associated with the engine based on the engine maintenance data and engine event and alarm history data, and
      determining engine maintenance cycle based on the engine maintenance data and engine event and alarm history data;
   building a hydraulic fracturing unit profile for each of the hydraulic fracturing units including pump and engine data and determined characteristics; and
   determining which of the hydraulic fracturing units not to utilize for a hydraulic fracturing operation based on each hydraulic fracturing unit profile.

2. The method of claim 1, wherein the hydraulic fracturing unit profile for each of the hydraulic fracturing units includes one or more of:
   (a) pump assembly data,
   (b) pump maintenance data,
   (c) pump event and alarm history data,
   (d) the pump maintenance cycle,
   (e) maximum pump flow,
   (f) maximum pump pressure,
   (g) maximum pump speed,
   (h) engine assembly data,
   (i) engine maintenance data,
   (j) engine event and alarm history data,
   (k) the engine maintenance cycle, or
   (l) maximum power output.

3. The method of claim 2, further comprising:
   obtaining, for each pump associated with the one or more pump controllers, real-time pump operation data; and
   obtaining, for each engine associated with the one or more engine controllers, real-time engine operation data.

4. The method of claim 3, wherein pump event and alarm history data and engine event and alarm history data are obtained substantially continuously and in real-time.

5. The method of claim 4, wherein the hydraulic fracturing profile for each of the hydraulic fracturing units are updated continuously and in real-time based on one or more of:
   (a) updated pump event and alarm history data,
   (b) updated engine event and alarm history data,
   (c) real-time pump operation data, or
   (d) real-time engine operation data.

6. The method of claim 4, further comprising:
   determining whether to derate a pump based on pump event and alarm history data, real-time pump operation data, and maximum power output.

7. The method of claim 3, further comprising:
   displaying each hydraulic fracturing unit profile in a graphical user interface (GUI) on a display.

8. The method of claim 3, wherein engine maintenance data and engine event and alarm history data include one or more of levels of consumables associated with the engine, age of consumables associated with the engine, time periods of a change or maintenance of consumables associated with the engine.

9. The method of claim 8, further comprising:
   determining the life expectancy of consumables associated with the engine based on the time periods of a change or maintenance of consumables associated with the engine and engine assembly data.

10. The method of claim 9, further comprising:
   monitoring consumables level and age associated with the engine;
   determining whether a consumable level is low; and
   determining whether the consumable reached a low consumable level at an unexpected time based on one or more of life expectancy, age of the consumable, level of the consumable, or engine assembly data.

11. The method of claim 10, further comprising:
   in response to a determination that a failure occurred at the unexpected time:
      shutting down the engine; and
      initiating maintenance of the engine.

12. The method of claim 9, further comprising:
   monitoring consumables level and age associated with the engine;
   determining whether a failure of a consumable has occurred; and
   determining whether the failure occurred at an unexpected time based on one or more of life expectancy, age of the consumable, level of the consumable, or engine assembly data.

13. The method of claim 12, further comprising:
   in response to a determination that a failure occurred at the unexpected time:
      shutting down the engine; and
      initiating maintenance of the engine.

14. The method of claim 3, wherein a supervisory controller is configured to:
   obtain data,
   perform determinations, and
   build the hydraulic fracturing unit profile.

* * * * *